US012099486B2

(12) United States Patent
Vermeulen et al.

(10) Patent No.: US 12,099,486 B2
(45) Date of Patent: Sep. 24, 2024

(54) SCHEMA MANAGEMENT FOR JOURNAL-BASED STORAGE SYSTEMS

(71) Applicant: Amazon Technologies, Inc., Seattle, WA (US)

(72) Inventors: Allan Henry Vermeulen, Corvallis, OR (US); Timothy Daniel Cole, Seattle, WA (US); John Michael Morkel, Seattle, WA (US); Christopher Richard Jacques De Kadt, Seattle, WA (US); Artem Danilov, Kirkland, WA (US); Andrew Wayne Ross, Seattle, WA (US); Tate Andrew Certain, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 18/186,097

(22) Filed: Mar. 17, 2023

(65) Prior Publication Data
US 2023/0229645 A1 Jul. 20, 2023

Related U.S. Application Data

(63) Continuation of application No. 14/753,475, filed on Jun. 29, 2015, now Pat. No. 11,609,890.

(51) Int. Cl.
*G06F 16/21* (2019.01)
*G06F 16/28* (2019.01)
*G06F 16/951* (2019.01)

(52) U.S. Cl.
CPC .......... *G06F 16/219* (2019.01); *G06F 16/283* (2019.01); *G06F 16/951* (2019.01)

(58) Field of Classification Search
CPC ..... G06F 16/951; G06F 16/283; G06F 16/219
(Continued)

(56) References Cited

U.S. PATENT DOCUMENTS

| 6,018,739 A | 1/2000 | McCoy et al. |
| 7,127,716 B2 | 10/2006 | Jin et al. |

(Continued)

FOREIGN PATENT DOCUMENTS

| CN | 101184106 | 5/2008 |
| CN | 103365652 | 10/2013 |

(Continued)

OTHER PUBLICATIONS

Wikipedia, "Apache Wave", Downloaded May 8, 2015, pp. 1-9.
(Continued)

*Primary Examiner* — Hosain T Alam
*Assistant Examiner* — Tracy M McGhee
(74) *Attorney, Agent, or Firm* — S. Scott Foster; Kowert, Hood, Munyon, Rankin & Goetzel, P.C.

(57) ABSTRACT

A transaction request compliant with a first version of a journal schema of a multi-data-store storage system is received at a journal manager. The journal schema indicates attributes of data objects which may be materialized at various data stores of the system. The journal manager stores an entry in the system's journal if the transaction meets acceptance criteria. Writes indicated in the entry are materialized at the data stores after verifying that the entry is compliant with the journal schema. After verifying that member data stores have approved a proposed change to the journal schema, another entry indicating a different version of the journal schema is added to the journal. Client-side components of the system obtain the current version of the journal schema to prepare the transaction requests.

20 Claims, 35 Drawing Sheets

(58) Field of Classification Search
USPC .......................................................... 707/695
See application file for complete search history.

(56) References Cited

U.S. PATENT DOCUMENTS

| | | | |
|---|---|---|---|
| 7,290,056 | B1 | 10/2007 | McLaughlin, Jr. |
| 7,668,876 | B1* | 2/2010 | Kulkarni ................. G06F 16/10 |
| | | | 707/674 |
| 7,730,034 | B1 | 6/2010 | Deflaux et al. |
| 7,792,693 | B2 | 9/2010 | Bultmeyer et al. |
| 7,908,311 | B2 | 3/2011 | O'Loughlin et al. |
| 7,949,662 | B2 | 5/2011 | Farber et al. |
| 8,019,849 | B1 | 9/2011 | Lopilato et al. |
| 8,078,582 | B2 | 12/2011 | Wang et al. |
| 8,108,343 | B2 | 1/2012 | Wang et al. |
| 8,209,213 | B2 | 6/2012 | Raisanen |
| 8,510,270 | B2 | 8/2013 | Pareek et al. |
| 8,548,945 | B2 | 10/2013 | Dwyer et al. |
| 8,650,155 | B2 | 2/2014 | Corbin et al. |
| 8,676,752 | B2 | 3/2014 | Kundu et al. |
| 9,323,569 | B2 | 4/2016 | Vermeulen et al. |
| 9,454,670 | B2 | 9/2016 | Beecham |
| 9,519,674 | B2 | 12/2016 | Vermeulen et al. |
| 9,529,882 | B2 | 12/2016 | Vermeulen |
| 9,613,078 | B2 | 4/2017 | Vermeulen et al. |
| 9,619,278 | B2 | 4/2017 | Vermeulen |
| 9,619,544 | B2 | 4/2017 | Vermeulen et al. |
| 9,799,017 | B1 | 10/2017 | Vermeulen et al. |
| 9,870,384 | B2 | 1/2018 | Cain, III et al. |
| 9,904,722 | B1 | 2/2018 | Shevade et al. |
| 9,971,822 | B1 | 5/2018 | Deardeuff et al. |
| 9,984,139 | B1 | 5/2018 | Ye et al. |
| 10,025,802 | B2 | 7/2018 | Vermeulen et al. |
| 10,109,148 | B2 | 10/2018 | Risnoveanu |
| 10,282,228 | B2 | 5/2019 | Vermeulen |
| 10,303,795 | B2 | 5/2019 | Vermeulen et al. |
| 10,373,247 | B2 | 8/2019 | Vermeulen et al. |
| 10,621,156 | B1 | 4/2020 | Morkel |
| 10,698,767 | B1 | 6/2020 | De Kadt et al. |
| 10,866,865 | B1 | 12/2020 | Morkel et al. |
| 10,866,968 | B1 | 12/2020 | Cole et al. |
| 11,599,520 | B1 | 3/2023 | Vermeulen et al. |
| 11,609,890 | B1 | 3/2023 | Vermeulen et al. |
| 2006/0182050 | A1 | 8/2006 | Dohm |
| 2006/0268742 | A1 | 11/2006 | Chu et al. |
| 2007/0162516 | A1 | 7/2007 | Thiel et al. |
| 2008/0028009 | A1 | 1/2008 | Ngo |
| 2008/0040628 | A1 | 2/2008 | Mandal |
| 2009/0077164 | A1 | 3/2009 | Phillips et al. |
| 2009/0172695 | A1 | 7/2009 | Lazaroff et al. |
| 2010/0057826 | A1 | 3/2010 | Chow et al. |
| 2010/0198855 | A1 | 8/2010 | Ranganathan et al. |
| 2010/0211554 | A1 | 8/2010 | Reid et al. |
| 2010/0257138 | A1 | 10/2010 | Wang et al. |
| 2010/0332448 | A1* | 12/2010 | Holenstein .......... G06F 16/2365 |
| | | | 707/615 |
| 2011/0161391 | A1 | 6/2011 | Araujo et al. |
| 2011/0276977 | A1 | 11/2011 | van Velzen et al. |
| 2012/0059792 | A1 | 3/2012 | Kundu et al. |
| 2012/0079490 | A1 | 3/2012 | Bond et al. |
| 2012/0131058 | A1 | 5/2012 | Farber et al. |
| 2012/0166407 | A1 | 6/2012 | Lee et al. |
| 2012/0303576 | A1 | 11/2012 | Calder et al. |
| 2013/0110767 | A1 | 5/2013 | Tatemura et al. |
| 2013/0304714 | A1 | 11/2013 | Lee et al. |
| 2014/0074882 | A1 | 3/2014 | Vyvyan |
| 2014/0304380 | A1 | 10/2014 | Wass et al. |
| 2015/0186043 | A1 | 7/2015 | Kesselman et al. |
| 2015/0339154 | A1 | 11/2015 | Wen et al. |
| 2015/0370767 | A1 | 12/2015 | Sevilmis |
| 2016/0196295 | A1 | 7/2016 | Bhattacharjee |
| 2016/0350392 | A1 | 12/2016 | Rice et al. |

FOREIGN PATENT DOCUMENTS

| | | |
|---|---|---|
| JP | H06243072 | 9/1994 |
| JP | H09204341 | 8/1997 |
| JP | 2004518335 | 6/2004 |
| JP | 2010152559 | 7/2010 |
| JP | 2011076487 | 4/2011 |
| WO | 2013062894 | 5/2013 |

OTHER PUBLICATIONS

"Git-Rewriting History", http://gitscm.com/book/en/v2/GitToolsRewritingHistory, Downloaded May 8, 2015, pp. 1-10.
David Roundy, "Darcs User Manual", http://darcs.net/manual/bigpage.html, Downloaded May, 8, 2015, pp. 1-87.
Wikipedia, "Operational transformation", Downloaded May 8, 2015, pp. 1-9.
"Samza", http://samza.apache.org/, Downloaded Jun. 3, 2015, p. 1.
Wikipedia, "SipHash", Downloaded May 31, 2015, pp. 1-3.
"Chain Reaction: a Causal + Consistent Datastore based on Chain Replication" Sergio Almeida, et al., Apr. 15-17, 2013, pp. 85-98.
"Chain Replication in Theory and in Practice", Scott Lystig Fritchie, Sep. 30, 2010, pp. 1-11.
"Chain Replication for Supporting High Throughput and Availability", Robbert van Renesse, Fred B. Schneider, 2004, pp. 91-104.
"Blackboard System", Wikipedia, accessed Dec. 3, 2014, pp. 1-5.
Invitation to Pay Additional Fees for PCT/US2015/049470, Dated of mailing Dec. 1, 2015, Amazon Technologies, Inc., pp. 1-10.
Ozgur Ulusoy, "Processing Real-Time Transactions in a Replicated Database System", Distributed and Parallel Datebases, vol. 2, No. 4, Sep. 10, 1993, pp. 405-436.
Philip A. Bernstein, et al., "Concurrency Control and Recovery in Database Systems", Retrieved from the Internet URL: https://courses.cs.washington.edu/courses/cse490h/11wi/CSE490H_files/CSE550BHG-Ch7.pdf, Jan. 1987, pp. 1-58.
International Search Report and Written Opinion, Date of mailing Dec. 7, 2015, Amazon Technologies, Inc., pp. 1-11.
Divyakant Agrawal, et al., "Managing Geo-replicated Data in Multi-datacenters", Springer Berlin Hiedelberg, vol. 7813 Mar. 25, 2013, pp. 23-43.
Gene T.J. Wuu et al., Efficient Solutions to the Replicated Log and Dictionary Problems*, Reprinted with permission from the 3rd PODC Converence Proceedings, ACM 1984, pp. 57-66.
Michael Lawrence, "Mulitobjective Genetic Algorithms for Materialized View Selection in OLAP Data Warehouse", GECCO'06, ACM, Jul. 8-12, 2006, pp. 699-706.

* cited by examiner

SCHEMA MANAGEMENT FOR JOURNAL-BASED STORAGE SYSTEMS

This application is a continuation of U.S. patent application Ser. No. 14/753,475, filed Jun. 29, 2015, which is hereby incorporated by reference herein in its entirety.

BACKGROUND

In recent years, more and more computing applications are being implemented in distributed environments. A given distributed application may, for example, utilize numerous physical and/or virtualized servers spread among several data centers of a provider network, and may serve customers in many different geographical locations. In many cases, particularly in cloud-based computing environments, a given application may involve performing reads and writes at several different data stores, such as various instances of relational databases, non-relational databases, and the like. Some commonly used data store architectures may support the traditional ACID (atomicity, consistency, isolation and durability) properties associated with the relational data model for operations within a given data store, but may not support such properties for groups of operations involving multiple data stores. Other data store architectures may not natively support the ACID property even within groups of operations directed to a single data store instance.

Developers of applications that would benefit from support for transactions that cross data store boundaries are sometimes forced to implement their own transaction management mechanisms. Such ad-hoc mechanisms are often hard to maintain, especially as the set of object types at the different data stores evolve based on changing application requirements, and as more features are added to the distributed applications themselves. In some cases, not all the data stores may provide support for the same sets of primitive types, or the same kinds of data manipulation operations, which may further complicate the task of managing complex transactions. Furthermore, given the network delays and various types of failures that may be encountered in typical distributed environments over time, some transaction management techniques may not be robust enough to support the service levels required for mission-critical operations.

Figure 1:
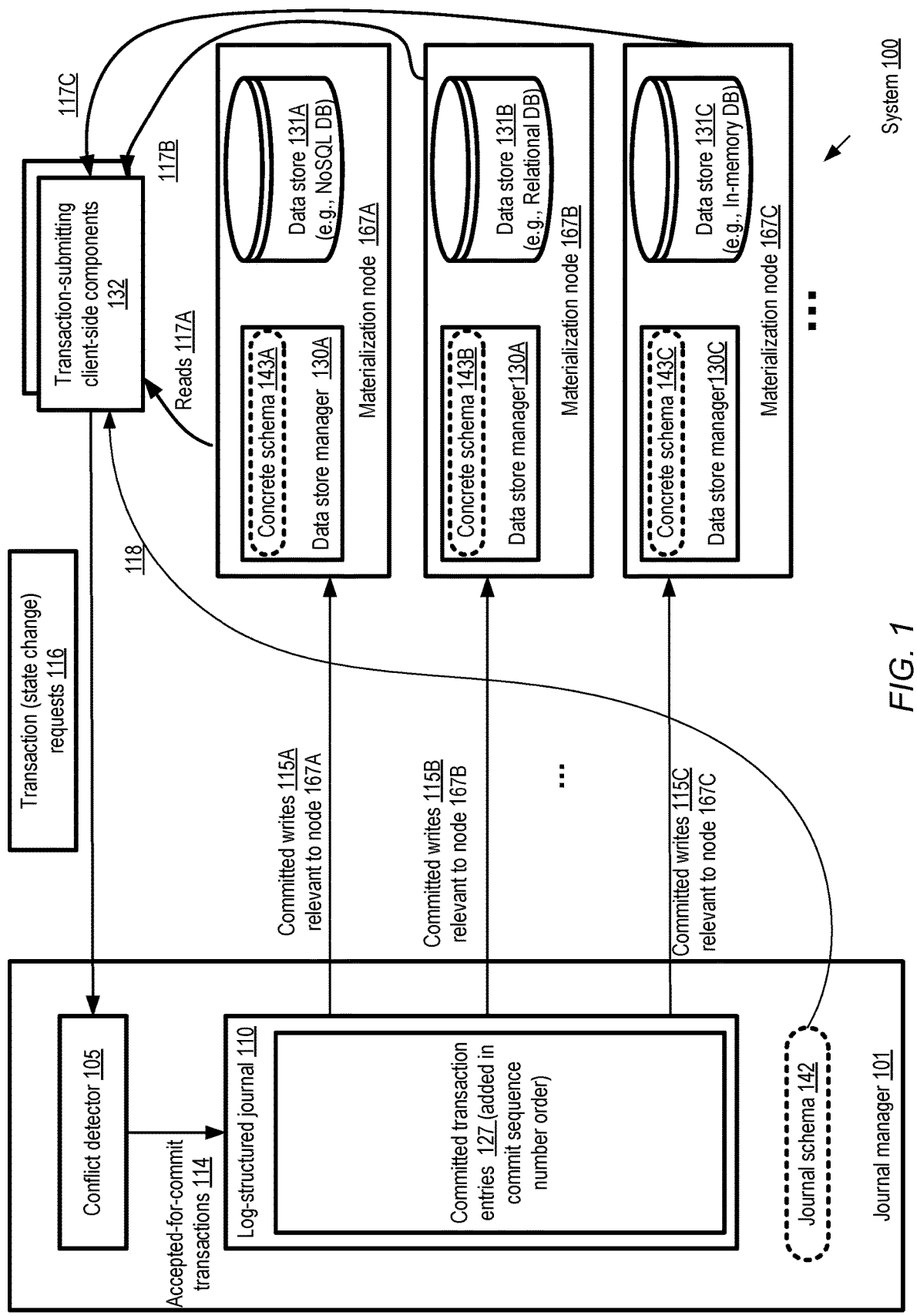
FIG. 1 illustrates an example system environment in which a journal-based multi-data-store database may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing a multi-data-store database using a journal comprising entries representing approved state changes of the database are described. In at least some embodiments, a plurality of data stores, some of which may implement different data models and data manipulation languages than others, and some of which may materialize different subsets of the database content than others, may be registered as respective materialization nodes or members of the database. In various embodiments, client-side components of the database may prepare transaction requests representing proposed state changes locally, and submit them to a journal manager for approval. Some state changes or write operations indicated in a transaction request may be based on data that has been read from one or more of the data stores. Information about such reads may be included in the transaction request, e.g., in the form of a read set descriptor, together with an indication of the committed state of a data store from which the data was read. A write set descriptor indicative of the write operations corresponding to the proposed state changes may also be included in a transaction request in various embodiments. The journal manager may perform conflict detection operations based on analysis of the read set descriptor of a received transaction request and on write sets of a subset of journal entries representing previously-committed transactions. If no conflicts are detected, and in some cases if the proposed transaction meets additional criteria described below in further detail, the proposed transaction may be accepted or approved for commit. An entry representing the approval (which may also be referred to as a commit record) may be added or appended to the journal.

The write operation(s) corresponding to a given commit record may be propagated to or materialized at some or all of the data stores, depending for example on the overlap between the particular subsets of the database being materialized at the individual data stores and the contents of the writes. In some implementations, at least some of the writes may be propagated to the data stores asynchronously with respect to the insertions of the journal entries. Changes corresponding to a particular committed transaction may be materialized at several different data stores independently—e.g., one data store may be updated before another. The entries in the journal may collectively represent the authoritative state of the database in various embodiments, with individual journal entries representing respective state changes. In at least some embodiments, a given journal entry may indicate an approved or committed operation which changes the state (e.g., the equivalent of "add X to Y"), and may not necessarily indicate the data values resulting from the state change (e.g., with respect to the state change indicated by "add X to Y", a record indicating Y's value may not be stored in the journal). In various embodiments, once an entry has been made persistent by storing at one or more storage devices of the journal, that entry may no longer be modified or overwritten in place.

A wide variety of data store types may be registered as members of such a journal-based system in different embodiments, including for example one or more instances of relational databases, non-relational or NoSQL databases, in-memory databases, object-oriented databases, storage services which provide web-service interfaces to data objects, storage services which provide block-level programmatic interfaces, and the like. Each data store instance or materialization node may have a corresponding data store manager, implemented for example using some collection of hardware and/or software components, configured to support a respective set of programmatic interfaces in accordance with the syntax and semantics of the associated data store type. In at least some embodiments, for example, some data stores may present different interfaces for read operations, and a client-side component may submit reads to different data stores via their respective read interfaces when preparing a transaction request. The data stores registered at a given time for transaction management via a given logical instance of a journal of a multi-data-store database may be referred to as "member" data stores of that database as of that time. Generally speaking, multiple logical journal instances may be used simultaneously, each associated with a corresponding multi-data-store database with its own member data stores. The terms "multi-data-store database" and "multi-data-store storage system" may be used synonymously herein. Of course, a given storage system or database may, at least at some points in time, comprise just a single member data store—that is, while multiple members may be permitted, the storage system may not be required to have multiple members.

In various embodiments, some of the primitive data types supported at one data store may not be supported at another. For example, integer values may be stored using 64 bits in one data store, and using 32 bits in another. Similarly, the implementation and precision of real numbers may differ from one data store to another. The manner in which text variables or attributes are handled may differ across data stores in some cases—e.g., the maximum supported length of a character array may differ, support for variable-length character arrays or strings may differ, and so on. The details of the implementation of binary objects (e.g., "blobs"), such as the maximum size of binary objects, etc., may differ from one store to another. Some data stores may not offer the same kinds of data manipulation operations as others. Furthermore, in at least some embodiments, the kinds of indexes, constraints and/or other metadata objects which may be supported may differ from one data store to another. In various embodiments, a data-store-independent or data-store-agnostic transaction language may be employed for transaction requests submitted to the journal manager, e.g., to ensure that such differences among the different data stores can be managed.

A common journal schema may be employed in some embodiments, indicating rules regarding acceptable transaction requests which can be submitted to the journal manager by client-side components. Such rules may, for example, indicate the syntax of the transaction language, the kinds of transactions which can be submitted, and so on. With respect to acceptable values for the attributes of data objects, the journal schema may support "maximally-overlapping" attribute value ranges with respect to the individual data stores, as described below in further detail. For example, if one member data store supports 64-bit integers, and another member data store supports only 32-bit integers, the journal schema may only permit 32-bit integers. The journal schema may also be referred to as the abstract or generic schema of the database, while the respective schemas of the individual data stores, from which the journal schema may be derived in some embodiments, may be referred to as "concrete" or data-store-specific schemas.

The journal schema of the storage system itself may evolve over time, e.g., as new data objects and/or new object attributes are added, or if new features or capabilities are added to the data-store-independent transaction language. Generally speaking, if the storage system comprises N data stores at a given point in time, the approval of the corresponding N data store managers may be required for a new version of the journal schema to be adopted. In some embodiments, after the member data store managers approve, a journal entry indicating that a new version of the journal schema has been adopted or committed may be inserted into the journal. Thus, journal entries of several types, including entries representing data object modifications and entries representing journal schema modifications, may be supported in various embodiments. In addition, as described below in further detail, in at least one embodiment another type of journal entry representing a request to redact (or skip the processing of) an earlier-submitted journal entry may be supported.

In at least some embodiments as mentioned above, a given journal schema change may include changes to the data-store-independent transaction language which can be used for subsequent transactions. For example, while version V1 of the journal schema is in effect, a set of transaction verbs {verb1, verb2, and verb3} may be permitted in transaction requests accepted by the journal manager, and when version V2 of the journal schema takes effect a different set of transaction verbs (verb1, verb2, verb3 and verb4) may be permitted for subsequent transactions. Using journal schema changes, the permitted set of data objects, the attributes of the data objects, the permitted values of the attributes, as well as the transaction language itself may all be adapted to changing requirements. In at least some embodiments, before a particular write operation is applied at a given data store, the corresponding data store manager may verify that the changes are compliant with the current version of the journal schema (where the current version as known at one data store may temporarily differ from the current version as known at another data store in some cases). In one embodiment, the journal manager may also verify that a transaction request is compliant with the current version of the journal schema, although such verification may not be required in other embodiments. In at least some embodiments, the storage system may rely on an "honor system" with respect to compliance with the journal schema by client-side components—e.g., client-side components may be expected to keep up with journal schema version changes and prepare transaction requests that comply with the journal schema version currently in effect, but an enforcement mechanism for such compliance may not necessarily be implemented at the journal manager.

In some embodiments, each journal entry may include an indication of a commit sequence number, indicative of an order in which the corresponding request was approved by the journal manager. In one simple example implementation, an integer counter may be incremented by the journal manager every time a transaction request (e.g., either a data modification request, or a journal schema modification request) is approved, and the value of that counter may be included in the commit record entry added to the journal for that request. In some such embodiments, a conflict check delimiter (expressed as a sequence number corresponding to the most-recently-applied commit at a data store from which data was read when preparing the transaction) may be included in a transaction request. The conflict check delimiter may be used by the journal manager to identify the subset of commit records of the journal (i.e., those commit records which have higher sequence numbers than the conflict check delimiter) whose write set descriptors are to be examined to detect conflicts with the transaction proposed in the request. In at least one embodiment, if that subset of commit records includes a particular record corresponding to a journal schema modification, the transaction request may be rejected (e.g., because the version of the journal schema currently in effect differs from the version which was used to prepare the transaction).

In various embodiments, new member data stores may be added to or registered at a given multi-data-store storage system. Depending on the rate at which data modifications (and/or journal schema modifications) occur, the total number of journal entries in a given journal may become very large. If a new data store is required to apply all the journal entries in sequence to synchronize state with the storage system, a very long time (e.g., proportional to the journal entry count) may be required for synchronization. In order to make data store synchronization more efficient, in at least some embodiments a snapshot manager of the data store may create compact snapshots of the data store state from the journal entries, as described below in further detail. Such snapshots may in many cases comprise entries expressed in the same data-store-independent transaction language as the journal entries. The total number of entries in a snapshot may correspond to the number of distinct objects in the data store, which may often be much smaller than the total number of journal entries. The state changes indicated in a compact snapshot may allow much faster synchronization of new data stores than if synchronization required application of all the journal entries directly. In at least some embodiments, respective snapshots (expressed in the same data-store-independent transaction language) may be created from the member data stores as well as from the authoritative state of the storage system represented by the journal. Deviations of materialized data from the state of the storage system represented by the journal may be detected by comparing such snapshots, and patches to re-synchronize the deviating data stores may be generated using the results of such comparisons in at least some embodiments. The snapshot generation logic may also take redaction-related entries of the journal into account in at least some embodiments—e.g., redacted entries may be identified and eliminated from further consideration during snapshot creation.

According to some embodiments, a journal schema may include one or more query restriction descriptors. A query restriction descriptor may indicate one or more data object attributes (or combinations of attributes) with respect to which the multi-data-store storage system is required to support a particular consistency level (e.g., serializable consistency), at least with respect to read queries which contain equality predicates (such as "select*from X where attribute1 equals value1"). For example, if serializable consistency is required with respect to reads and writes directed to attributes Attr1 and Attr2 of a data object, while the data object includes several more attributes Attr3, Attr4, . . . , a query restriction descriptors listing Attr1 and Attr2 individually and/or the combination (Attr1 and Attr2), may be included in a journal schema. When preparing a read set descriptor to be included in a transaction request corresponding to a proposed transaction, a client-side component of the storage system may apply one or more transformation operations (e.g., normalization into a standard format followed by a selected hash function) on read query predicates directed to the attributes indicated in the query descriptors. Results of the transformation operations (e.g., lists of integers in some implementations) may be included in the read set descriptors. In some embodiments, when preparing a write set descriptor of the transaction request, the client-side component may identify a set of write-affected queries—e.g., queries which are directed at some or all of the attribute combinations indicated in the query restriction descriptors, and whose results would be changed as a result of the write operations of the proposed transaction. A transformation procedure may be applied to the predicates of the write-affected queries, and the results of the transformation functions (which may also comprise lists of integers in some implementations) may be included in the transaction request. When performing conflict detection, the journal manager may compare the read set descriptor's list of values (obtained from the transformation functions) with the lists of values of write sets of a subset of previously-committed transactions. By restricting the set of attributes for which read-write conflicts are to be detected, and transforming query predicates into easy-to-compare value lists, the task of conflict detection may be simplified substantially in various embodiments. Additional details regarding journal schemas, journal entry redaction, snapshots and query restrictions are provided below.

Example System Environment

FIG. 1 illustrates an example system environment in which a journal-based multi-data-store database may be implemented, according to at least some embodiments. System 100 shows a journal manager 101 of a log-structured journal 110 that may be used to store records of state changes of a multi-data-store database. The journal manager may be implemented using one or more computing devices in various embodiments. The journal may be described as being log-structured in the depicted embodiment in that it may comprise an append-only sequence of entries, with in-place modification of entries not permitted. The journal may comprise committed transaction entries 127 stored in the order in which the corresponding transactions or state changes were approved, e.g., in increasing order of commit sequence numbers. The database may include one or more materialization nodes 167, such as 167A-167C, at each of which at least a subset of the database contents are materialized. Each materialization node may include a respective data store 131 (e.g., data stores 131A-131C) and a corresponding data store manager (DSM) 130 (e.g., DSMs 130A-130C) implemented at one or more computing devices. A respective concrete schema 143 (e.g., concrete schemas 143A-143C for data stores 131A-131C) may govern the data object types, attribute types and allowed values, and various other aspects of each of the data stores. A journal schema 142 (which may be based on and/or compatible with each of the concrete schemas of the data stores 131 as described below in further detail) may specify or govern various aspects of transaction management in system 100—e.g., the syntax of a data-store-independent transaction language in which state change requests are to be submitted to the journal manager by client-side components 132, and/or the data types and attributes which can be references in such requests. Each data store manager may ensure that any changes made to the journal schema 142 are compatible with the local concrete schema 143 in various embodiments, and thus may have access to both types of schemas. Various additional details regarding the journal schema and its relationship with the concrete schemas 143 are provided below.

The data stores 131 may be referred to as member data stores of the database or storage system. The member data stores 130 may differ from each other in various characteristics such as their supported data models and/or data manipulation languages, level of data consistency supported, transaction support, data persistence/durability level, and the like. For example, data store 130A may comprise an instance of a NoSQL or non-relational database that does not implement a standard version of the structured query language (SQL)), data store 130B may comprise an instance of a relational database, and data store 130C may comprise an instance of an in-memory database. Each of the data stores may be registered for transaction management by the journal manager 101 in the depicted embodiment. The terms "concurrency control" and "transaction management", may be used as synonyms herein with respect to the state change management functionality provided by the journal manager. In effect, the journal manager may be responsible for implementing a replicated state machine corresponding to a collection of data objects indicated in a journal schema, with the committed transaction entries expressing state changes in a data-store-independent language in the depicted embodiment. In some embodiments, several different types of entries may be stored in the journal, including entries representing data modifications, journal schema modifications, redactions of other entries, and the like as discussed below in further detail.

The term "data store", as used herein, may refer to an instance of any of a wide variety of persistent or ephemeral data repositories and/or data consumers. For example, some data stores such as 130A may comprise persistent non-relational databases that may not necessarily provide native support for multi-item transactions, while other data stores such as 130B may comprise persistent relational databases that may natively support multi-item transactions. In some embodiments, a network-accessible storage service of a provider network that enables its users to store unstructured data objects of arbitrary size, accessible via a web-services interface, may be registered as one of the data stores. Other types of data stores may comprise in-memory databases such as 130C, instances of a distributed cache, network-accessible block storage services, file system services, and the like.

In the depicted embodiment, transaction-submitting client-side components 132 of the database may construct transaction requests locally, and then submit (or "offer") the transaction requests for approval and commit by the journal manager 101. In one implementation, for example, a client-side library may enable a client to initiate a proposed transaction by issuing the logical equivalent of a "transaction-start" request. Within the candidate transaction, a client may perform some number of reads on a selected set of objects at data stores 130, and locally (e.g., in local memory) perform a proposed set of writes directed at one or more data stores. The client may then submit the proposed transaction by issuing the equivalent of a "transaction-end" request. A transaction request 116 may be received at a conflict detector 105 of the journal manager 101 in the depicted embodiment. In general, in at least some embodiments, a given transaction request 116 may include a read set descriptor indicating one or more reads (e.g., reads 117A, 117B or 117C) respectively from one or more data stores, and a write set descriptor indicating proposed writes which may eventually be propagated to one or more data stores, where the set of data stores that are read in the transaction may or may not overlap with the set of data stores affected by the writes. The reads may be performed using the native programmatic read interfaces of the data stores in some embodiments. The transaction requests 116 may be formatted in accordance with a data-store-independent transaction language indicated or referenced in journal schema 142 in various embodiments. The client-side components 132 may obtain the latest version of the journal schema 142 directly from the journal manager as indicated via arrow 118 (e.g., using a programmatic read interface supported by the journal manager), and/or via reads from the materialization nodes 167 from which materialized versions of the journal schema may be obtained in a manner similar to the way materialized versions of various data objects are obtained. In at least one embodiment, a journal manager 101 may maintain a materialized version of the journal schema which can be obtained by various client-side components 132. In some embodiments, a client-side component 132 may itself include a module capable of materializing a journal schema 142 after examining a set of journal entries indicating respective journal schema changes. In at least some embodiments, the journal manager may not necessarily check whether a submitted transaction request is compliant with the current version of journal schema 142—instead, the client-side components 132 may be responsible for ensuring that their requests are formatted in accordance with the journal schema. In other embodiments, the journal manager may verify that a transaction request complies with the current version of the journal schema, and may reject requests that do not comply.

At least some of the writes indicated in a given transaction request may be dependent on the results of one or more of the reads in some embodiments. For example, a requested transaction may involve reading one value V1 from a location L1 at a data store DS1, a second value V2 from a second location L2 at a data store DS2, computing a function F(V1, V2) and storing the result of the function at a location L3 at some data store DS3. In some locking-based concurrency control mechanisms, exclusive locks may have to be obtained on L1 and L2 to ensure that the values V1 and V2 do not change before L3 is updated. In contrast, an optimistic concurrency control mechanism may be used by the journal manager 101 of FIG. 1, in which no locks may have to be obtained. Instead, in the depicted embodiment, the conflict detector 105 may determine, based at least in part on the contents of the transaction request and on a set of committed transaction entries of the journal 110, whether one or more of the data items read in the requested transaction may have been updated since they were read from their respective data stores. A sequence number based technique may be used to determine whether such read-write conflicts exist in at least some embodiments, as described below in further detail. If the conflict detector 105 determines that none of results of the proposed transaction's reads have been affected by subsequently committed writes, the requested transaction may be accepted for commit, and records representing such accepted-for-commit transactions 114 may be added to the journal 110. The terms "approve" and "accept" may be used as synonyms herein with respect to requested transactions that are not rejected.

If some of the transaction's read data was updated since the corresponding reads occurred (or if a probability that the data was updated is estimated by the conflict detector to be greater than a threshold), a requested transaction may instead be rejected or aborted in the depicted embodiment. This type of approach to concurrency control may be deemed optimistic in that decisions as to whether to proceed with a set of writes of a transaction may be made initially under the optimistic assumption that read-write conflicts are unlikely. As a result, in scenarios in which read-write conflicts are in fact infrequent, higher throughputs and lower response times may be achieved than may be possible if more traditional locking-based techniques are used. In the case where a transaction is accepted for commit, in some embodiments contents of a corresponding journal entry 127 may be replicated at some number of nodes of a replication graph (as described below in further detail with respect to FIG. 8) in the depicted embodiment before the commit is considered successful. In some embodiments, the requesting client-side component 132 may be notified when the requested transaction is committed. In at least one embodiment, the client-side component 132 may be informed when a transaction is rejected, so that, for example, a new transaction request may be generated and submitted for the desired updates.

For each transaction that is committed, in at least some embodiments a commit sequence number (or some other identifier indicative of the commit) may be generated and stored as part of the corresponding journal entry. Such a commit sequence number may, for example, be implemented as a counter or as a logical timestamp. The commit sequence number may be determined, for example, by the conflict detector in some embodiments, or at a different component associated with the journal (such as the committer node of a replication graph being used) in other embodiments.

In the depicted embodiment, after a given transaction is committed and its entry is stored at the journal, at least some of the writes of the transaction may be applied or propagated to one or more of the materialization nodes 167. Different subsets of the committed writes may be of interest to, or relevant to, different materialization nodes in some embodiments, as indicated by arrows 115A-115C. In various embodiments, the respective data store managers 130 at the materialization nodes may verify that a given write is compliant with the journal schema 142 (and therefore with the concrete schema 143 of the data store) before the write is applied. In some implementations, the writes may be applied in an asynchronous fashion to the materialization nodes. Thus, in such implementations, there may be some delay between the time at which the transaction is committed and the time at which the payload of a particular write operation of the committed transaction reaches the corresponding data store. In some embodiments, respective asynchronous write appliers may be used to propagate some or all of the writes to relevant data stores. In some embodiments, the write appliers may be components of the journal manager 101, while in other embodiments the write appliers may be components of the data store managers 130, and may represent respective cursors on the journal. In some embodiments, a given write applier may be responsible for propagating writes to more than one data store, or a single data store may receive writes from a plurality of write appliers. In at least one implementation, a pull technique may be used to propagate written data to the data stores—e.g., one or more data stores may submit requests for writes to the journal manager or the write appliers, instead of being provided written data at the initiative of the write appliers. After the data written during a transaction is applied to the corresponding data stores, client-side components may be able to read the updated data using the respective read interfaces of the data stores. In some embodiments, at least one of the write appliers may be capable of performing synchronous writes (e.g., either when explicitly directed to do so by the journal manager or a data store manager, or for all the writes for which the applier is responsible).

In at least one embodiment, the journal manager may implement respective sets of read and write programmatic interfaces (e.g., application programming interfaces or APIs). The journal manager's write interfaces may be used by authorized entities (such as client-side components 132) to submit transaction requests, while the read interfaces may be used by various authorized entities (e.g., including write applier subcomponents/cursors of the data store managers 130 and/or the client-side components) to read contents of journal entries 127, obtain journal schemas, and the like. In at least one embodiment, a data store manager 130 may be authorized to invoke the journal manager's write interfaces—e.g., by submitting certain types of transaction requests. Thus, in such embodiments, a data store manager may act as a transaction-submitting client-side component as well as a consumer or reader of journal entries.

In at least some embodiments, as described below in further detail, in addition to a read set descriptor and a write set descriptor, a given transaction request 116 may include the write payload (i.e., the set of data bytes that are to be stored for each write), a conflict check delimiter (an indication of a subset of the committed transaction entries that should be examined to accept/reject the transaction), and/or other elements such as a transaction type indicator. Some or all of these constituent elements of a transaction request may be stored within the corresponding journal entry together with the commit sequence number for the transaction. In at least one embodiment, the journal manager 101 may provide an indication of the latest committed state of the database (such as the highest commit sequence number generated thus far), e.g., in response to a query from a data store manager or a query from a client-side component. The write appliers may indicate the commit sequence numbers corresponding to the writes that they apply in various embodiments. Thus, at any given point in time, a client-side component may be able (e.g., by querying the data store managers) to determine the commit sequence number corresponding to the most-recently-applied write at a given materialization node 167. In at least some embodiments, during the generation of a transaction request 116, the most-recently-applied commit timestamps may be obtained from the data stores that are accessed during the transaction, and one or more of such commit sequence numbers may be indicated in the transaction request as the conflict check delimiter. For example, consider a scenario in which, at the time that a particular client-side component 132 initiates a transaction that includes a read of a location L1 at a data store DS1, the commit sequence number corresponding to the most recently applied write at DS1 is SN1. Assume further that in this example, the read set of the transaction only comprises data of DS1. In such a scenario, SN1 may be included in the transaction request 116. The conflict detector 105 may identify journal entries with sequence numbers greater than SN1 as the set of entries to be examined for read-write conflicts for the requested transaction. If any of the write sets of the identified commit records overlaps with the read set of the requested transaction, the transaction may be rejected/aborted; otherwise, the transaction may be approved for commit in this example scenario. Details regarding the manner in which conflict detection operations may be implemented in various embodiments are provided below.

The optimistic concurrency control mechanism illustrated in FIG. 1 may allow more complex types of atomic operations to be supported than may have been possible using the underlying data stores' concurrency control mechanisms in at least some scenarios. For example, some high-performance non-relational data stores may only allow single-item transactions (i.e., writes may be permitted one at a time, but if multiple writes are submitted in a single batch update, atomicity/consistency guarantees may not be provided for the multiple writes taken together). With the journal-based approach described above, a single transaction that encompasses writes to multiple locations of the non-relational data store (and/or other data stores as well) may be supported with relative ease.

In at least some embodiments, the journal schema 142 may evolve over time. For example, new transactional operations or "verbs" may be added to support new categories of transactions, new data objects, attributes, and/or attribute value changes may be introduced, and so on, as the requirements of the multi-data-store database change. At any given time, a particular version of journal schema 142 which has been approved by the data store managers of all the member data stores may be in effect at system 100. Before a new version of the journal schema takes effect, each of the member data stores' managers may be required to approve the new version in the depicted embodiment. The new version of a journal schema may be proposed, for example, by a client-side component (e.g., in a transaction request). In at least one embodiment, a data store manager may submit a schema change request to the journal manager and/or to peer data store managers. The new version of the journal schema may be analyzed to ensure compatibility with each data store's concrete schema in some implementations as part of the approval procedure—e.g., a given data store manager may verify that the proposed change to the journal schema does not violate any requirements or constraints imposed by the local concrete schema 143. After verifying compatibility with the concrete schema and/or performing other checks, a given data store manager may transmit an indication of an approval of the schema change to the journal manager in some embodiments. After each of the data store managers has approved the change, the new version of the journal schema may be considered "committed" in such embodiments. In various embodiments, an approved modification of the journal schema 142 may be represented by its own committed transaction entry in journal 110—e.g., changes to the journal schema may be handled in a manner similar to changes in the state of the data objects of the database. It is noted that at least in one embodiment, at least some types of in-place modifications may be permitted on journal entries 127.

Journal Schema Contents

Figure 2:
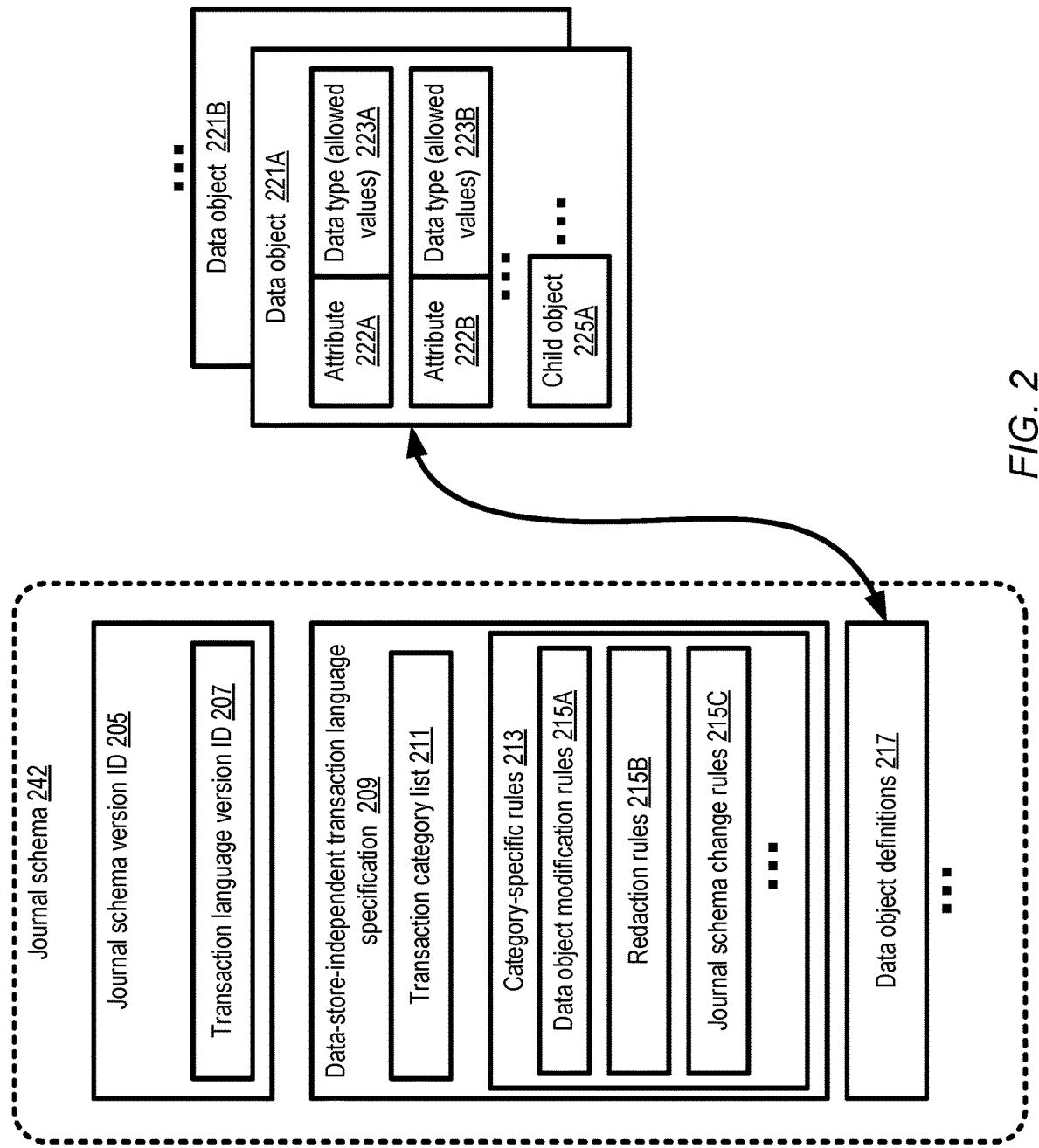
FIG. 2 illustrates examples of elements of a journal schema which may be used at a multi-data-store storage system, according to at least some embodiments.

FIG. 2 illustrates examples of elements of a journal schema which may be used at a multi-data-store storage system, according to at least some embodiments. As shown, a journal schema 242 may contain a version identifier 205 in some embodiments. As mentioned earlier, new versions of the journal schema may take effect after approval by the various data store managers of the materialization nodes of the storage system in various embodiments. In at least one embodiment, a journal schema 242 may include a specification 209 of a data-store-independent transaction language, which is to be used for preparing transaction requests submitted to a journal manager. In some embodiments, the transaction language may have its own separate version number (e.g., because a change to a journal schema version may not necessarily involve a corresponding change to the transaction language). An identifier 207 of the transaction language version may be included in the journal schema 242 in such embodiments, e.g., either embedded within the journal schema identifier or as a separate element of the journal schema.

A number of different transaction or state change categories may be supported at the storage system in various embodiments. For example, supported transaction categories may include data object modification transactions, redactions and/or schema changes. A list 211 of the transaction categories may be indicated explicitly or implicitly in the transaction language specification 209 in the depicted embodiment. Corresponding to some or all of the categories, a respective set of category-specific rules may be indicated in the journal schema 242. For example, the category-specific rules 213 may include data object modification rules 215A, redaction rules 215B, journal schema change rules 215C, and the like. Each set of rules may for example indicate the acceptable syntax (e.g., the types of transaction verbs such as INSERT, DELETE, UPDATE and the like) for the corresponding types of requests, acceptable format(s) in which the requests are to be expressed, and so on. To prepare a given transaction request, in various embodiments a client-side component may use the category-specific rules of the current version of the journal schema for the kind of state change which is being requested.

Details regarding the names, attributes and attribute values of data objects of the storage system may be provided in a collection of data object definitions 217. A particular data object such as 221A may include a collection of attributes 222 (e.g., attributes 222A and 222B), each of which may have a data type 223 (e.g., 223A and 223B) indicating a range or set of allowed values, or some other similar indicator of allowed values. In some embodiments, the range of allowed values may be indicated by the name of the data type—e.g., an "int32" data type may indicate that signed integer values which can be expressed using 32 bits are allowed. In various embodiments, the set of values permitted for a given attribute may be determined using a "maximum overlap" approach with respect to the attribute values permitted at the different member data stores, as discussed in further detail below with respect to FIG. 3. Some data objects may be organized hierarchically (in parent-child relationships) in at least one embodiment—e.g., data object 221A may comprise a set of child objects such as 225A, with each child object having its own attribute set and data types or allowed attribute values. In some embodiments, the data objects 221 may be considered analogous to tables of relational or non-relational databases, with the attributes 222 corresponding to table columns. Journal schemas 242 may comprise additional elements beyond those shown in FIG. 2 in one embodiment, while some of the elements shown in FIG. 2 may not be supported in other embodiments.

Figure 3:
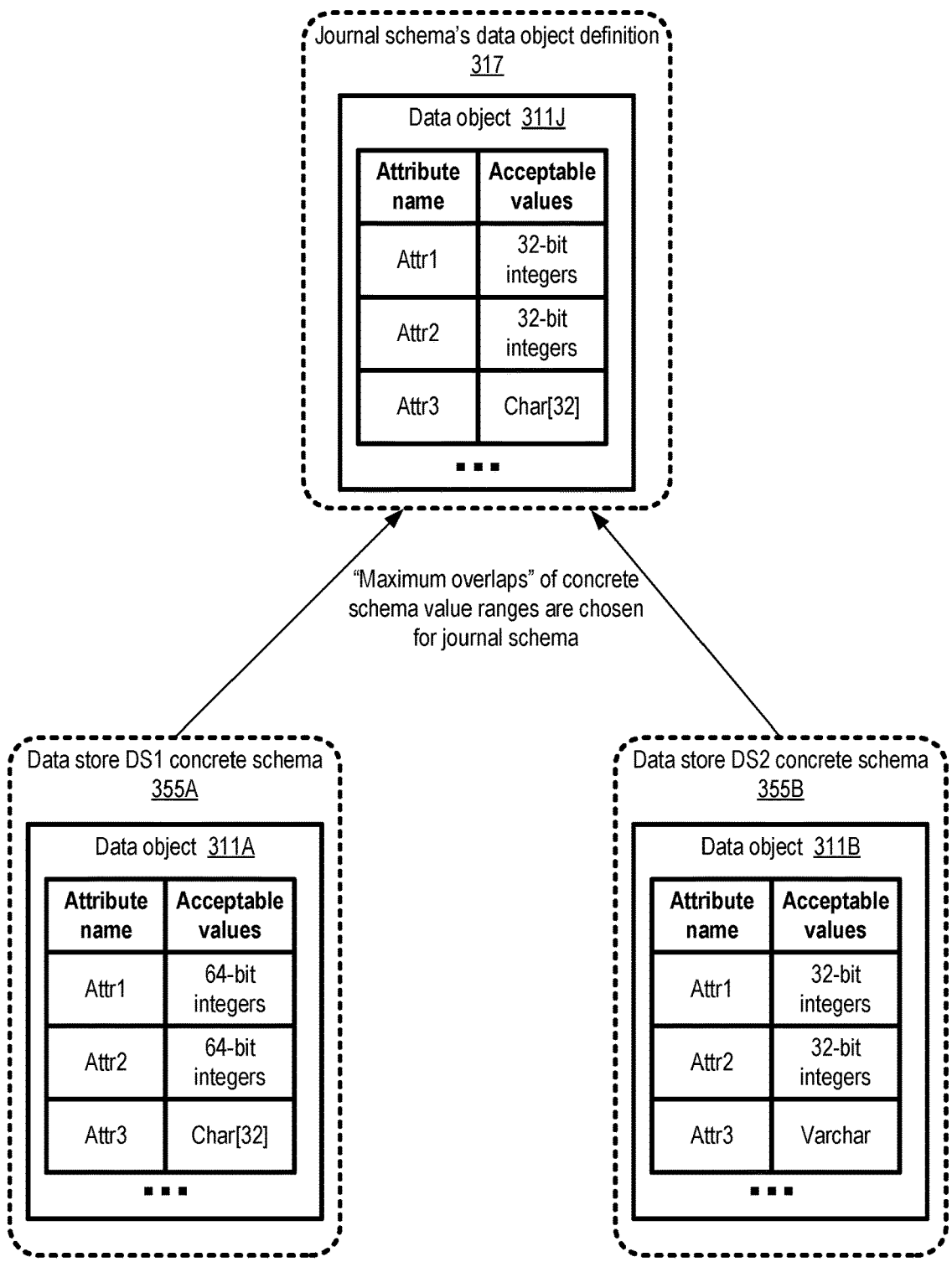
FIG. 3 illustrates examples of concrete schemas, each associated with a respective data store, and a data object definition portion of a corresponding journal schema, according to at least some embodiments.

In various embodiments, at least a portion of a journal schema 242 may be based on or derived from a collection of concrete schemas of the member data stores of the storage system. FIG. 3 illustrates examples of concrete schemas, each associated with a respective data store, and a data object definition portion of a corresponding journal schema, according to at least some embodiments. The storage system includes at least two member data stores DS1 and DS2 in the depicted embodiment. A given example data object may be represented using somewhat different attribute data types in the concrete schemas 355A and 355B of the data stores DS1 and DS2 respectively. For example, as specified in concrete schema 355A of data store DS1, values of attributes Attr1 and Attr2 of data object 311A may be stored as respective 64-bit integers, and values of attribute Attr3 may be stored as 32-element character arrays. In contrast, at data store DS2, concreate schema 355B indicates that Attr1 and Attr2 of data object 311B are stored as 32-bit integer values, while Attr3 may be stores as a variable-length character array (varchar). The particular details of the attribute values permitted at a given data store may depend on various factors, such as, for example, the limitations on the data types supported at the data store, the choices made by administrators when creating the concrete schemas 355, and so on. Some popular data stores may only provide support for 32-bit integers, for example for historical reasons, while others may support larger integer ranges.

When generating a journal schema to be shared for transactions associated with both DS1 and DS2, a "maximum overlap" approach towards allowable attribute values may be taken in at least some embodiments. For example, if at least one member data store (e.g., DS2) permits integer values of no more than 32 bits, while all the other data stores (e.g., DS1) support integers of at least 32 bits, then 32-bit integers may be selected for a corresponding integer-valued attribute Attr1 in the journal schema's corresponding data object definition 317. In this example, an integer represented using 32 bits would be compatible with all the data stores (DS1 and DS2), but an integer expressed using more than 32 bits could not be stored at DS2, so 32 bits represents the maximum common overlap. Similarly, although the varchar version of Attr3 in concrete schema 355B of DS2 may comprise more than 32 characters, a character array of 32 elements may be used for Attr3 in the journal schema to maintain compatibility with concrete schema 355A of DS1.

It is noted that in at least some scenarios, the attribute range limitations of a journal schema may not necessarily result from fundamental limitations of the underlying data stores—e.g., it may be the case that character arrays longer than 32 elements may be permitted at DS1, but the data store administrator of DS1 may nevertheless have chosen 32-element arrays as the data types to use for Attr3. In some embodiments, the member data stores may support non-overlapping data types: for example, all numerical quantities at one data store may be stored as objects of type "number", while numerical data types "integer" or "floating-point" may be supported at a different data store. In such scenarios, the journal schema may in some cases define a different data type (e.g., "NumericValue") which represents as much of an overlap as possible between the value ranges of the different data stores' numeric data types.

In various embodiments, the concept of maximal overlap may be also or instead be employed with respect to the set of attributes indicated in the journal schema. For example, consider an example scenario in which the data object represented by 311A in concrete schema 355A also includes another attribute Attr4, but the corresponding data object 311B of concrete schema 355B only includes Attr1, Attr2 and Attr3. In such a scenario, Attr4 may be excluded from the journal schema data object 311J, since values of Attr4 may not be stored in DS2. In some embodiments, a concrete schema of one data store may be modified (e.g., by the corresponding data store administrator) to accommodate data types of other member data stores—for example, in order to accommodate a 64-bit integer attribute of DS1, a combination of two 32-bit integer attributes may be included in a concrete schema of DS2. Of course, additional data object manipulation logic or code may have to be implemented to enable such transformations or extensions—e.g., software routines to convert a 64-bit integer into two 32-bit integers may have to be executed in the above example for each write of a data object 311.

If the member data stores support different types of data manipulation operations (e.g., different index creation requests), a common set of data manipulation operations that can be supported at all the data stores may be indicated in a transaction language of the journal schema in at least some embodiments. Thus, the approach of including the maximum overlapping functionality of the member data stores in the journal schema may extend to operation syntax in addition to attribute definitions and allowed value ranges.

Journal Schema Evolution

Figure 4:
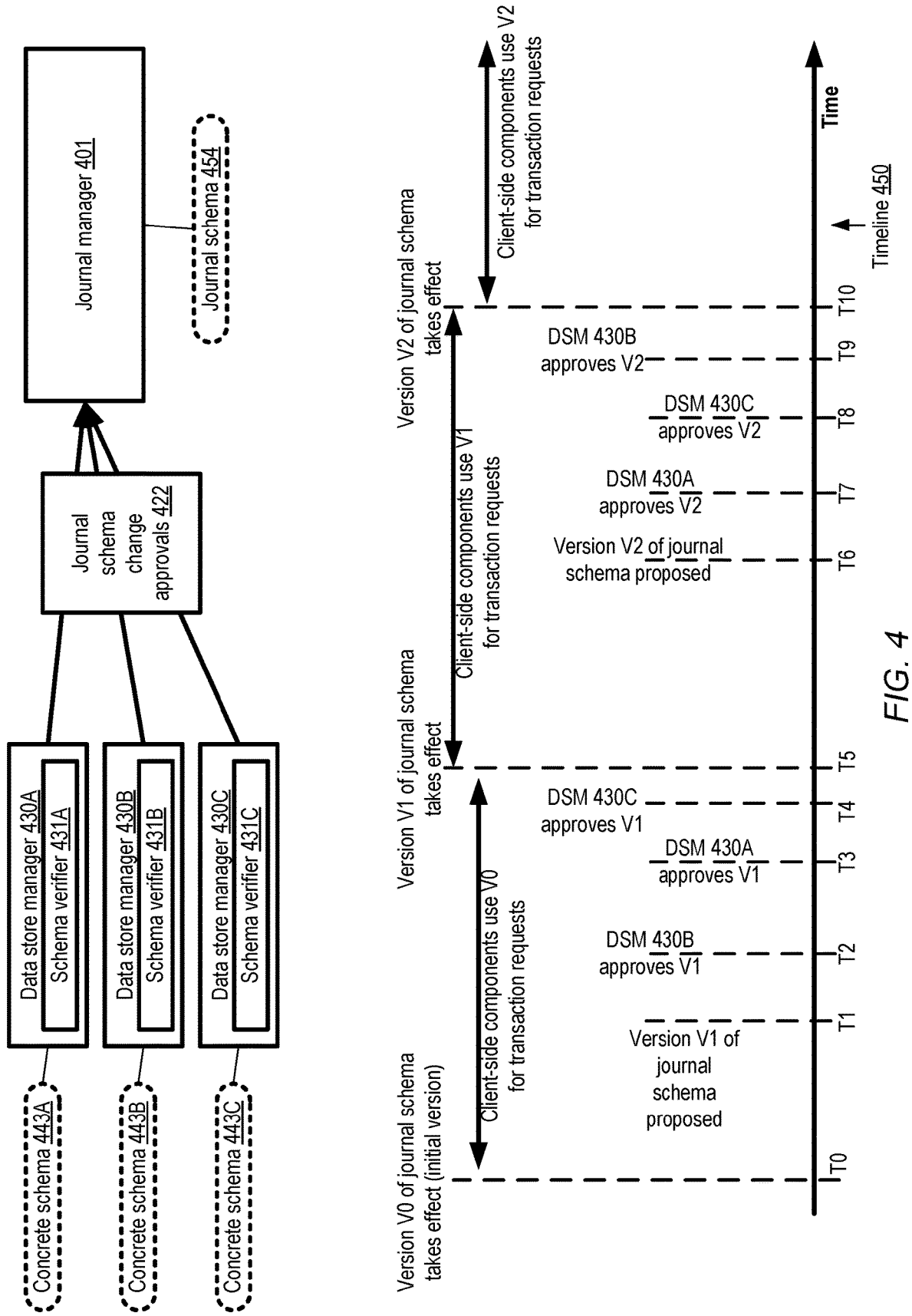
FIG. 4 illustrates an example of a timeline indicating respective periods in which different versions of a journal schema may be in effect at a multi-data-store storage system, according to at least some embodiments.

As mentioned above, the member data stores of a multi-data-store storage system may each have to agree to adopt a new version of a journal schema before that new version becomes effective. FIG. 4 illustrates an example of a timeline indicating respective periods in which different versions of a journal schema may be in effect at a multi-data-store storage system, according to at least some embodiments. The storage system comprises three data stores with respective data store managers 430A, 430B and 430C and respective concrete schemas 443A, 443B and 443C in the depicted embodiment. The journal manager 401 is the authoritative source of the version of the journal schema 454 that is in effect at the storage system at various points in time in the depicted embodiment. Before a new version of the journal schema takes effect, respective approvals 422 may have to be received from each of the member data store managers 430. Each data store manager 430 may comprise a respective schema verifier subcomponent 431 (e.g., schema verifiers 431A, 431B and 431C) which checks whether a proposed change to the journal schema is acceptable or compatible with respect to the corresponding concrete schema 443.

Timeline 450 illustrates a series of events which may occur at the storage system, resulting in changes to the version of the journal schema 454. At a time T0 on timeline 450, an initial version V0 of the journal schema takes effect. Time T0 may, for example, correspond to an initialization or bootstrapping stage of the multi-data-store storage system, in which each of the data stores may be brought online. The initial version of the journal schema may be read in, for example, from a respective configuration parameter file or repository in some embodiments by each of the data store managers 430. At time T1, a new version V1 of the journal schema may be proposed, e.g., in a schema change transaction request by a client-side component (or by one of the data store managers). The data store managers 430B, 430A and 430C may respectively verify that the proposed change is compatible with their respective concrete schemas at times T2, T3 and T4 of timeline 450 in the depicted example. Meanwhile, until all three of the members have approved the new version V1, the original version V0 may remain in effect. Version V1 of the journal schema may only take effect after all three approvals have been received at the journal and a corresponding commit record has been added to the journal, e.g., at time T5. Thus, during the interval between T0 and T5, client-side components may format their transaction requests (including the request to change the journal schema version) according to version V0.

After version V1 of the journal schema takes effect at time T5, client-side components which submit journal version requests to the journal manager 401 (or to the data store managers) may receive responses indicating the new version V1, and may start formatting their transaction requests in accordance with V1. In embodiments in which the client-side components receive their information regarding journal schemas from the data stores rather than from the journal, there may be some delay between T5 (the time at which a commit record entry associated with the journal schema change from V0 to V1 is added to the journal) and the time at which that commit record is applied or processed at the data stores and becomes readable from the data stores. Generally speaking, different data stores may process the commit entry for the journal change at different points in time. If the read set descriptor of a given transaction request spans a journal schema change (that is, if some of the data of the read set was read before a journal schema version change, and other data was read after the journal schema version change), in at least some embodiments the transaction request may be rejected by the journal manager.

In the example timeline 450, another version change of the journal schema (from version V1 to version V2) may be proposed at time T6. The journal managers 430A, 430C and 430B may approve the V1-to-V2 version change at times T7, T8 and T9 respectively, after which a commit entry representing the version change may be added to the journal at time T10. Between T5 and T10, version V1 may be used by client-side components for their transaction requests, and version V2 may be used after T10. Additional version changes proposed after T10 may also require the approval of all the member data store managers. It is noted that in various implementations, journal schema versions may typically change relatively infrequently compared to the rate at which data object modifications occur.

Asynchronous Application of Committed Writes at Member Data Stores

Figure 5:
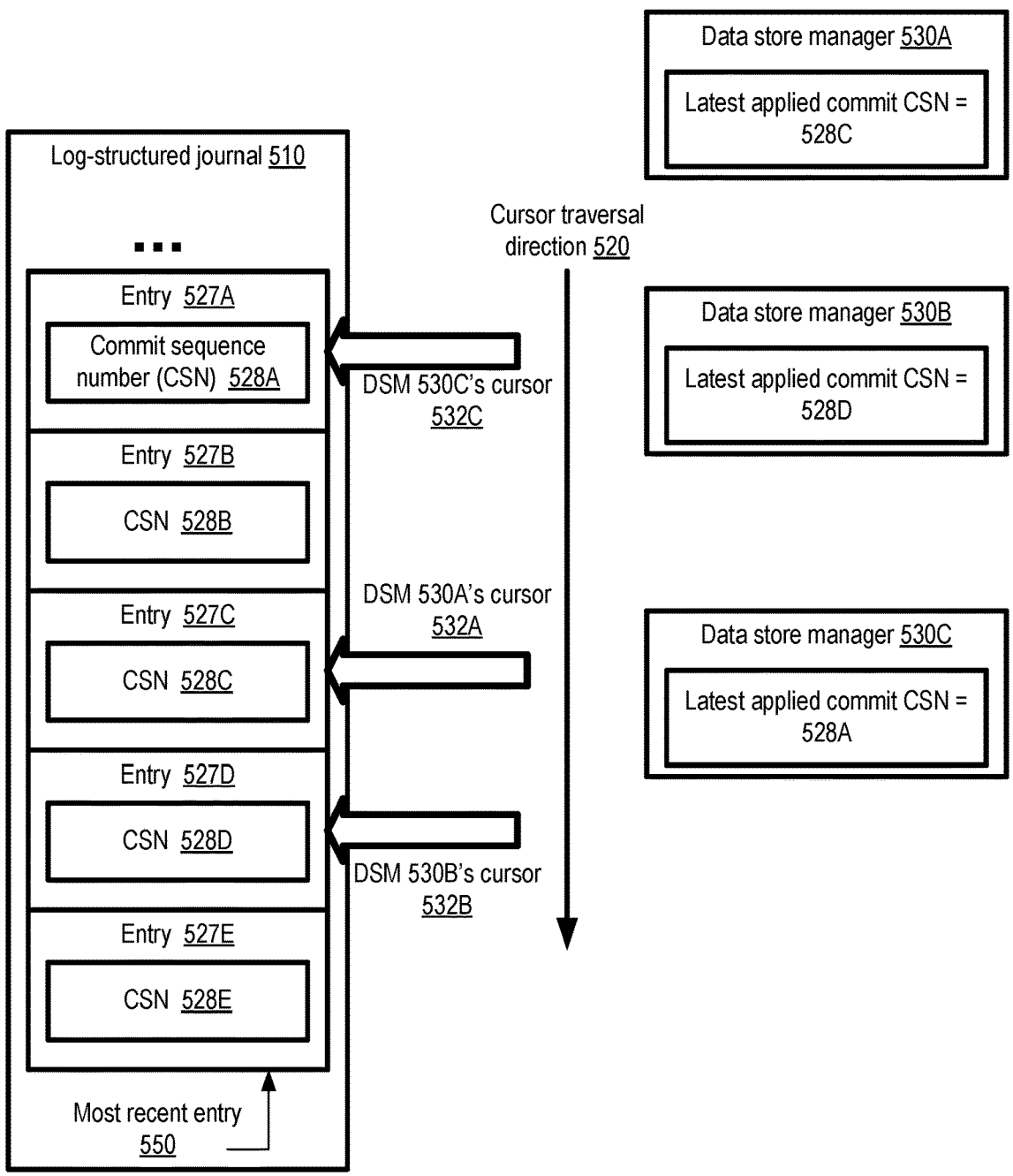
FIG. 5 illustrates an example of asynchronous processing of journal entries to materialize writes at various data stores, according to at least some embodiments.

As mentioned earlier, member data stores may differ from each other in various characteristics, including for example the rate at which they are capable of processing or applying committed reads. In various embodiments, the member data stores need not always remain synchronized with each other with respect to the replicated state machine represented by the journal set up for the storage system. FIG. 5 illustrates an example of asynchronous processing of journal entries to materialize writes at various data stores, according to at least some embodiments. At a point of time corresponding to FIG. 5, the journal 510 comprises a plurality of entries 527 inserted in order of respective commit sequence numbers (CSNs) 528, with the most recent entry 550 being entry 527E with CSN 528E. The most recent entry may sometimes be referred to as the "head" of the journal.

In effect, each of the data store managers may maintain a cursor onto the sequence of commit entries of the journal, and process the writes indicated in the entries in the order in which the entries were inserted into the journal. For example, cursor 532A is established for data store manager (DSM) 530A, cursor 532B is maintained for DSM 530B, and cursor 532C is maintained for DSM 530C in the depicted example. As mentioned above, in some embodiments write applier components of the storage system may propagate the writes indicated in the journal, and in such embodiments each such write applier may represent a cursor of the data store to which it propagates the writes. A write applier may be implemented, for example, as a separate process or thread of execution in some embodiments. As indicated by arrow 520, each of the cursors processes the entries of journal 510 in the same order, e.g., in increasing order of CSNs 528 of the entries. At the point of time illustrated in FIG. 5, writes corresponding to entries with CSNs up to 528C have been processed or applied at DSM 530A's data store, writes corresponding to CSNs up to 528D have been processed at DSM 530B, and writes corresponding to CSNs up to 528A have been processed at DSM 530C. As discussed above, in at least some embodiments, a given journal entry may represent either a committed change to a data object which may be materialized at one or more of the member data stores, or a committed change to a journal schema. In some embodiments, the journal schemas may be materialized at the data stores, e.g., as a special type of data object. In other embodiments, journal schemas may not be materialized at some or all of the data store members; instead, the journal itself may serve as the repository for materialized representations of journal schema versions.

Example Transaction Request Elements

Figure 6:
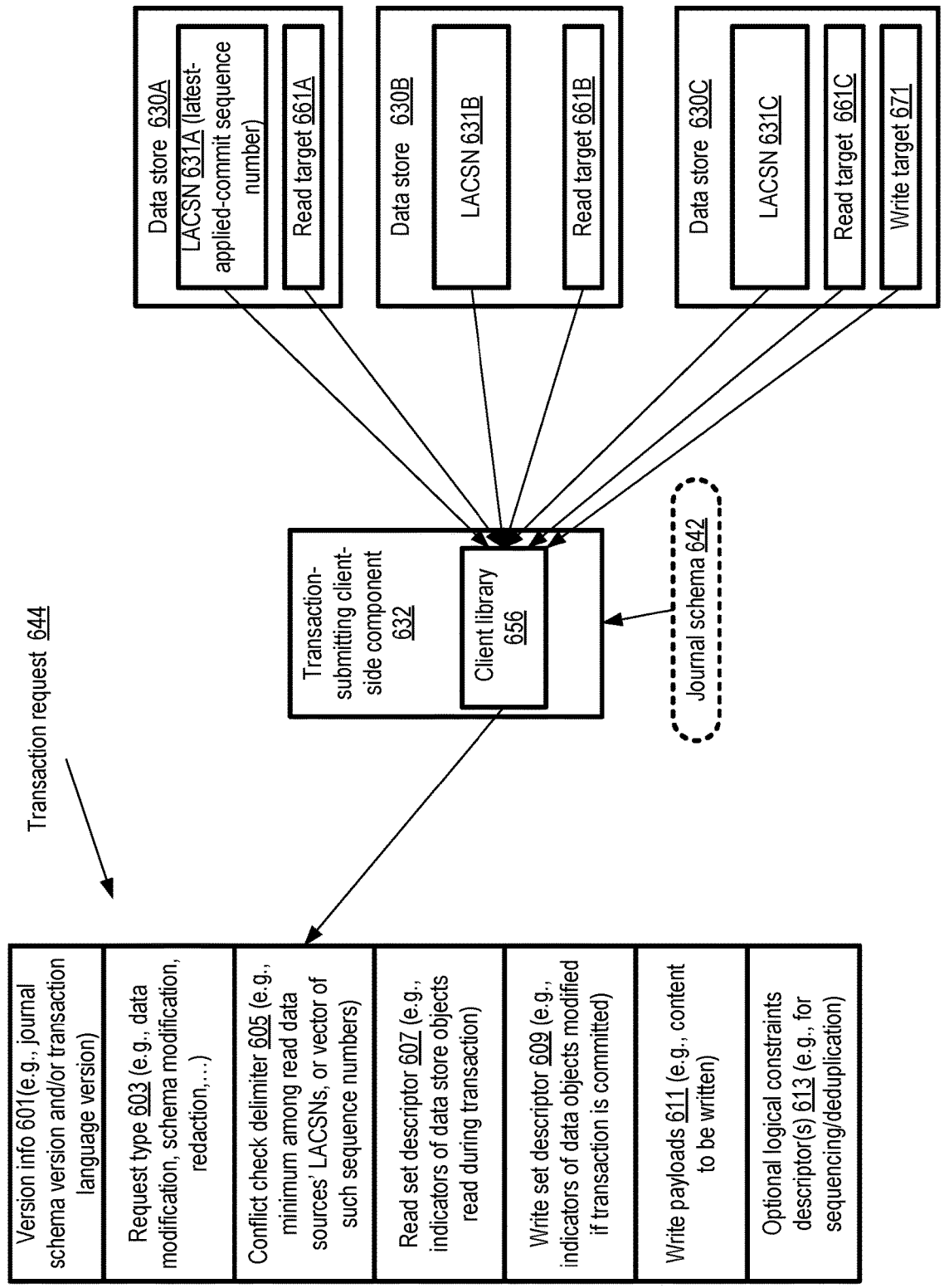
FIG. 6 illustrates an overview of transaction requests which may be submitted to a journal manager by a client-side component of a multi-data-store storage system, according to at least some embodiments.

FIG. 6 illustrates an overview of transaction requests which may be submitted to a journal manager by a client-side component of a multi-data-store storage system, according to at least some embodiments. As shown, transaction request 644 may include some combination of versioning information 601, a transaction type indicator 603, a conflict check delimiter 605, a read set descriptor 607, a write set descriptor 609, write payload(s) 611 and optional logical constraint descriptors 613 in the depicted embodiment. In the depicted embodiment, a client-side component 632 comprises a client library 656 which may be utilized to assemble or prepare the transaction request. In at least some embodiments, the client library may automatically record information about the read targets 661A, 661B, and 661C (e.g., corresponding to respective data objects whose attribute details are specified in the journal schema 642) respectively within data stores 630A, 630B and 630C from which data is read during the transaction. In some embodiments, as described below in further detail, the read set descriptors may be generated by applying transformation functions (e.g., hash functions) to the read queries. In various embodiments, information about the write target 671 (of data store 630C in the depicted example) to which data is written may also be recorded by the client library 656, e.g., by applying similar transformation functions to queries whose results may be affected by the writes. In some implementations, the client library 656 may also obtain, from each of the data stores 630, a corresponding latest-applied commit sequence number (LACSN) 631 (e.g., 631A-631C) of the most recent transaction whose writes have been applied at the data store.

In one embodiment, such LACSNs 631 may be retrieved before any of the reads of the transaction are issued to the corresponding data stores, for example. In another embodiment, the LACSNs 631 may be retrieved from a given data store 630 just before the first read that is directed to that data store within the current transaction is issued.

In the depicted embodiment, the version number of the journal schema 642 and/or the version number of the data-store independent transaction language being used for the transaction request 644 may be indicated in version information fields 601. In some embodiments, the transaction category (the type of state change being requested), such as whether a data object modification is being requested, a journal schema change is being requested, or a redaction is being requested, may be indicated in a separate request type field 603. In other embodiments, the request type may be implicit rather than explicit, e.g., the type of state change being requested may be apparent based on the write set descriptor and/or other elements of transaction request 644. The conflict check delimiter 605 may be derived from a function to which the LACSNs 631 are provided as input in some embodiments. For example, in one implementation, the minimum sequence number among the LACSNs obtained from all the data stores read during the transaction may be used. In another implementation, a vector or array comprising the LACSNs from each of the data stores may be included as the conflict check delimiter 605 of the transaction request descriptor. The conflict check delimiter 605 may also be referred to herein as a committed state identifier, as it represents a committed state of one or more data stores upon which the requested transaction depends.

As mentioned earlier, in some embodiments, transformation functions may be applied to read queries to generate the read set descriptor 607, and/or similar transformation functions may be applied to write-affected queries (a set of queries whose results may be affected by the proposed writes) to generate write set descriptor 609 in various embodiments. In some embodiments, instead of the query-based transformation, a selected transformation function may instead be applied to the locations/addresses of the read targets to obtain a set of hash values to be included in read descriptor 607. Similarly, a selected transformation function (either the same function as was used for the read descriptor, or a different function, depending on the implementation) may be applied to the location of the write(s) of a transaction to generate the write set descriptor 609 in some embodiments. In another embodiment in which read set descriptors and/or write set descriptors are generated based on locations rather than query contents, hashing may not be used; instead, for example, an un-hashed location identifier may be used for each of the read and write set entries. The write payload 611 may include a representation of the data that is to be written for each of the writes included in the transaction. Optional logical constraints 613 may include signatures used for duplicate detection/elimination and/or for sequencing specified transactions before or after other transactions in some embodiments. Some or all of the contents of the transaction request descriptor 644 may be stored as part of the journal entries (e.g., committed transaction records) in some embodiments.

It is noted that the read and write targets from which the read set descriptors and/or write set descriptors are generated may represent different storage granularities, or even different types of logical entities, in different embodiments or for different data stores. For example, for a data store comprising a non-relational database in which a particular data object is represented by a combination of container name (e.g., a table name), a user name (indicating the container's owner), and some set of keys (e.g., a hash key and a range key), a read set may be obtained as a function of the tuple (container-ID, user-ID, hash key, range key). For a relational database, a tuple (table-ID, user-ID, row-ID) or (table-ID, user-ID) may be used. In various embodiments, the journal manager may be responsible, using the contents of a transaction request and the journal, for identifying conflicts between the reads indicated in the transaction request and the committed writes indicated in the journal.

Conflict Detection Overview

Figure 7:
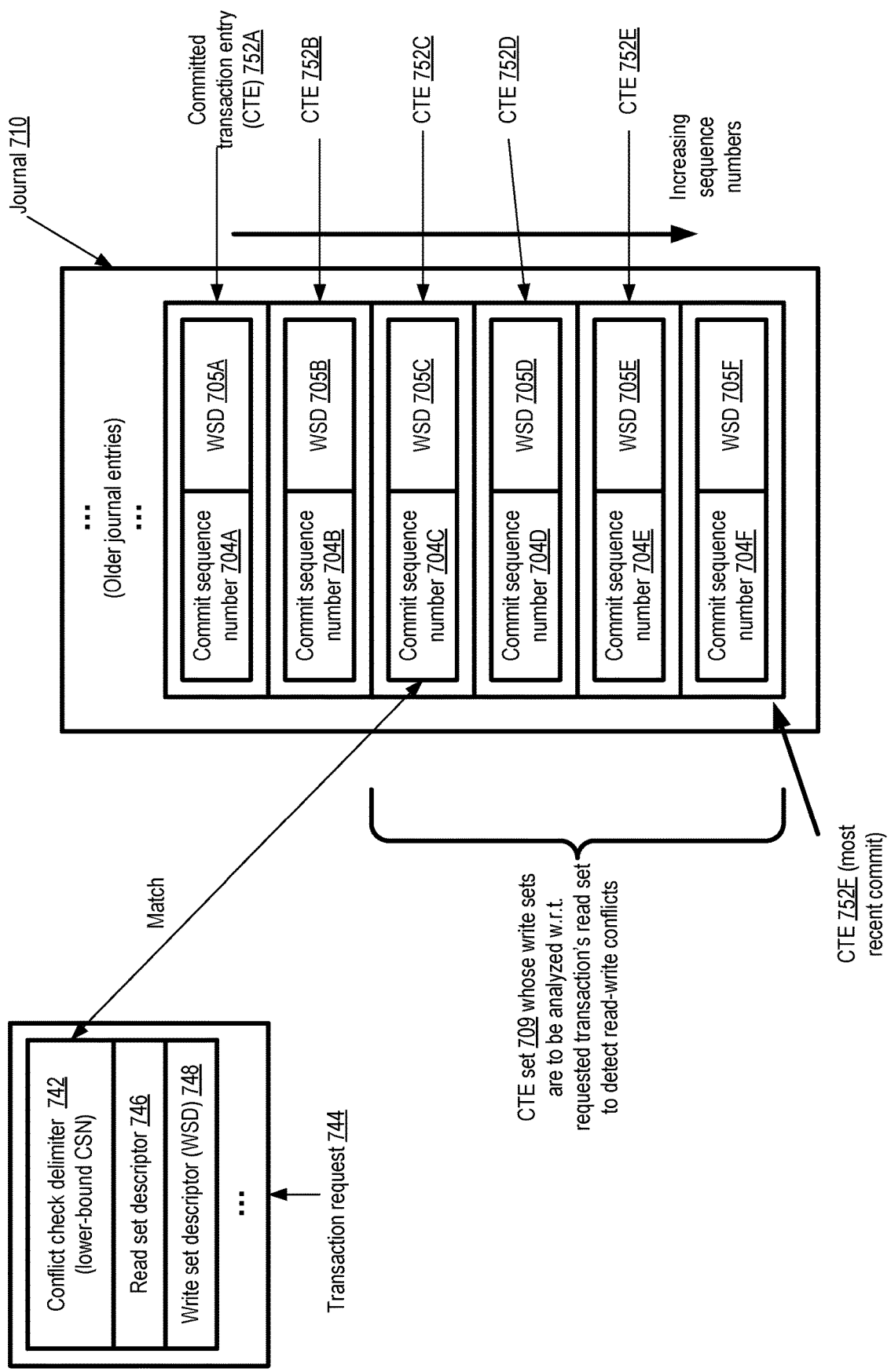
FIG. 7 illustrates an overview of conflict detection operations which may be performed by a journal manager, according to at least some embodiments.

FIG. 7 illustrates an overview of conflict detection operations which may be performed by a journal manager, according to at least some embodiments. In the depicted example, committed transaction entries (CTEs) 752 stored at journal 710 are shown arranged in order of increasing commit sequence numbers from the top to the bottom of the figure. The latest or most recently committed transaction is represented by CTE 752F, with commit sequence number (CSN) 704F and write set descriptor (WSD) 705F. Each of CTEs 752A, 752B, 752C, 752D and 752E comprise a corresponding CSN 704 (e.g., CSNs 704A-704E respectively) and a corresponding WSD 705 (e.g., WSDs 705A-705E).

As shown, transaction request 744 includes a conflict check delimiter (or committed state identifier) 742, a read set descriptor 746 and a write set descriptor 748. (The write payload of the requested transaction is not shown). The conflict detector of the journal manager may be required to identify a set of CTEs of journal 710 that are to be checked for conflicts with the read set of the requested transaction. The conflict check delimiter 742 indicates a lower-bound CSN that may be used by the conflict detector to identify the starting CTE of set 709 to be examined for read-write conflicts with the requested transaction in the depicted embodiment, as indicated by the arrow labeled "Match". Set 709 may include all the CTEs starting with the matching sequence number up to the most recent committed transaction (CTE 752F) in some embodiments. If any of the writes indicated by the CTE set 709 overlap with any of the reads indicated in the transaction request 744, such a read-write conflict may lead to a rejection of the requested transaction. A variety of mechanisms may be used to check whether such an overlap exists in different embodiments. In one embodiment, for example, one or more hashing-based computations or probes may be used to determine whether a read represented in the read set descriptor 746 conflicts with a write indicated in the CTE set 709, thereby avoiding a sequential scan of the CTE set. In some implementations, a sequential scan of CTE set 709 may be used, e.g., if the number of records in the CTE set is below a threshold. If none of the writes indicated in CTE set 709 overlap with any of the reads of the requested transaction, the transaction may be accepted, since none of the data that were read during the preparation of the transaction request can have changed since they were read. In at least one embodiment, a transaction request may also indicate an upper bound on the sequence numbers of journal entries to be checked for conflicts—e.g., the conflict check delimiter may indicate both a starting point and an ending point within the set of CTEs 752.

Journal Implementation Using Replication DAGs

Figure 8:
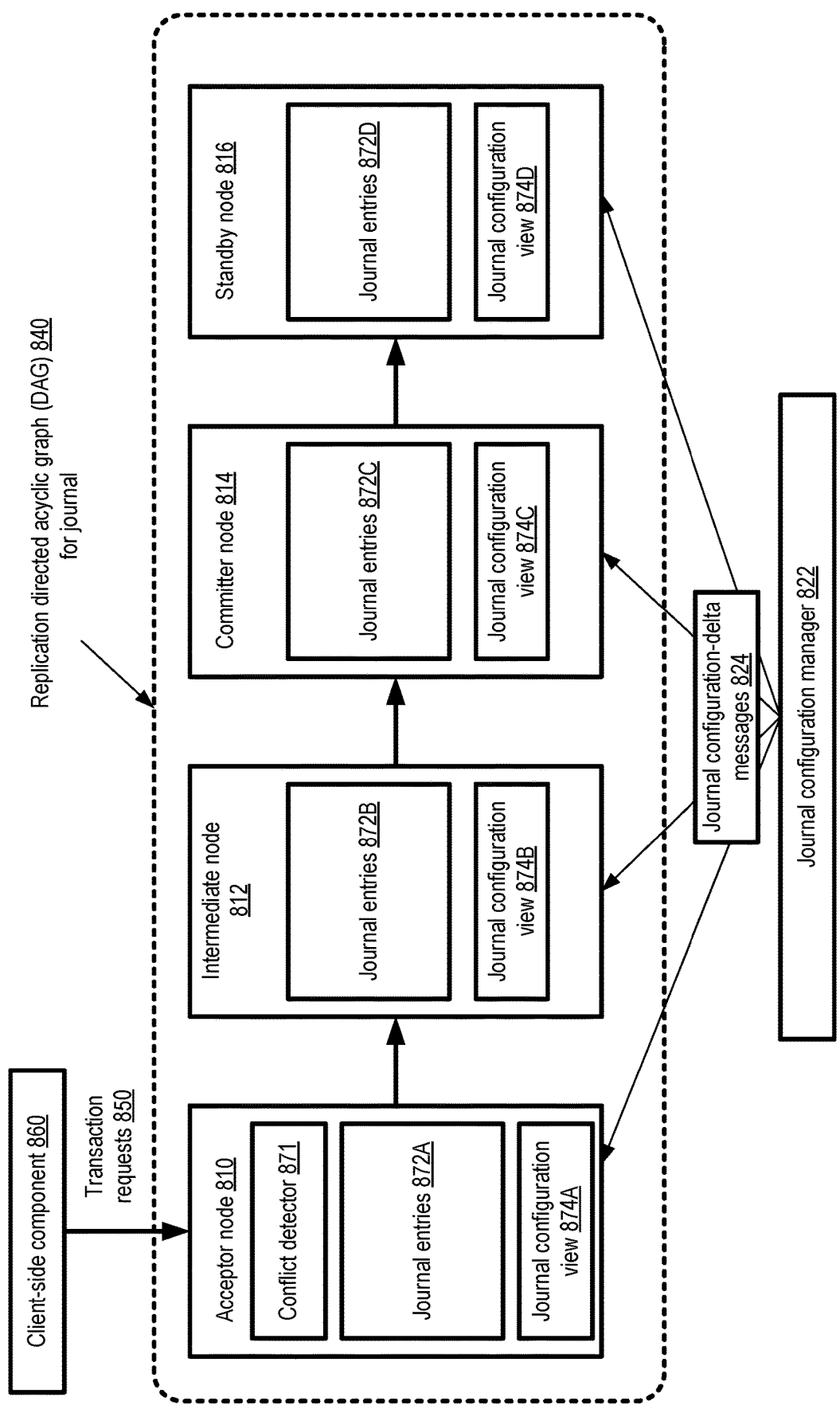
FIG. 8 illustrates an example replication directed acyclic graph (DAG) which may be used to implement a journal of a multi-data-store storage system, according to at least some embodiments.

In some embodiments, the journal of a multi-data-store storage system may be replicated for enhanced data durability and/or higher levels of availability. FIG. 8 illustrates an example replication directed acyclic graph (DAG) which may be used to implement a journal of a multi-data-store storage system, according to at least some embodiments. In general, a replication DAG 840 may include one or more acceptor nodes 810 to which transaction requests 850 may be submitted, one or more committer nodes 814, zero or more intermediary nodes 812 each positioned along a replication pathway comprising DAG edges leading from an acceptor node to a committer node, and zero or more standby nodes 816 that are configured to quickly take over responsibilities of one of the other types of nodes in the event of a node failure. In the embodiment depicted in FIG. 8, the acceptor node includes a conflict detector 871 of the journal manager. In other embodiments, instead of being incorporated within an acceptor node, the conflict detector may be implemented separately.

In at least some embodiments, each node of a particular replication DAG such as 840 may be responsible for replicating journal entries. The journal entries may be propagated along a set of edges from an acceptor node to a committer node of the DAG along a replication pathway. In FIG. 8, the current replication pathway starts at acceptor node 810, and ends at committer node 814 via intermediary node 812. For a given journal entry (e.g., an entry indicating a committed data object modification, a committed journal schema change, or a redaction entry), one replica may be stored at each of the nodes along the replication path, e.g., in journal entries 872A, 872B and 872C. Each journal entry propagated within the DAG may include a respective sequence number or a logical timestamp that is indicative of an order in which the corresponding transaction request was processed (e.g., at the acceptor node 810). When a particular journal entry reaches a committer node, e.g., after a sufficient number of replicas of the entry have been saved along the replication pathway, the corresponding transaction may be explicitly or implicitly committed. If for some reason a sufficient number of replicas cannot be created, the journal entries may be logically and/or physically removed (e.g., by setting a "removed" flag) in some embodiments from the nodes (if any) at which they have been replicated thus far. After a commit, the writes of the transaction may be propagated or applied to a set of destinations (such as storage devices at which the contents of the member data stores are located) as described earlier, e.g. by respective write appliers. In some implementations, only a subset of the DAG nodes may be read in order to propagate committed writes to their destinations. In other embodiments, journal entries may be read from any of the DAG nodes to propagate the changes. In at least one embodiment, write appliers or cursors may be implemented as respective threads or processes that may run at the same hosts at one or more of the DAG nodes. In other embodiments, write appliers may run on different hosts than the DAG nodes. A journal entry may also be transmitted eventually to standby node 816, and a replica of it may be stored there after it has been committed, so that the standby node 816 is able to replace a failed node of the DAG quickly if and when such a failover becomes necessary.

A journal configuration manager 822 may be responsible for managing changes to DAG configuration (e.g., when nodes leave the DAG due to failures, or join/re-join the DAG) by propagating configuration-delta messages 824 asynchronously to the DAG nodes in the depicted embodiment. Each configuration-delta message may indicate one or more changes to the DAG configuration that have been accepted or committed at the journal configuration manager 822. In some embodiments, each replication node may implement a respective deterministic finite state machine, and the journal configuration manager may implement another deterministic finite state machine.

The protocol used for managing DAG configuration changes may be designed to maximize the availability or "liveness" of the DAG in various embodiments. For example, the DAG nodes may not need to synchronize their views of the DAG's configuration in at least some embodiments; thus, the protocol used for transition record propagation may work correctly even if some of the nodes along a replication pathway have a different view of the current DAG configuration than other nodes. In FIG. 8, each of the nodes may update its respective DAG configuration view 874 (e.g., 874A, 874B, 874C or 874D) based on the particular sequence of configuration-delta messages it has received from the configuration manager 822. It may thus be the case, in one simple example scenario, that one node A of a DAG 840 continues to perform its state transition processing responsibilities under the assumption that the DAG consists of nodes A, B, C and D in that order (i.e., with a replication pathway A-to-B-to-C-to-D), while another node D has already been informed as a result of a configuration-delta message that node C has left the DAG, and has therefore updated D's view of the DAG as comprising a changed pathway A-to-B-to-D. The configuration manager may not need to request the DAG nodes to pause processing of transactions and corresponding journal entries in at least some embodiments, despite the potentially divergent views of the nodes regarding the current DAG configuration. Thus, the types of "stop-the-world" configuration synchronization periods that may be required in some state replication techniques may not be needed when using replication DAGs of the kind described herein to implement persistent journals for distributed transaction management. Although a linear replication pathway is shown in FIG. 8, in general, a replication pathway may include branches at least at some points of time (e.g., during periods when some DAG nodes have received different configuration delta messages than others). Under most operating conditions, the techniques used for propagating DAG configuration change information may eventually result in a converged consistent view of the DAG's configuration at the various member nodes, while minimizing or eliminating any downtime associated with node failures/exits, node joins or node role changes. It is noted that in some embodiments, journal entries may be stored without using the kinds of replication DAGs illustrated in FIG. 8.

In at least some embodiments, the nodes of a replication DAG may each be implemented as a respective process or thread running at a respective host or hardware server. The hosts themselves may be physically dispersed, e.g., within various data centers of a provider network. Networks set up by an entity such as a company or a public sector organization to provide one or more services (such as various types of multi-tenant and/or single-tenant cloud-based computing or storage services) accessible via the Internet and/or other networks to a distributed set of clients or customers may be termed provider networks in this document. Provider networks may also be referred to as "public cloud" environments. Some or all of the data stores for which transaction support is provided using the techniques described herein may be established using network-accessible database services and/or other storage services of a provider network in some embodiments. In one embodiment, a provider network at which journal-based transactions are implemented may be organized into a plurality of geographical regions, and each region may include one or more availability containers, which may also be termed "availability zones" herein. An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container. In some such embodiments, one or more nodes of a replication DAG 840 may be implemented at a different availability container than other nodes of the replication DAG, thereby increasing the robustness and durability of the journal.

Methods Utilizing Journal Schemas

Figure 9:
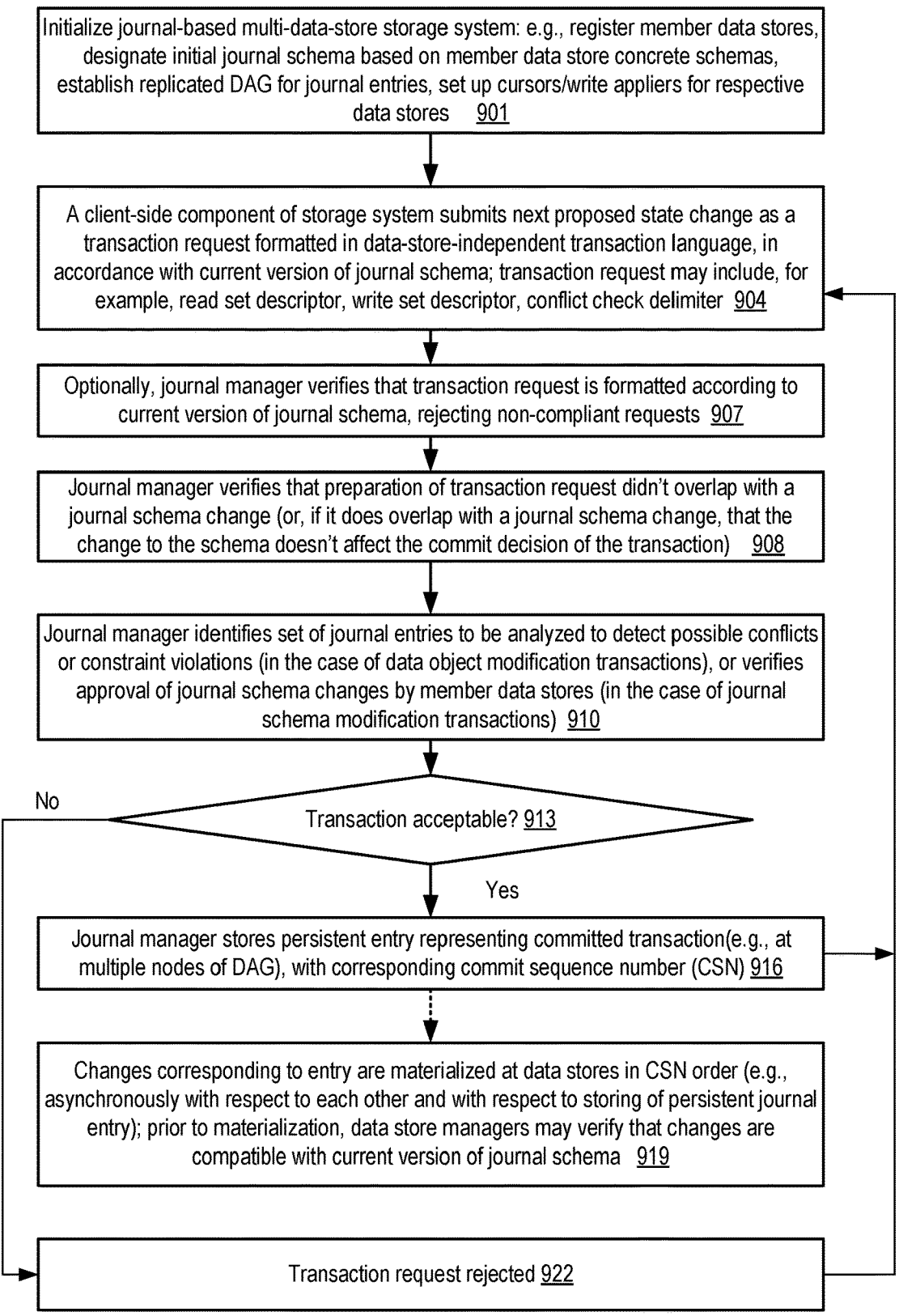
FIG. 9 is a flow diagram illustrating aspects of operations that may be performed at a journal-based multi-data-store storage system in which transaction requests are formatted in accordance with a journal schema, according to at least some embodiments.

FIG. 9 is a flow diagram illustrating aspects of operations that may be performed at a journal-based multi-data-store storage system in which transaction requests are formatted in accordance with a journal schema, according to at least some embodiments. The storage system may be initialized (element 901), for example, by registering the member data stores, designating an initial version of a journal schema, establishing a replicated DAG for the journal entries, instantiating a journal manager, and setting up write appliers or cursors into the journal which are to propagate committed writes to the member data stores. Each of the member data stores may have a respective concrete schema specifying characteristics of the data objects on which transactions are to be managed using the journal, and the journal schema may be based at least in part on the various concrete schemas of the members. As discussed in the context of FIG. 3, the set or range of values allowed for various data object attributes in the journal schema may be selected to maximize the overlap between the value ranges permitted by the concrete schemas. In addition to the data object definitions, the journal schema may also include or reference a specification of a data-store-independent transaction language to be used to submit transactions of various categories, e.g., data object modification transactions, journal schema modification transactions, redaction transactions, and the like.

After the storage system has been initialized, client-side components may begin offering or submitting proposed changes to the state of the system, e.g., in the form of transaction requests formatted in the transaction language indicated in the current version of the journal schema (element 904). The transaction requests may be directed to the journal manager. In at least some embodiments, the client-side component may obtain the current version of the journal schema from the journal manager, while in other embodiments the client-side component may obtain the journal schema from a member data store. The contents of a transaction request may include, for example, a read set descriptor indicating the data objects (if any) read during the preparation of the transaction, a write set descriptor indicative of the data objects to be modified or written if the transaction is committed (where the writes may depend on the read set), and a conflict check delimiter indicating a committed state of the storage system corresponding to the read set (i.e., the state of the storage system at the time that the reads were performed). In some embodiments, the contents of the transaction request may differ based on the category of the transaction—e.g., a transaction that indicates a proposed change to a journal schema may not necessarily include a conflict check delimiter.

In some embodiments, the journal manager may optionally check whether a submitted transaction request is compliant with the current version of the journal schema (element 907), and may reject non-compliant transaction requests. In other embodiments, the journal manager may not verify compliance with the journal schema, and may rely on the client-side components to generate transaction requests compliant with the journal schema version currently in effect. In one implementation, a transaction request may include a field indicating the version of the journal schema (and/or the version of the transaction language) used to prepare the request, and the journal manager may examine the version information contained in the request. If the version information indicates an outdated version of the journal schema or the transaction language, the request may be rejected.

As indicated in element 908, in at least some embodiments the journal manager may verify that the transaction request preparation did not overlap with a journal schema change. For example, consider a scenario in which the earliest commit sequence number of a read corresponding to the read set of the transaction is CSN-A, and the transaction commit decision is being made when the most recently approved commit has a sequence number CSN-B (where CSN-B is greater than CSN-A). In this example, the observed state of the multi-data-store storage system with respect to the preparation of the transaction request corresponds to CSN-A, and the current state of the system corresponding to the making of the commit decision corresponds to CSN-B. If a schema version change was committed with a CSN that lies between CSN-A and CSN-B, this may indicate that the journal schema was changed after at least a portion of the transaction request was prepared, and before the commit decision corresponding to the transaction request is made. Such an overlap with a schema change may result in inconsistencies, and transactions which indicate such overlaps may be rejected in at least some embodiments. In one optimized variation of this approach, if the journal manager identifies a particular journal schema change which was approved/committed after or during the preparation of the transaction, but that change does not affect the commit decision for the transaction (e.g., if the journal schema change doesn't modify the attributes represented in the read set and/or the write set), the transaction may not be rejected purely on the basis of the overlap with the schema change. (Of course, such a transaction may still be rejected due to read-write conflicts or for other reasons such as a violation of a sequencing constraint or a de-duplication constraint). In some implementations, a hash-based representation of the kinds of journal schema changes represented in a given journal entry may be used to determine whether a given journal schema change could impact a proposed transaction. For example, if an overlapping journal schema change with respect to a proposed transaction PT1 affects only a particular attribute Attr1 of a table Table1 (and a hash value indicating Table1 or Attr1 is stored, e.g., in the entry for the schema change), while a proposed transaction PT1 does not access or modify Table1 (as indicated by hash values corresponding to PT1's read set and/or write set), PT1 may not be rejected purely on the basis of the overlap.

The journal manager may perform the operations required to determine whether the state changes of the proposed transaction are acceptable (element 910). For a data object modifying transaction, such operations may include, for example, identifying a subset of the journal entries whose write set descriptors are to be considered when determining whether a read-write conflict exists with the read set of the transaction request. The conflict check delimiter may indicate a commit sequence number which can be used to identify one boundary of the subset in some embodiments, while the most recent commit entry of the journal may indicate the other boundary. If no read-write conflicts are detected, and if the transaction requests does not violate any other constraints (such as de-duplication constraints or transaction ordering constraints), the data object modifying transaction request may be designated as acceptable. In the case of a transaction request for a journal schema change, the journal manager may have to determine whether all the member data store managers of the storage system have approved the change before the journal schema version change is committed. In some embodiments, such approvals may be indicated by special approval entries submitted by the data store managers to the journal manager and stored in the journal, and the journal manager may defer approving the journal schema version change until all the required approval entries have been received and stored. In other embodiments, the journal manager may transmit schema change approval requests to the data store managers and wait until affirmative responses have been received from all the data store managers before committing a journal change transaction. Other categories of transactions may have their own approval protocols in various embodiments—e.g., redaction transactions may be approved after verifying that the submitter of the redaction transaction has the appropriate authorization.

If the proposed transaction is deemed acceptable (as determined in element 913), a persistent entry representing the commit of the requested transaction may be added to the journal (element 916). In some embodiments, the journal entry may have to be replicated at a plurality of DAG nodes as described above with respect to FIG. 8 before the transaction commit is considered complete. A commit sequence number indicative of the order in which the transaction was processed relative to other transactions may be generated and stored in the journal entry in various embodiments. Some or all of the transaction request contents (e.g., the version information, the write set descriptor, the read set descriptor, the conflict check delimiter, etc.) may be included in the journal entry in some embodiments.

Depending on the transaction category, the writes or state changes of the transaction may be materialized at or propagated to one or more member data stores, e.g., by respective write applier processes or modules (element 919). Not all the writes may be materialized at all the member data stores in at least some embodiments. The relative timing of the materialization of a given transaction's changes may differ from one member data store to another in various embodiments. In some embodiments, the write appliers or cursors of at least some of the member data stores may proceed independently of and asynchronously with respect to each other (and independently/asynchronously with respect to the journal entry insertions), processing the journal entries in sequence number order. In one embodiment, write may be applied to at least one of the data stores synchronously with respect to the creation of the corresponding journal entries. In some embodiments, a data store manager may verify, prior to the application of a particular write, that the write is compliant with the current version of the journal schema. If a proposed transaction is not found acceptable (e.g., due to a read/write conflict, a constraint violation or the like) (as also detected in operations corresponding to element 913), the transaction request may be rejected (element 922). In some implementations, an indication of a transaction rejection such as an error message may be provided to the client-side component. After the processing of a given transaction request is complete, the journal manager may process the next transaction request received from a client-side component (e.g., operations corresponding to elements 904 onwards may be repeated).

Snapshot Management at Journal-Based Storage Systems

Figure 10:
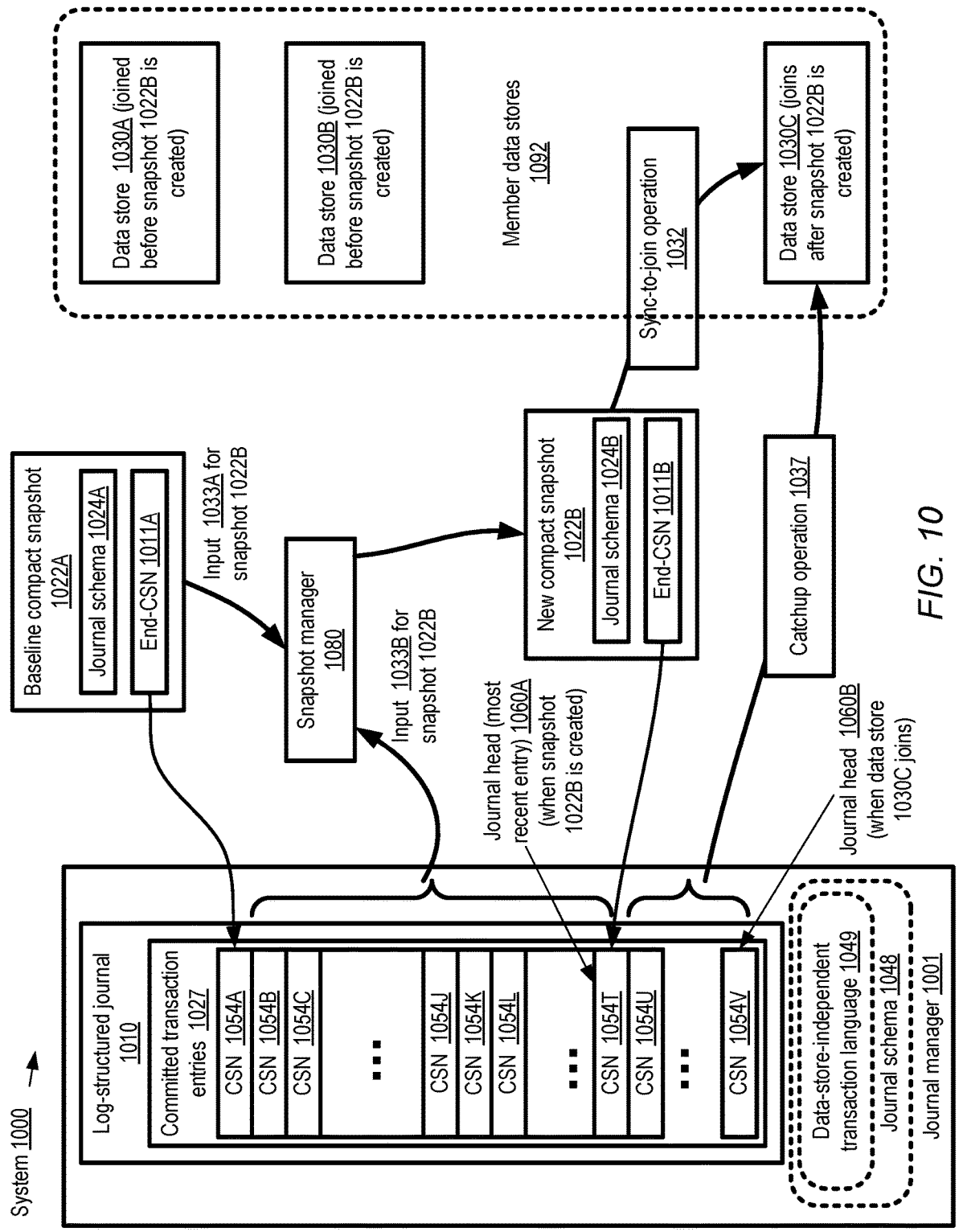
FIG. 10 illustrates an example system environment in which compact snapshots of journal entries may be generated to enable efficient synchronization of a new data store with the state of a journal-based multi-data-store storage system, according to at least some embodiments.

FIG. 10 illustrates an example system environment in which compact snapshots of journal entries may be generated to enable efficient synchronization of a new data store with the state of a journal-based multi-data-store storage system, according to at least some embodiments. System 1000 includes a journal manager 1002, a plurality of data stores 1030 (such as 1030A, 1030B and 1030C) and a snapshot manager 1080. A log-structured journal 1010 comprises a plurality of committed transaction entries 1027 (e.g., 1027A-1027V) which are appended or added to the journal in the order in which the corresponding commit decisions were made by the journal manager 1002, e.g., using the kinds of conflict detection and other analysis discussed earlier. Each committed transaction entry 1027 includes a commit sequence number (CSN) 1054 (e.g., 1054A-1054V) indicative of the order of the commit decisions. The most recently added journal entry at a given point in time is referred to as the "head" of the journal. The entries 1027 are added to the journal in response to receiving transaction requests from client-side components of the database (the client-side components are not shown in FIG. 10). The transaction requests and the corresponding journal entries are formatted in accordance with a data-store-independent transaction language 1049 indicated in a journal schema 1048. Various journal entries 1027 may represent respective state changes of a replicated state machine of the multi-data-store database implemented using the journal. Conceptually, the current state of the database may be determined by applying the respective state changes indicated in the journal entries 1027 in the order in which the entries were stored (e.g., in CSN order). The journal may thus be considered the authoritative source of the state of the database in various embodiments.

Each of the member data stores 1092 (e.g., data stores 1030A-1030C) of the storage system may typically materialize at least a subset of the data objects indicated in the journal schema 1048. In at least some embodiments, different data stores may join the database at different points in time. When a data store is added to the database (e.g., by registering it as a member using a programmatic interface), the state of the new data store may have to be synchronized with the state of the database so that the data objects materialized at the new data store correspond to the state indicated for those objects in the journal 1010. One way to do this would be to traverse all the entries of the journal in CSN sequence, applying the respective relevant state changes (i.e., those state changes whose effects are materialized at the new data store) indicated therein at the new data store. Over time, however, the number of journal entries may grow very large, and performing a sequential scan to process all the entries may not be a very efficient approach.

Accordingly, in various embodiment a snapshot manager 1080 may be configured to create various compact snapshots of the journal 1010 over time. Each compact snapshot may comprise a list of entries, e.g., formatted in the same transaction language as is used for the journal entries, corresponding to the set of data objects which may be materialized at one or more of the member data stores. In one simple example, consider a scenario in which the database consists of 100000 records at a given point in time T1, and that at least a portion of each of the 100000 records is materialized at one or more of the member data stores. Furthermore, assume that the set of journal entries to be considered for inclusion in a snapshot contains only entries corresponding to record modifications (i.e., no entries for journal schema changes, redactions etc. need to be considered in this example). Some or all of the records may have had several writes committed—e.g., an initial write operation to create the record, followed by some number of updates. Also, some records may have been created and deleted, so that the journal itself may include entries for more than 100000 separate records. In this scenario, a journal snapshot created by the snapshot manager 1080 corresponding to time T1 may contain 100000 entries, with each entry comprising a compact state change representation of the corresponding record. The state change representation of a record may be deemed "compact" in that several different changes committed to the record may be represented by a single cumulative state change. For example, consider a given record which was created with the equivalent of the statement "insert into Table1 (primaryKey, integerAttribute1) values (pk1, int1)" (in the syntax of the transaction language 1049). Following the creation of the record, the value of integerAttribute1 was set to int2 (e.g., using the equivalent of "update Table1 set integerAttribute1 to int2 where primaryKey=pk1" in the transaction language 1049), then to int3, and then to int4 in respective transactions represented by corresponding journal entries. In a compact state change representation of the record with primary key pk1, the equivalent of the single insert statement "insert into Table1 (primaryKey, integerAttribute1) values (pk1, int4)" may suffice to represent the creation of the record as well as all the successive changes of integerAttribute1 from int1 to int2 to int3 to int4.

In short, in cases where one or more changes to a data object are overridden by or masked by a subsequent change, the compact state change representation may be able to exclude the overridden state change(s), and only indicate a single cumulative or "net" state change corresponding to the most recent committed state of the data object. In at least some embodiments, each compact snapshot may include an indication of the last CSN represented in that snapshot (i.e., the CSN of the most recent journal entry that was analyzed to generate the compact snapshot). In one embodiment, no entries may be included in the snapshot for data objects that were deleted during the time period (or CSN range) associated with the snapshot. Thus, depending on the mix of database operations (e.g., how many updates are applied to a given data object on average, or how many objects are created and then deleted), the compact snapshot may at least in some cases contain substantially fewer entries than the cumulative collection of journal entries for the data objects in existence at the time of snapshot creation. Synchronizing a newly-added data store using a compact snapshot may often be much more efficient than if all the journal entries were applied in sequence to the new data store. In some embodiments, a compact snapshot may also include an indication of a journal schema version with which the snapshot's entries are compliant or compatible. For example, if a snapshot Snap-x's last CSN is CSN1, and version Vk of the journal schema of the storage system was in effect when the entry with CSN1 was added to the journal, Snap-x may include a representation of version Vk of the journal schema. In at least some embodiments, the syntax and format of all of a given snapshot's entries may correspond to the journal schema version effective at the time that the snapshot was created (i.e., the journal schema version in effect when the entry with the snapshot's last CSN was inserted into the journal). This approach of ensuring that all the entries comply with a single journal schema version may be used in some embodiments even if the set of journal entries from which the Snap-x was generated includes one or more journal schema version modification entries.

New snapshots may often be created relative to earlier-created snapshots, e.g., by using the earlier-created snapshots as baselines and adding (or removing) entries based on more recently-committed state changes. In the embodiment depicted in FIG. 10, for example, a baseline compact snapshot 1022A representing state changes in journal entries with CSNs up to 1054A exists at the time that snapshot manager 1080 starts generating a new compact snapshot 1022B. The journal schema version 1024A with which the entries of compact baseline snapshot 1022A are compliant may be indicated in the baseline snapshot. The end-CSN entry 1011A of baseline snapshot 1022A indicates the most recent journal entry whose changes are represented in the baseline snapshot. At the time that snapshot manager starts generating new compact snapshot 1022B, the head entry 1060A of the journal 1010 has a CSN 1054T in the example scenario shown in FIG. 10. Therefore, new compact snapshot 1022B is created using two inputs: baseline snapshot 1022A as input 1033A, and the collection of journal entries which have been added since baseline snapshot 1022A (i.e., entries with CSNs 1054B-1054T) as input 1033B. To produce new compact snapshot 1022B, the snapshot manager may start with the baseline snapshot 1022A in the depicted embodiment, and process the collection of newer journal entries, adding/removing state change representations for each of the data objects of the database as of the state corresponding to CSN 1054T. The number of entries (with respect to data objects) in new compact snapshot 1022B may correspond to the number of data objects in the multi-data-store database in a state corresponding to CSN 1054T. The end-CSN entry 1011B of the new compact snapshot may therefore indicate CSN 1054T. The entries of the new snapshot 1022B may be compliant with journal schema version 1024B (which may or may not differ from the baseline snapshot's journal schema version 1024A, depending on whether any journal schema modifications are included in the entries with CSNs 1054B-1054T which were processed for generating the new snapshot). In some embodiments, when the storage system is initially brought online (e.g., without any data objects), a special initial snapshot may be created, containing (a) no state change representations and (b) a representation of the initial journal schema version of the storage system. The special initial snapshot may be used as the baseline for the first snapshot which is to include state change entries corresponding to data objects added to the storage system.

In the example scenario shown in FIG. 10, data stores 1030A and 1030B may have joined the database before snapshot 1022A is created, and may not need to be synchronized using a newer compact snapshot. In contrast, data store 1030C joins the database after snapshot 1022B is created. The head entry of the journal has a CSN 1054V at the time that data store 1030C joins. In order to synchronize the state of data store 1030C with the database, the entries of compact snapshot 1022B may be applied to data store 1030C in sync-to-join operation 1032 in the depicted embodiment. After the new data store has been made up-to-date with respect to compact snapshot 1022B, the entries which have been added since compact snapshot 1022B was created (e.g., entries with higher CSNs than the end-CSN of snapshot 1022B) may also be applied to the new data store 1030C in catchup operation 1037.

It is noted that in at least some embodiments, when creating a new snapshot, the snapshot manager may encounter journal entries corresponding to journal schema changes, redactions, and/or other special types of entries which do not represent data object modifications as such. A redaction entry, which may indicate that some set of earlier-committed transactions can be ignored or bypassed, may be handled in a special phase of snapshot processing as described in further detail below. Changes to the journal schema may be treated in a manner analogous to changes to a data object in at least some embodiments, e.g., a single journal schema change entry may be included in the snapshot, representing all the accumulated journal schema changes which may have been committed in the collection of journal entries examined for the snapshot. As indicated above, in at least some embodiments a representation of the journal schema version which was effective at the time that the snapshot creation began may be included in the snapshot, e.g., regardless of whether any journal schema modification entries were processed during the creation of the snapshot.

As suggested in FIG. 10, a snapshot manager 1080 may operate asynchronously with respect to the commit decisions made by the journal manager 1001 in at least some embodiments. That is, a stream of transaction requests may continue to be processed by the journal manager during the time it takes the snapshot manager to create any given snapshot. In some embodiments, the snapshot manager may be implemented as a separate process, thread of execution, or module from the journal manager. In one embodiment, a snapshot manager may comprise one or more threads of execution of a multi-threaded journal manager. The scheduling of the creation of new compact snapshots may differ from one embodiment to another. In some embodiments, for example, one or more programmatic interfaces such as a web-based console, an API, a command-line tool or the like may be implemented to enable client-side components of the database to request the creation of a new snapshot. In one embodiment, new snapshots may be created periodically, e.g., once every X minutes or hours, and/or each time K new journal entries have been added. In the embodiment depicted in FIG. 10, a compact snapshot such as 1022B may be considered cumulative, in that it takes into account all the state changes that have been incorporated into its baseline snapshot 1022A, so that a new data store may only need to apply the changes indicated in the most-recently created snapshot. In other embodiments, incremental rather than cumulative snapshots may be created in at least some cases—e.g., snapshot 1022B may not include at least some of the state information incorporated on earlier-created snapshots. In the latter scenario, a new data store may have to be synchronized using a combination of several different snapshots. A combination of cumulative and incremental snapshots may be generated in some embodiments—e.g., once a day, a cumulative snapshot may be created, and incremental snapshots based on that cumulative snapshot may be created every six hours.

Figure 11:
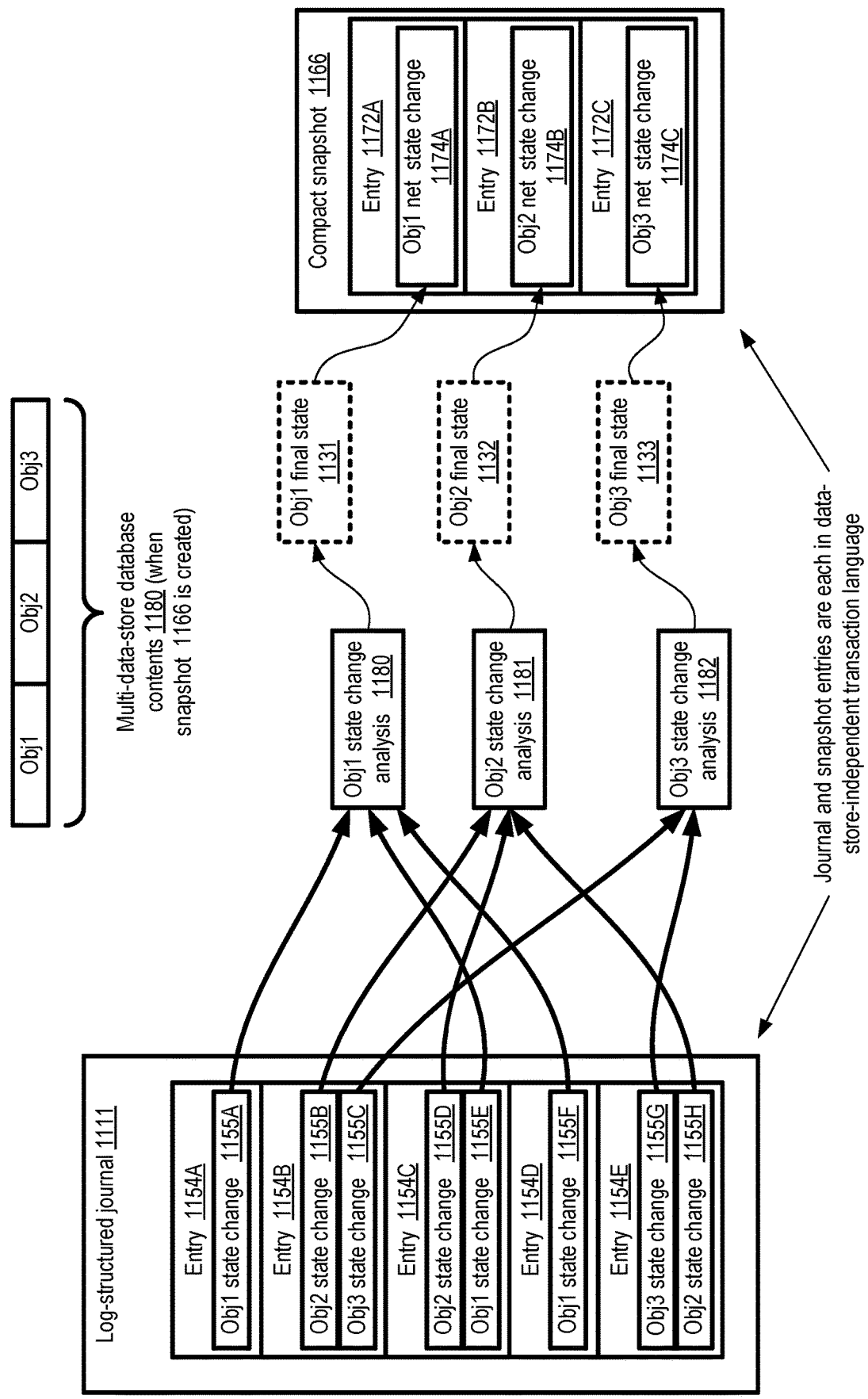
FIG. 11 illustrates example operations that may be performed with respect to each data object of a multi-data-store storage system during snapshot creation, according to at least some embodiments.

FIG. 11 illustrates example operations that may be performed with respect to each data object of a multi-data-store storage system during snapshot creation, according to at least some embodiments. In the extremely simplified scenario depicted in FIG. 11, the multi-data-store database 1080 includes only three objects at the time that a compact snapshot 1166 is created: Obj1, Obj2 and Obj3. The collection of committed transaction entries to be processed for the snapshot 1166 comprises entries 1154A-1154E. The snapshot 1166 is the first snapshot created for the database (i.e., there is no baseline snapshot to be consumed as input when generating snapshot 1166) in the example scenario.

To prepare the compact snapshot 1166, the snapshot manager (not shown in FIG. 11) analyzes the entries 1154 in order, identifying all the state changes or write operations that affect each of the data objects. In at least some embodiments, only a single pass through the set of entries 1154 may be required, while in other embodiments as described below with respect to FIG. 24, multiple passes may be used. As mentioned earlier, a given committed transaction entry 1154 may in general include writes directed to more than one data object—for example, entry 1154B includes state change 1155B directed to Obj2, as well as state change 1155C directed to Obj3. The snapshot manager's state change analysis 1180 with respect to Obj1 includes consideration of entries 1154A, 1154C and 1154D in the illustrated example. Applying the respective Obj1 state changes (1155A, 1155E and 1155F) indicated in each of those three entries in order, the snapshot manager determines the "final" state 1131 (with respect to snapshot 1166) of Obj1. Similarly, state change analysis 1181 with respect to Obj2 takes the cumulative effects of state changes 1155B, 1155D and 1155H of entries 1154B, 1154C and 1154E respectively into account, arriving at final state 1132 of Obj2. Final state 1132 of Obj3 is determined based on analysis 1182 of state change 1155C (in journal entry 1154B) followed by state change 1155G (in journal entry 1154E).

The snapshot manager generates a respective compact or "net" state change entry corresponding to each data object, and stores three such entries in snapshot 1166—e.g., entry 1172A representing a net state change 1174A to Obj1, entry 1172B representing a net state change 1174B to Obj2, and entry 1172C representing a net state change 1174C to Obj3. The snapshot entries use the same transaction language that is used for journal entries, such that similar machinery or logic to that which is used to apply writes of committed transaction entries in the journal to a given data store may be used to apply the entries of the snapshot 1166 in the depicted embodiment. As in the trivial example shown in FIG. 11, the number of entries in a snapshot may often be smaller than the number of journal entries represented in the snapshot. In effect, the work done by the snapshot manager in the embodiment depicted in FIG. 11 may be considered analogous to two transformations for each data object: a first transformation to accumulate effects of all the individual state changes committed to the data object to obtain a "final" state of the data object, and then a transformation of that final state into a net state change request formatted in the data-store-independent language.

Figure 12:
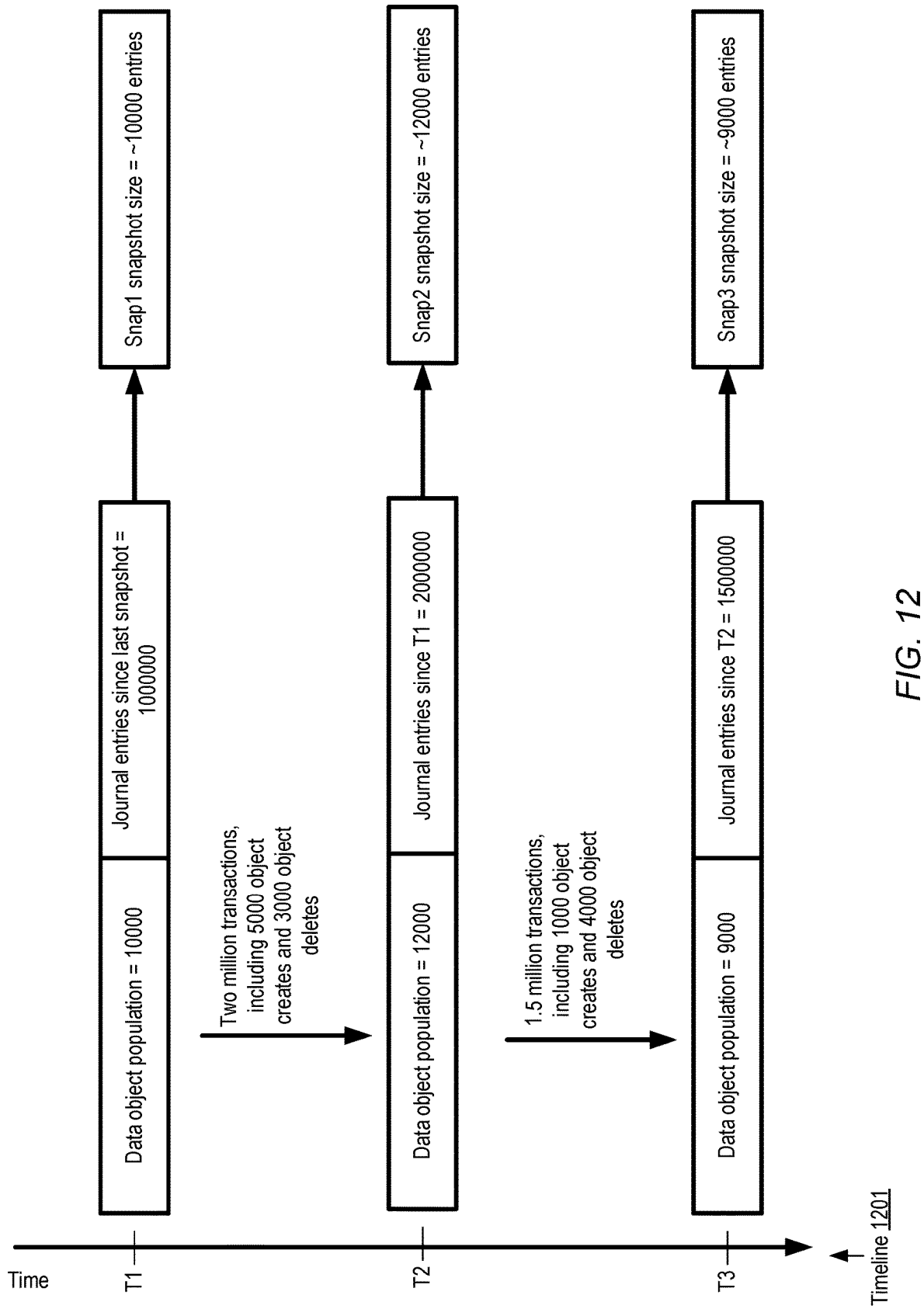
FIG. 12 illustrates an example timeline illustrating respective properties of successive compact snapshots which may be generated at a multi-data-store storage system, according to at least some embodiments.

FIG. 12 illustrates an example timeline illustrating respective properties of successive compact snapshots which may be generated at a multi-data-store storage system, according to at least some embodiments. In timeline 1201, time elapses from the top to the bottom of FIG. 12. Three compact snapshots Snap1, Snap2 and Snap3 of the storage system are created, respectively at times T1, T2 and T3 along the timeline 1201.

At time T1, there are 10000 data objects in the storage system, and one million entries have been added to the journal of the storage system since the last snapshot was generated. As a result of the compaction of state change representations for individual data objects, Snap1 only has to include approximately 10000 entries (the exact number of snapshot entries may be slightly different from 10000 depending on whether journal schema version changes have been approved since the previous snapshot, and/or whether other types of journal entries such as redaction entries are present in the million entries). Thus, a million journal entries are in effect condensed into about 10000 journal entries expressed in the same data-store-independent transaction language used for the journal entries.

Between T1 and T2, two million transactions are committed at the storage system, including 5000 creates (new data objects added to the system) and 3000 deletions of data objects. There are thus two million new journal entries to be analyzed to generate snapshot Snap2. The data object population increases to 12000 between T1 and T2, and as a result Snap2 contains approximately 12000 entries. Between T2 and T3, one and a half million transactions are committed, including 1000 object creates and 4000 object deletes. To generate snapshot Snap3, one and a half million entries may be analyzed, but the number of entries in Snap3 is only approximately 9000 (corresponding to the data object population at T3). Thus, despite a large number of transactions between T1 and T3, the snapshot needed to represent the state of the system at T3 is actually smaller than the snapshot needed to represent the state of the system at T1. As illustrated in FIG. 12, in journal-based storage systems in which multiple changes are frequently committed to the same data object in respective transactions, the sizes of the compact snapshots may often be significantly smaller than the set of corresponding journal entries, thus enabling more efficient synchronizations of newly registered data stores using the snapshots than if the journal itself is used for synchronizations.

Figure 13:
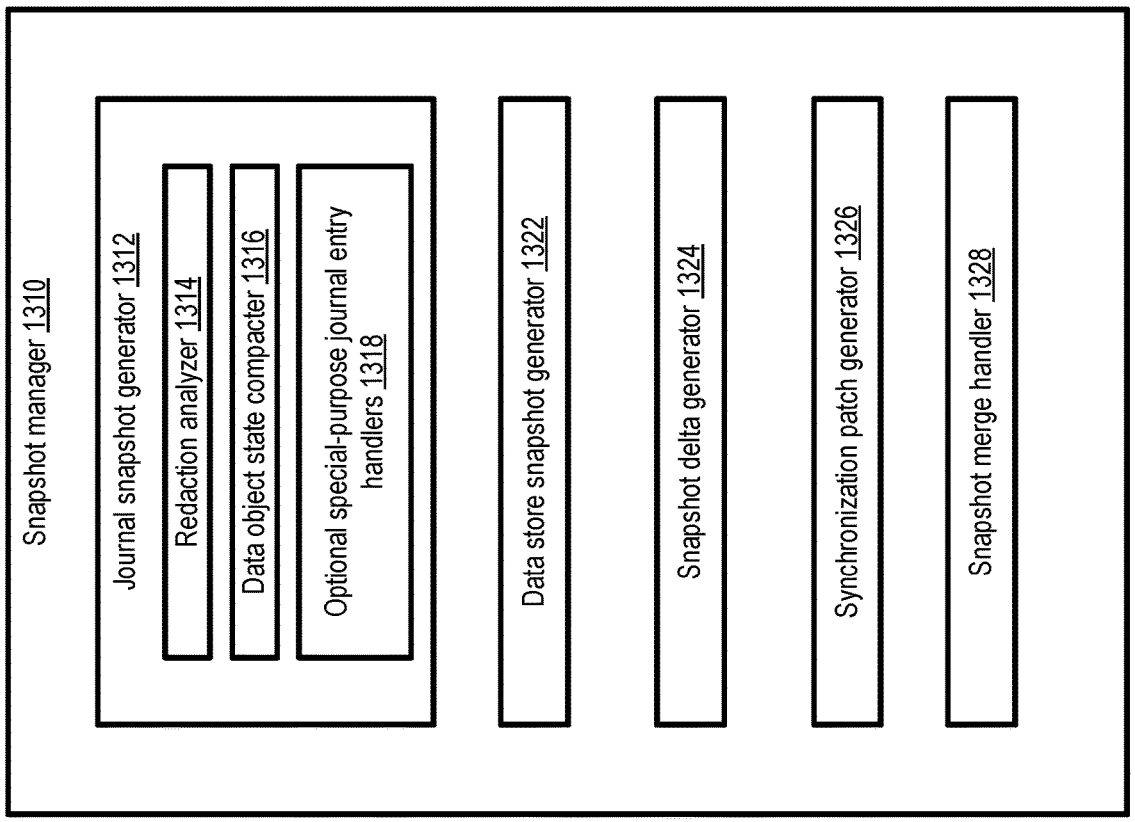
FIG. 13 illustrates example components of a snapshot manager of a multi-data-store storage system, according to at least some embodiments.

FIG. 13 illustrates example components of a snapshot manager of a multi-data-store storage system, according to at least some embodiments. As shown, the snapshot manager 1310 may include a journal snapshot generator 1312, which in turn may include subcomponents such as a redaction analyzer 1314, a data object state compactor 1316 and one or more optional special-purpose journal entry handlers 1318. As discussed below in further detail, in at least some embodiments redaction entries may be inserted into the journal under some types of error conditions, with each such redaction in effect canceling or negating the effects of one or more previously entered journal entries. The redaction analyzer 1314 may be responsible for ensuring that a snapshot does not reflect changes of entries that have been redacted in the depicted embodiment. For example, the snapshot generation procedure may comprise two phases in some implementations: one phase to detect and process redaction entries (if any are present in the collection of journal entries from which the snapshot is to be generated) and another phase in which the remaining (non-redacted) entries are processed. The data object state compactor 1316 may generate the compact state change representations of the data objects that have not been redacted in the depicted embodiment, e.g., using the kind of operations illustrated in FIG. 11. In some embodiments, special handling may be required for some categories of transactions, such as journal schema version changes and the like, which may not necessarily correspond to materialized data objects of the storage system. To handle various types of special cases, respective special-purpose journal entry handlers may optionally be instantiated in some embodiments. In other embodiments, some or all of the journal entries which do not correspond to materialized data objects may be handled by the data object state compactor 1316—e.g., journal schema changes may be considered analogous to data object changes with respect to snapshot generation.

In the embodiment depicted in FIG. 13, snapshots may be created either from the journal or from a data store at which some or all of the data objects of the system are materialized. The data store snapshot generator 1322 may, for example, examine contents of a given data store as of a particular point in time, and generate a collection of compact state change representations that would (e.g., if applied to an empty data store) lead to the same state as the examined state of the given data store. In some embodiments as discussed below, such a snapshot may be useful for synchronizing the state of a data store that has deviated from the authoritative state of the storage system represented by the journal. In some embodiments, respective data store snapshot generators 1322 may be instantiated for each different type of member data store—e.g., if the storage system includes a relational database from vendor V1 as one member and a non-relational database from vendor V2 as another member, respective snapshot generators may be included for each of the two types of members. In at least one embodiment, a data store snapshot generator may be implemented separately from a journal snapshot manager, e.g., as a control-plane component of the storage system. In various embodiments, a data store snapshot may be formatted in the same data-store-independent transaction language as is used for the journal entries and for the journal snapshots.

Snapshot delta generator 1324 may, as implied by the name, be responsible for generating the differences or deltas between a given pair of snapshots. Different combinations of snapshots may be compared in various embodiments—e.g., the delta between a journal snapshot and a particular data store snapshot may be obtained, or the delta between two journal snapshots may be obtained, or the delta between two data store snapshots obtained from respective different members of the storage system may be obtained, or the delta between two snapshots of the same member data store may be obtained. Such deltas may also comprise a list of snapshot entries formatted in the data-store-independent transaction language in at least some embodiments. Such a delta may be used in some embodiments by synchronization patch generator 1326 to determine the set of state changes (collectively referred to as a patch) which may be required to bring two data stores (or one data store and the journal) to the same state. In some embodiments in which incremental rather than cumulative snapshots are generated as discussed earlier, the snapshot manager 1310 may also include a snapshot merge handler 1328 configured to combine two or more snapshots into one. In some embodiments one or more of the snapshot manager subcomponents shown in FIG. 13 may not be implemented, or additional subcomponents not shown in FIG. 13 may be included in the snapshot manager.

Figure 14:
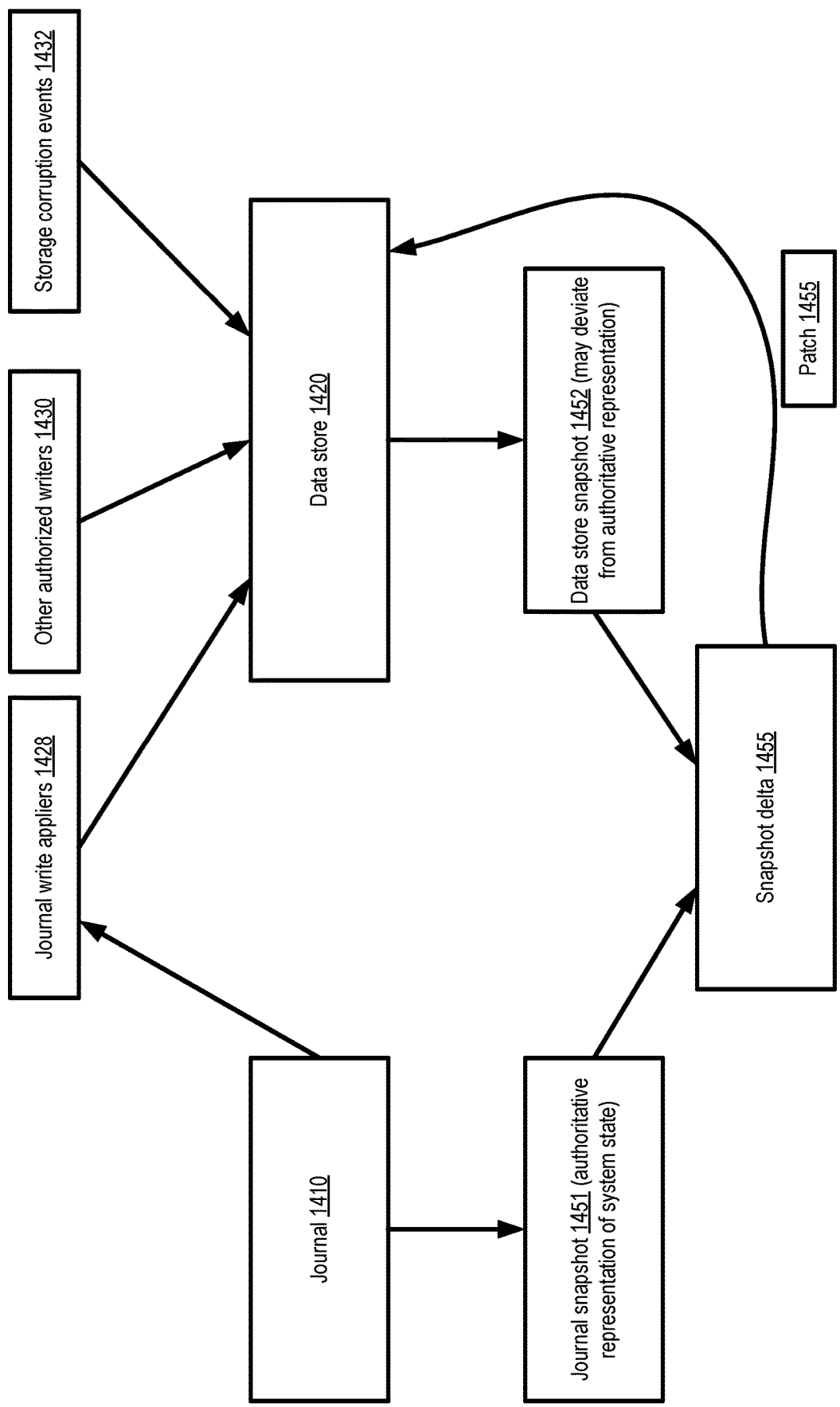
FIG. 14 illustrates an example of the generation of a patch derived from a comparison of snapshots, according to at least some embodiments.

FIG. 14 illustrates an example of the generation of a patch derived from a comparison of snapshots, according to at least some embodiments. In the embodiment depicted in FIG. 14, a storage system includes journal 1410 and one or more member data stores such as data store 1420 at which respective portions or all of the data objects of the storage system are materialized. Writes indicated as part of committed transactions in the entries inserted into journal 410 may be propagated to the data store 1420 by one or more journal write appliers 1428. However, there may be additional sources of changes to the data objects materialized at data store 1420 in the depicted embodiment. For example, rights to modify data objects of data store may be granted to various administrators and/or non-administrative users; such entities are represented in FIG. 14 by the block labeled "other authorized writers" 1430. In addition, as is possible with many types of storage devices, the devices used to hold the materialized data objects at data store 1420 may be subject to corruption events 1432 (such as random bit errors, disk head crashes, and the like) which may also change contents of one or more data objects. Thus, in general, the changes which occur at a data store 1420 may not be limited to the changes which are indicated in the committed transaction entries of the journal 1410. As a result, the contents of a given data store may diverge from the contents of the journal (or more precisely, diverge from what would be stored at the data store if only the relevant changes of the journal were materialized at the data store).

In the depicted embodiment, a respective compact snapshot may be generated from the journal 1410 and from the data store 1420. The journal snapshot 1451 may be considered the authoritative representation of the state of the system as of the time the snapshot was created (e.g., the time corresponding to an end-CSN indicated in the journal snapshot 1451). The data store snapshot 1452 may diverge or deviate from the journal snapshot, e.g., as a result of changes introduced by other authorized writers 1430 and/or storage corruption events 1432. Of course, if committed data object state changes which occurred after the generation of journal snapshot 1451 are applied to the data store before the data store snapshot 1452 is generated, such writes may also result in differences from the journal snapshot 1451. A snapshot delta 1455 may be created in the depicted embodiment, e.g., by the snapshot manager, indicative of the differences between the journal snapshot 1451 and the data store snapshot 1452. The snapshot delta may be formatted in the same transaction language used for the journal entries and for the snapshots 1451 and 1452. If desired (e.g., at the request of the data store manager or an administrator), the entries of the snapshot delta 1455 may be applied as a patch 1455 to the data store 1420 to synchronize the data store with the authoritative state of the system represented by journal snapshot 1451. In some embodiments, respective data store snapshots obtained from different data stores may similarly be compared to each other (e.g., instead of being compared to a journal snapshot) to determine whether one data store deviates from the other, and patches may be applied to resynchronize the data stores with each other if desired. In general, the ability to create (and compare) compact data-store-independent snapshots from the journal or from individual data stores may increase the efficiency of various types of recovery operations. Compact snapshots may also be used for backups of the storage system in at least some embodiments.

Figure 15:
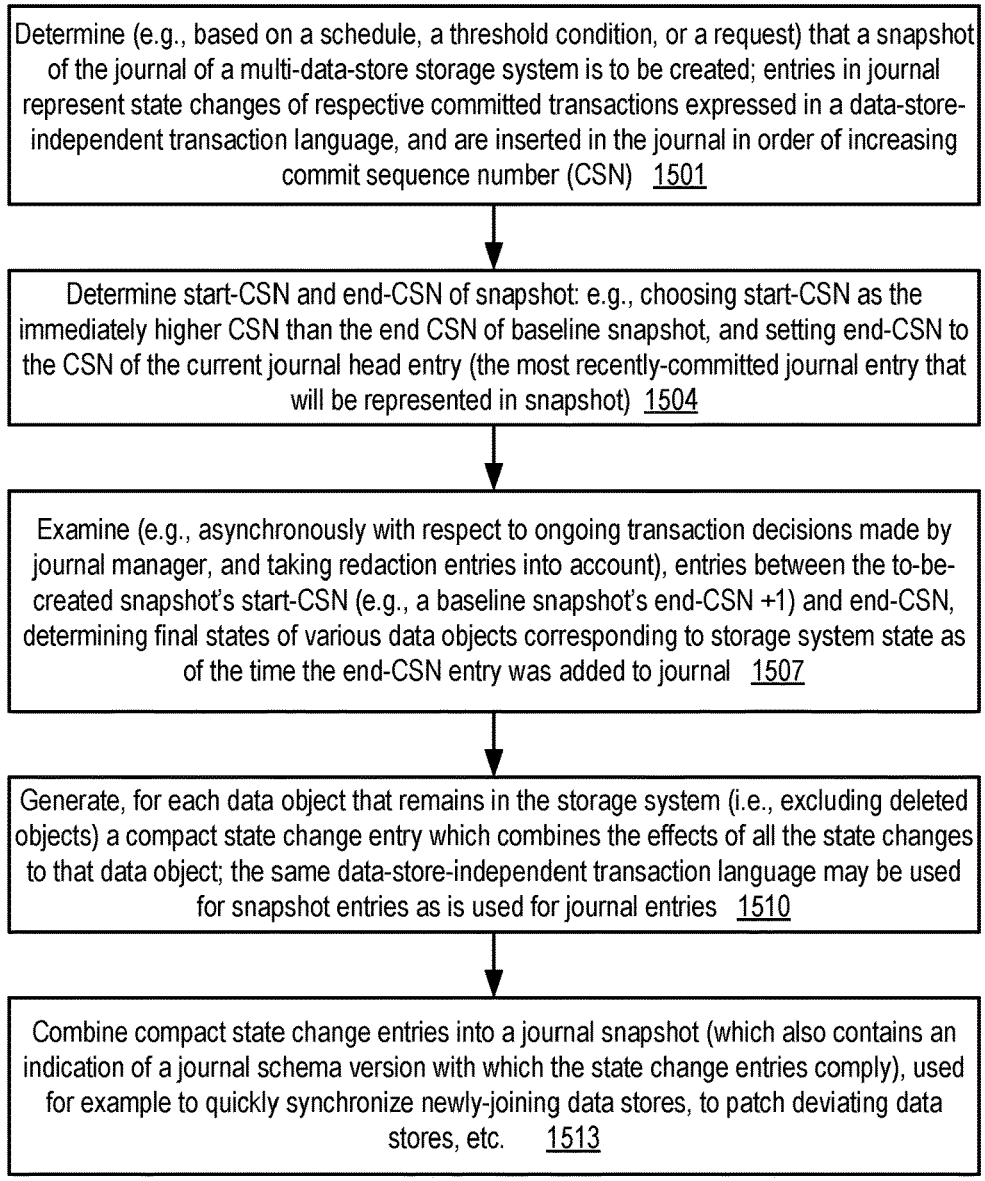
FIG. 15 is a flow diagram illustrating aspects of operations that may be performed to create compact snapshots at a journal-based multi-data-store storage system, according to at least some embodiments.

FIG. 15 is a flow diagram illustrating aspects of operations that may be performed to create compact snapshots at a journal-based multi-data-store storage system, according to at least some embodiments. As shown in element 1501, a determination that a new snapshot of a journal of a multi-data-store storage system is to be generated may be made, e.g., by a snapshot manager implemented at one or more computing devices associated with the storage system. The creation of the new snapshot may be triggered in any of various ways—e.g., based on a pre-determined schedule, based on a detection that a threshold number of journal entries have been added since the previous snapshot was generated, in response to a request received from a client-side component of the storage system via a programmatic interface, and so on. The entries in the journal may each represent committed state changes of the storage system, and at least some of the entries may have been added to the journal after analysis of respective received transaction requests including conflict detection operations of the kinds described earlier. Each journal entry may indicate a corresponding commit sequence number (CSN) indicative of the order in which that entry was added to the journal, relative to the other entries, and the various journal entries may all be expressed using a data-store-independent transaction language.

As shown in element 1504, the snapshot manager may identify the boundaries (e.g., the start-CSN and the end- CSN) of the set of journal entries to be examined for the snapshot. In the depicted embodiment, the CSN of the current head entry of the journal (representing the most recently-committed transaction) may be selected as the end-CSN. The CSN immediately higher than the end-CSN of a previously-generated baseline snapshot (e.g., ((the previous snapshot's end-CSN)+1) if consecutive integers are being used as CSNs) may be selected as the start-CSN of the snapshot to be created. If no previous snapshot has been created, the CSN of the first entry inserted into the log may be selected as the start-CSN.

The selected entries of the journal, starting with the entry with the identified start-CSN, and ending with the entry assigned the end-CSN, may then be examined by the snapshot manager (element 1507). As discussed below in further detail, one phase of the analysis may include redaction processing in some embodiments, during which any redaction entries found in the selected entries may be applied (e.g., by marking the redacted journal entries as entries to be ignored during further phases of snapshot creation). The final state of each data object with respect to the range of journal entries being examined may be identified, e.g., by accumulating the effects of the individual state changes indicated for the data object in the selected journal entries. A compact state change representation may be generated for each data object that remains in the storage system (element 1510) as of the state represented by the end-CSN of the to-be-created snapshot. Similar compact state representations may also be generated for journal schema version change entries among the examined entry set in at least some embodiments. The compact state change representations may use the same transaction language used for the journal entries. The various state change representations may be combined to form the new journal snapshot (element 1513). In at least some embodiments, the new journal snapshot may also include an indication of the journal schema version in effect, as of the state of the system corresponding to the end-CSN. The state change representations of the snapshot may comply with the indicated version of the journal schema. The new journal snapshot may be stored in persistent storage in at least some embodiments, and may be used as needed for synchronizing newly added data stores, to patch or resynchronize member data stores that may have deviated from the journal's contents, and/or for other purposes.

Redactions of Journal Entries

As described above, journal entries may be processed (e.g., by write appliers representing respective cursors of the corresponding data store managers) in the order in which they are inserted in the journal, with the writes in various entries being materialized at some or all of the data stores. The materialization of the writes at a given data store may proceed asynchronously with respect to the materialization of writes at other data stores. Each data store may be required to process or analyze all the entries of the journal (e.g., in commit sequence number order) in at least some embodiments. The processing of a given journal entry may be performed with respect to a given member data store in some embodiments even if that data store eventually does not materialize the state changes indicated in the entry—for example, processing may be required to determine whether the state changes indicated in the journal entry are relevant to the given member data store or not. In at least some embodiments, the journal entries may be implemented as write-once structures: that is, after a given entry has been added to the journal by the journal manager, that entry may no longer be modified in place.

While the processing of journal entries may usually be completed with respect to all the data stores without problems, it may sometimes be the case that the processing of a particular entry cannot be completed successfully at any of the member data stores. For example, a corrupt or malformed entry may be added to the journal (e.g., due to a bug or because of actions taken by a malicious intruder), resulting in an error scenario in which the write appliers associated with the member data stores cannot complete processing the entry, and therefore are unable to make progress. Such entries which prevent further progress in the journal may sometimes be referred to as "poison pill" entries. To handle such scenarios, in at least some embodiments a redaction protocol may be implemented, in which directives to terminate processing of a problematic journal entry may be provided in a redaction entry added later to the journal.

Figure 16:
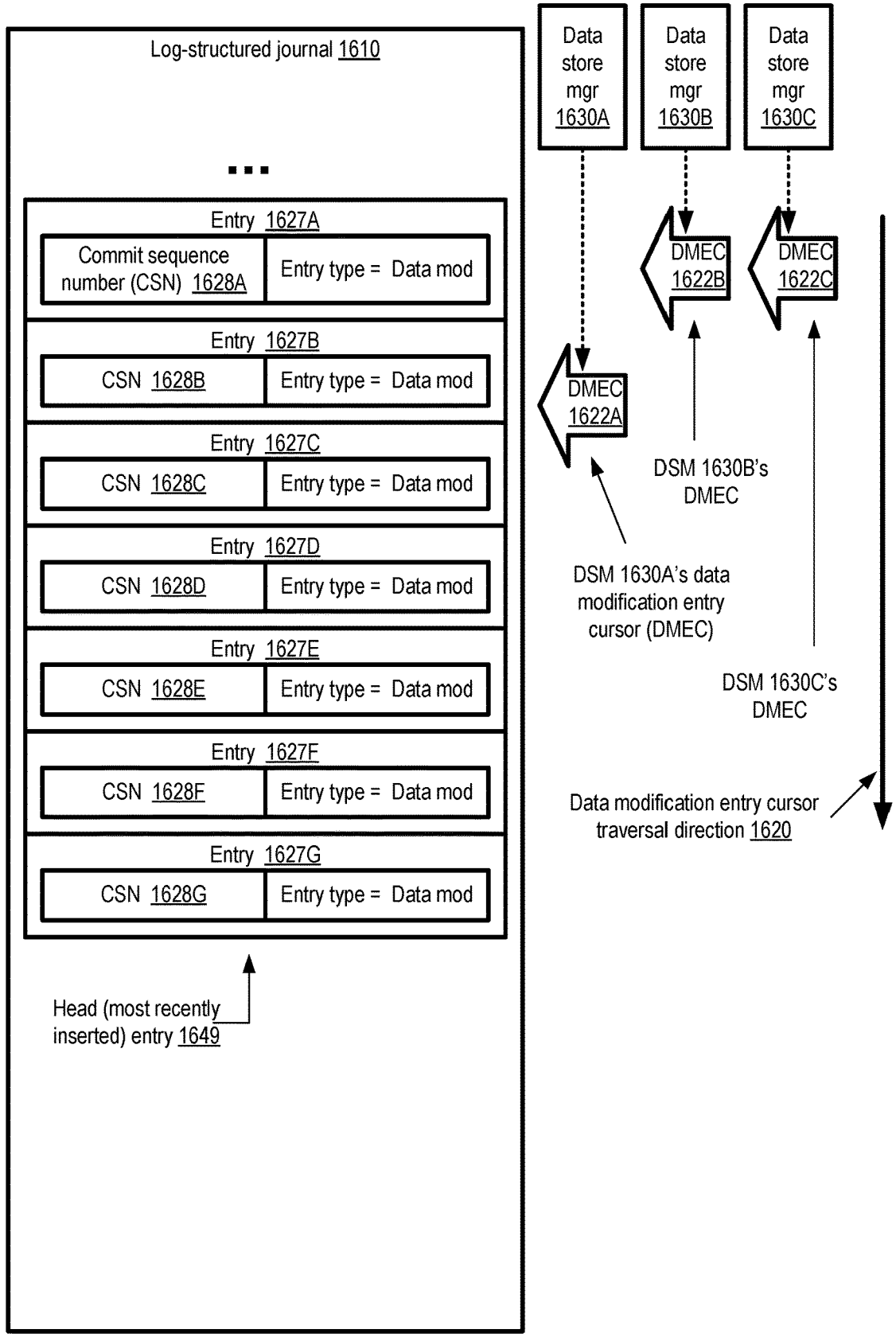
FIG. 16-FIG. 22 collectively illustrate the use of a redaction mechanism at a journal-based multi-data-store storage system, according to at least some embodiments.

FIG. 16-FIG. 22 collectively illustrate the use of a redaction mechanism at a journal-based multi-data-store storage system or database, according to at least some embodiments. As shown in FIG. 16, the storage system may comprise a log-structured journal 1610 and three member data stores with respective data store managers 1630A, 1630B and 1630C. The journal may comprise various entries 1627, such as entries 1627A-1627G inserted in commit sequence number (CSN) order as described earlier. The CSNs 1628 (e.g., 1628A-1628G) may be included in the entries, and may be considered identifiers of the entries. In addition, each entry 1627 may indicate an entry type in the depicted embodiment. Several different types of entries or transactions may be supported by the journal manager in the depicted embodiment, e.g., including data modification ("Data mod") entries, schema modification entries and redaction entries. In the state of the storage system which is illustrated in FIG. 16, each of the entries 1627A-1627G is a data modification entry, and entry 1727G corresponds to the most-recently committed data modification, as indicated by the designation "head entry" 1649. The state changes indicated in the journal 1610 are being processed using respective data modification entry cursors (DMECs) 1622A, 1622B and 1622C of the three data store managers 1630A, 1630B and 1630C. As discussed earlier, the writes indicated in the data modification entries are applied at each data store asynchronously and independently with respect to other data stores, in the direction of traversal indicated by arrow 1620. Thus, for example, at the point of time corresponding to FIG. 16, DMEC 1622A is processing entry 1627B (having completed processing of entries with CSNs lower than 1628B), while DMECs 1622B and 1622C are processing entry 1627A.

Figure 17:
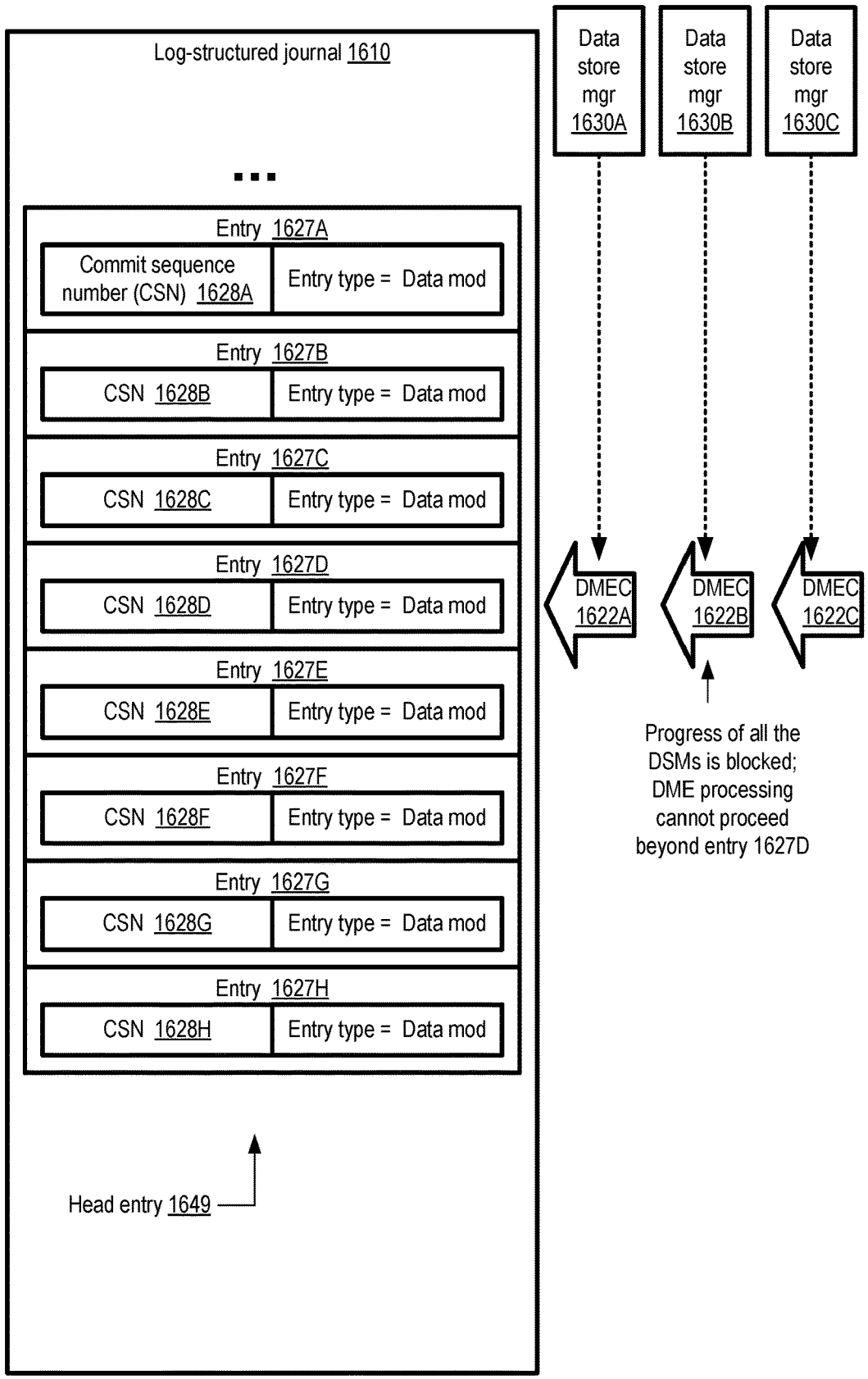

In the situation depicted in FIG. 17, all three DMECs 1622 have completed processing of entries with CSNs less than 1628D, and are attempting to complete processing of entry 1627D with CSN 1628D. By this point in time, entry 1627H is the head entry—that is, the journal manager has added entry 1627H to the journal since the journal state indicated in FIG. 16 was reached. None of the three DMECs are able to complete processing of entry 1627D, e.g., because the content of entry 1627D is corrupted, because of a bug, or because of other factors. Entry 1627D may therefore be considered a poison pill entry, preventing the processing of transactions approved after entry 1627D was inserted into the journal.

Figure 18:
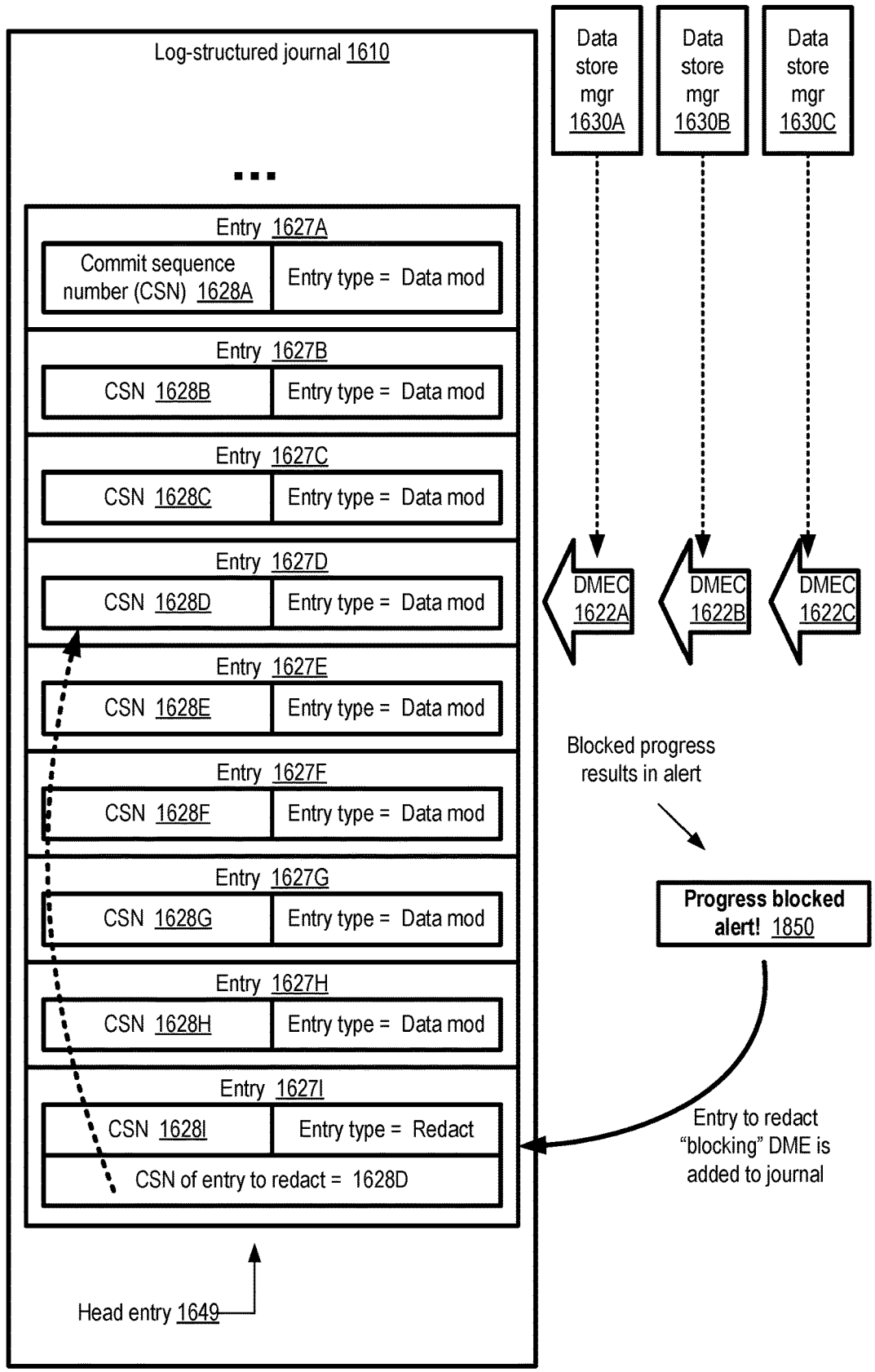

In various embodiments, the progress of the DMECs 1622 through the journal 1622 may be monitored (e.g., by one or more control plane components of the storage system), such that eventually it becomes apparent that the DMECs are "stuck", or that a progress-blocking error state has been reached with respect to the propagation of data modifications. As shown in FIG. 18, an alert 1850 indicative of the progress-blocking error state may be generated at control plane components of the system. Such an alert may, for example, be transmitted to an automated recovery component of the storage system and/or to an administrator or operator. The alert may lead to the insertion of a redaction entry 1627I into the journal, e.g., by the journal manager in response to a programmatic request. Entry 1627I's entry type may be set to "Redact", and as in the case of the data modification entries, a CSN (16281) may be included. In addition, in the depicted embodiment, entry 1627I may include a pointer to the problematic or poison-pill entry 1627D, indicating that the processing of entry 1627D should be skipped or terminated. For example, the CSN 1628D of the progress-blocking entry 1627D may be included in the redaction entry 1627I. The entry to be redacted (1627D in the illustrated example) may be referred to herein as a redaction target of the redaction entry (1627I).

Figure 19:
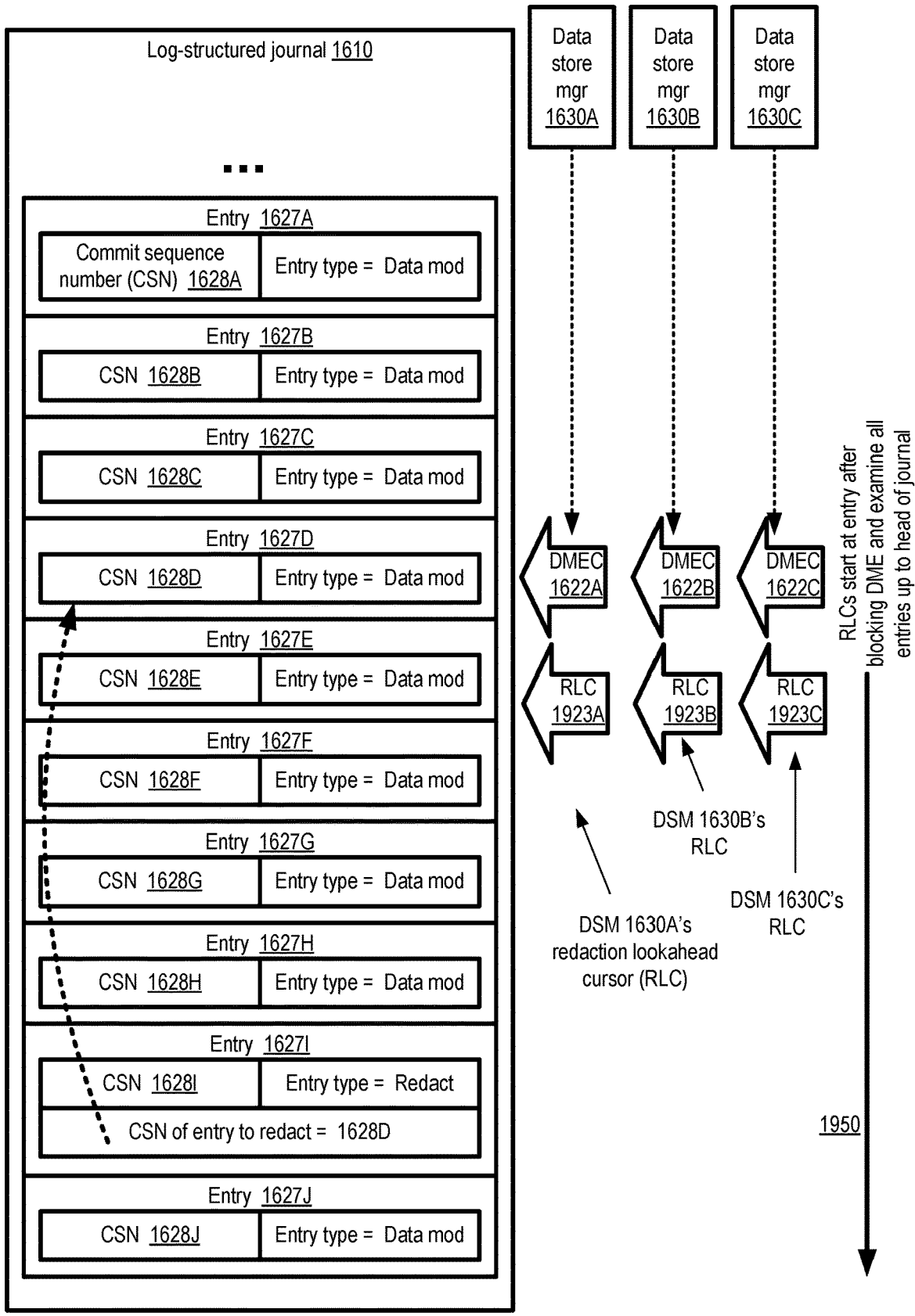

To implement the redaction protocol of the multi-datastore storage system illustrated in FIG. 16-FIG. 22, a second type of cursor may be instantiated for each member data store manager 1630 (i.e., in addition to the data modification entry cursors or DMECs 1622). Cursors of this second category may be referred to as "redaction look-ahead cursors" or RLCs. FIG. 19 shows RLCs 1923A, 1923B and 1923C associated with DSMs 1630A, 1630B and 1630C respectively. As implied by the name, the RLCs may "look ahead" in the journal, searching for redaction entries which may enable the DMECs to resume progress on processing data modification entries by skipping or terminating the processing of problematic entries which have been redacted. In various embodiments, an RLC 1923 may be activated by or on behalf of the corresponding DSM 1630 if a triggering condition indicating a progress-blocking error state is detected—e.g., if a timeout associated with the processing of any given data modification entry expires. As indicated by arrow 1950, each RLC may examine the journal entries after the entry currently being processed by the corresponding DMEC 1622 in the depicted embodiment, and examine all the entries up to the head of the journal in sequence. At the point of time illustrated in FIG. 19, the RLCs 1923 are each examining entry 1627E, and entry 1627J (a data modification entry added subsequent to redaction entry 1627I) is the head entry of the journal. In at least some embodiments, a process or thread of execution corresponding to an RLC may only be activated in the event that the progress of a corresponding DMEC is blocked—e.g., under normal operating conditions when the DMEC is making progress, the RLC may remain passive (or may not be instantiated at all). In some embodiments, an RLC may be activated by default for each DSM, and may examine a new journal entry as soon as (or fairly soon after) it is appended to the journal, to check whether the newly-added entry is a redaction entry. In this latter approach, in which RLCs remain active at or near the head of the journal, or at least significantly ahead of the DMECs, redaction entries may be identified more quickly on average than if the look-ahead for redaction entries starts at a lower sequence number as shown in FIG. 19.

Figure 20:
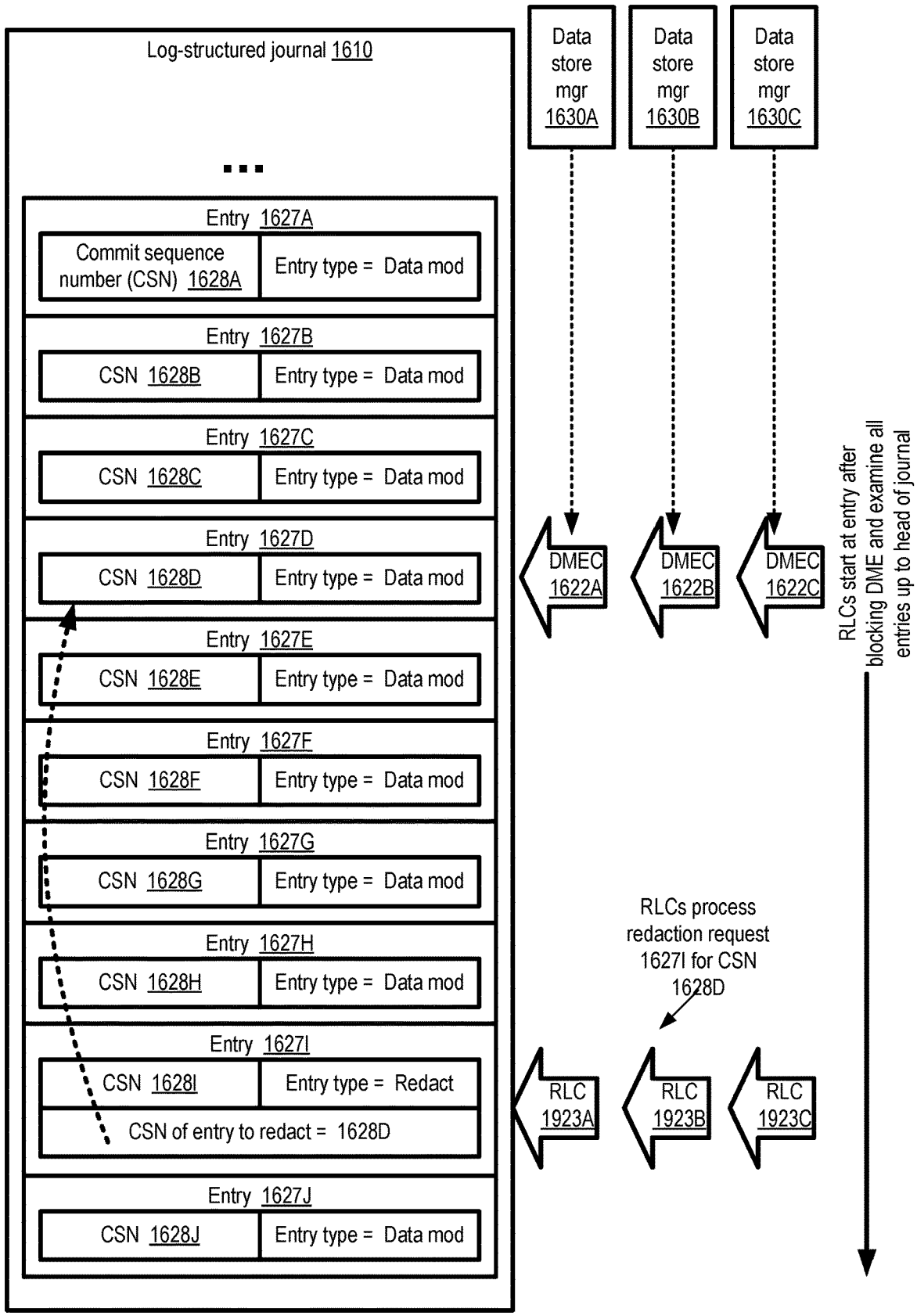
Figure 21:
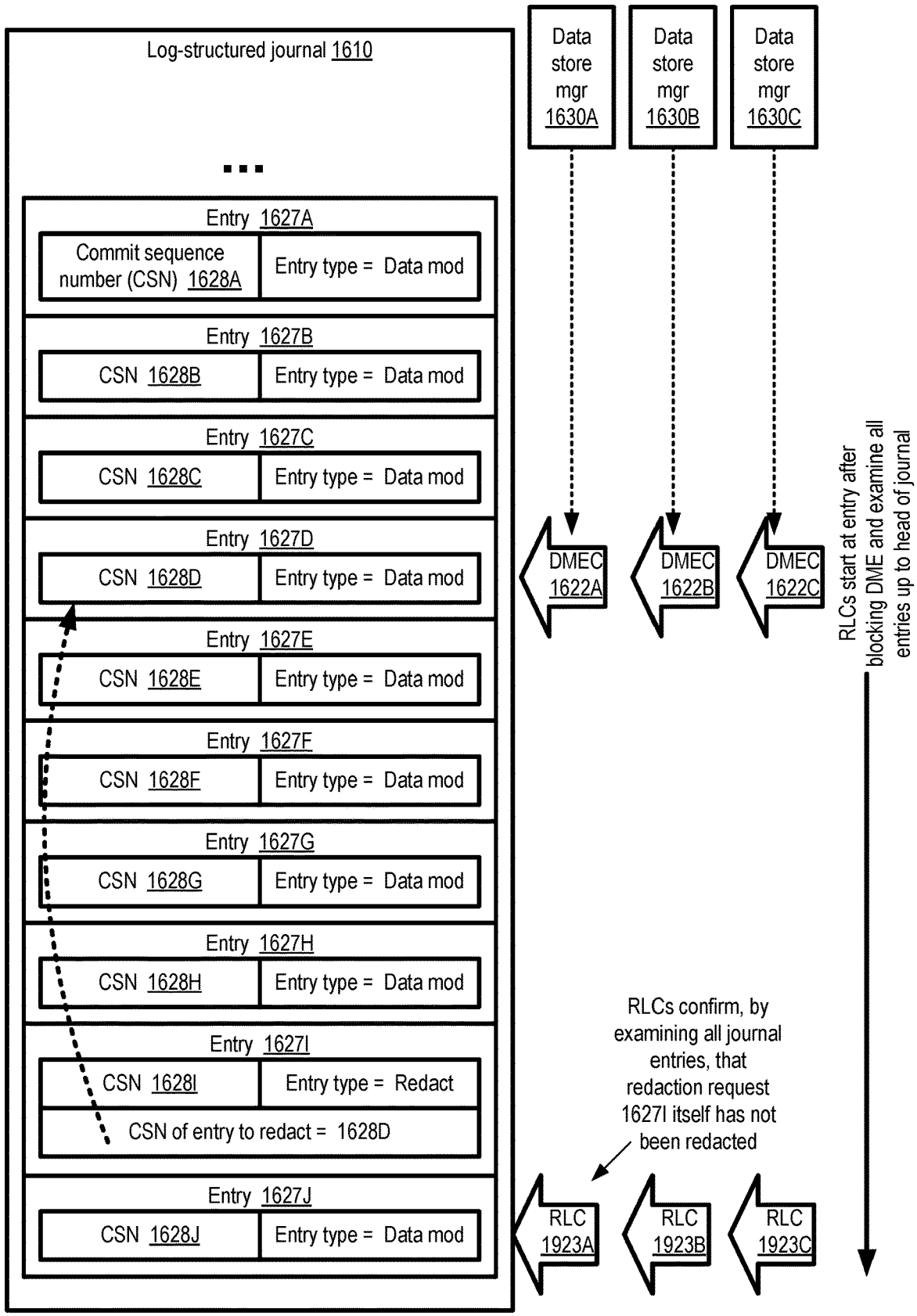

At the point of time corresponding to FIG. 20, the RLCs 1923A-1923C have each reached the redaction entry 1627I, which indicates that entry 1628D is to be redacted. DMECs 1622A-1622C have still not completed processing entry 1628D. Despite the information contained in entry 1627I, however, the traversal of the RLCs through the journal continues in accordance with the redaction protocol. This further traversal may be required because a redaction entry such as 1627I may itself have been redacted, so the RLCs have to continue their examination of the journal until no more entries remain to be examined. Eventually, as indicated in FIG. 21, the RLCs all reach the head of the journal (entry 1627J), and confirm that redaction entry 1627I has not been redacted.

Figure 22:
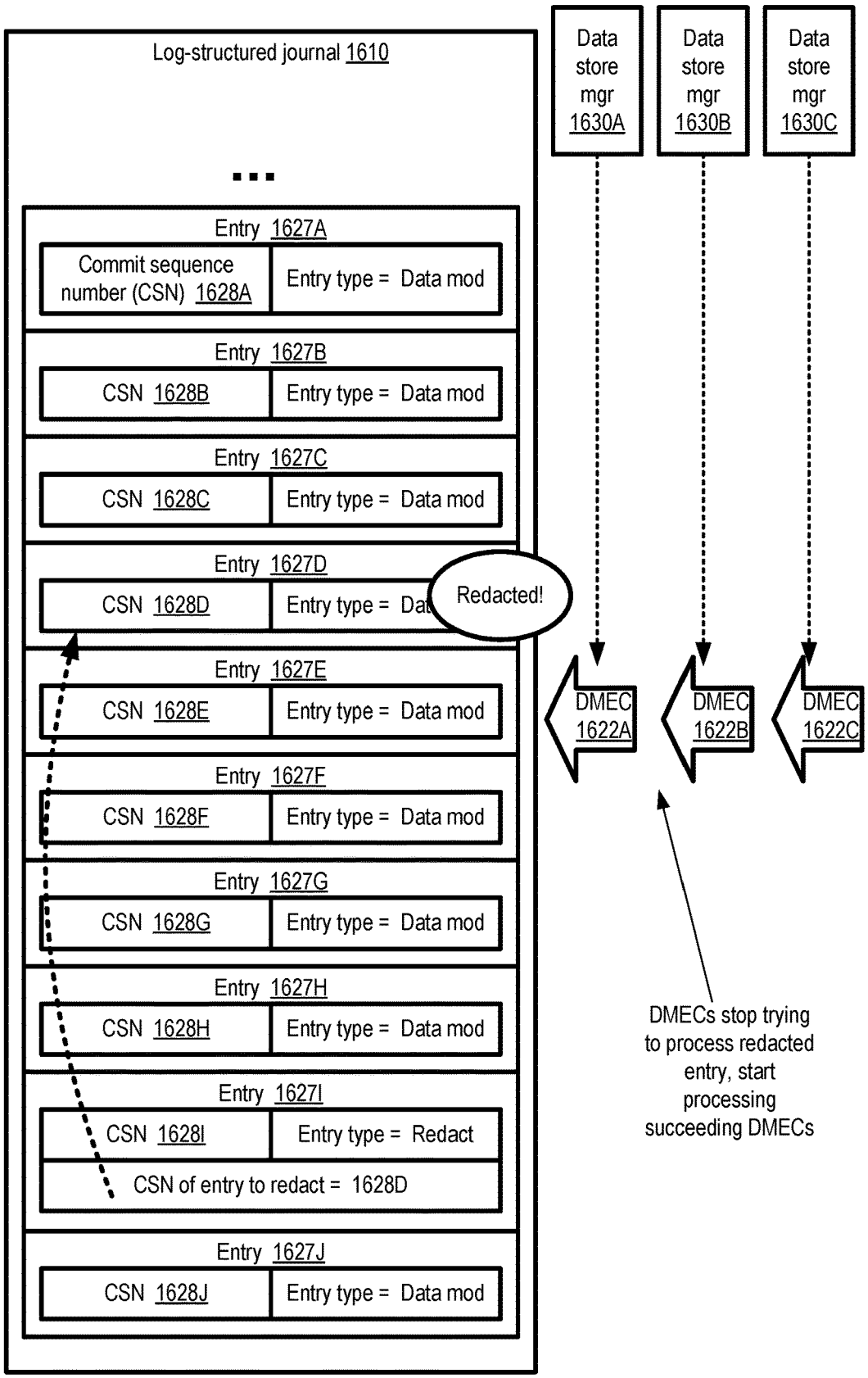

After a given RLC 1923 has confirmed, by traversing the journal all the way to the head entry, that the redaction entry 1627I has not been redacted, an indication that processing of entry 1627D (the redacted entry) is to be abandoned or terminated may be provided to the corresponding DMEC 1622. In response to such an indication, the DMECs 1623 may terminate their processing of entry 1627D and resume processing other entries of the journal 1610, starting at the entry (1627E) with the immediately higher CSN (1628E), as shown in FIG. 22. It is noted that although only data modification entries and redaction entries have been shown in FIG. 16-FIG. 22, in various embodiments other types of entries, including for example journal schema version change entries, may also be redacted using a similar redaction protocol.

In some embodiments, each DMEC 1623 or the corresponding data store manager 1630 may keep records of entries (such as 1627D) whose processing was abandoned or terminated as a result of a redaction entry such as 1627I. When a DMEC 1623 encounters the redaction entry 1627I during their processing of the journal, in some embodiments the DMEC or the corresponding DSM 1630 may verify that the state changes indicated in the corresponding redacted entry were not actually applied at the data store. If a situation in which such a state change was applied is encountered, additional recovery operations may be performed as described in the context of FIG. 25 below.

Figure 23:
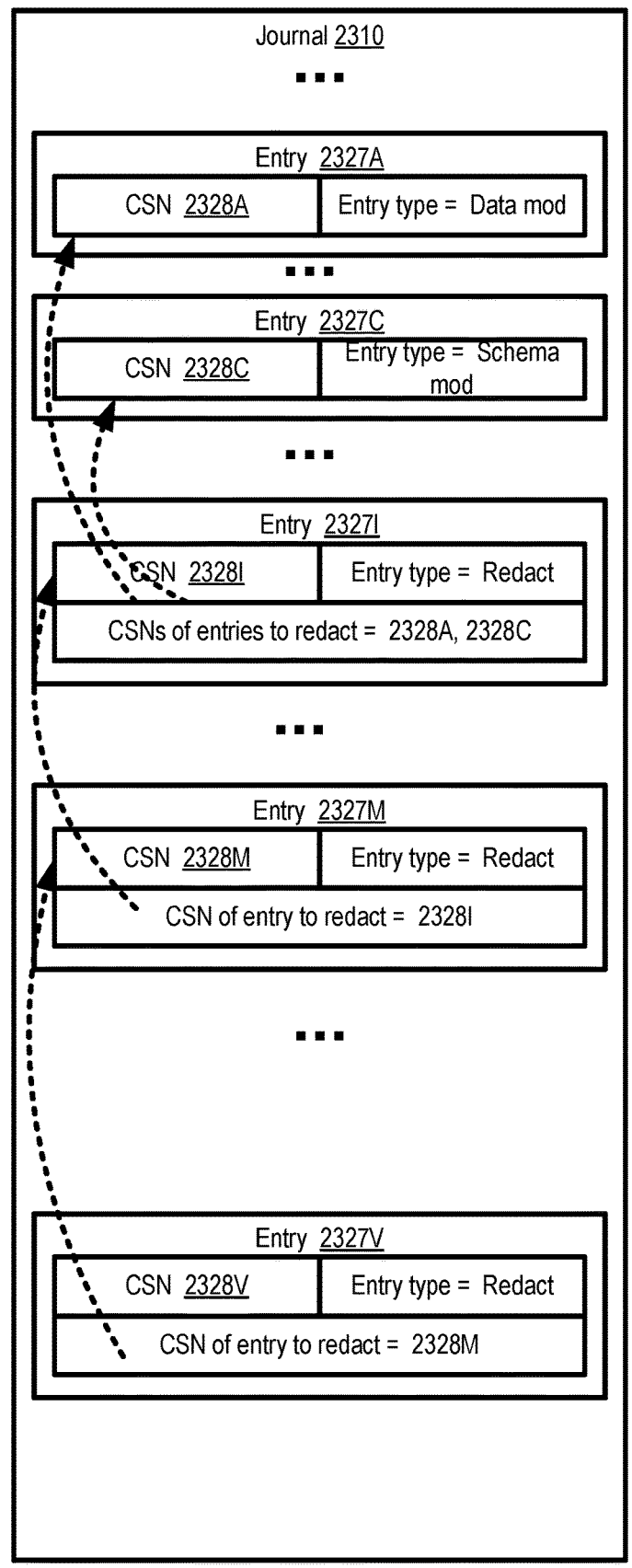
FIG. 23 illustrates examples of chained redaction entries which may be inserted into a journal, according to at least some embodiments.

As mentioned above, in some cases a given redaction entry of a journal may itself be redacted by a subsequent redaction entry. Such entries may be referred to as "redaction chains". FIG. 23 illustrates examples journal entries representing redaction chains, according to at least some embodiments. Journal 2310 comprises a plurality of entries of various types, including data modification entries, schema modification entries and redaction entries. For example, entry 2327A is a data modification entry with a commit sequence number (CSN) 2328A, and entry 2327C is a journal schema modification entry with CSN 2328C. Redaction entry 2327I points to entries 2327A and 2327C using their respective CSNs 2328A and 2328C, indicating that entries 2327A and 2327C are to be redacted. As in the example of entry 2327I, a given redaction entry may redact several different earlier-inserted entries of the journal in at least some embodiments.

At some point after entry 2327I is inserted in the journal 2310, however, a second redaction entry 2327M is inserted in the depicted example scenario, indicating that the first redaction entry 2327I is to be redacted (using CSN 23281 as the identifier of the target of the redaction). Furthermore, a third redaction entry 2327V is added to the journal after 2327M, indicating that entry 2327M is to be redacted. Entries 2327V, 2327M and 2327I form a redaction chain in the example illustrated in FIG. 23. In order to determine exactly which data modification entries and/or schema modification entries are to be redacted in at least some embodiments in which redaction chains are allowed, the processing of redaction entries may be performed in reverseCSN order. Thus, for example, in the scenario depicted in FIG. 23, a redaction look-ahead cursor (RLC) may start processing entries from the head of the journal 2310, analyzing each entry to determine its type. Upon encountering redaction entry 2327V in this procedure, the RLC may determine that the entry 2327M, which is to be redacted due to entry 2327V, is itself a redaction entry. Furthermore, the RLC may detect that entry 2327I (entry 2327M's redaction target) is the last entry in the redaction chain—i.e., that 2327I's redaction targets do not include a redaction entry. Although entry 2327I is a redaction target of entry 2327M, entry 2327V cancels the redaction indicated in entry 2327M. As a result, the RLC determines that entry 2327I is not to be redacted. Accordingly, the net effect of the three-member redaction chain 2327V-2327M-2327I is the same as the effect of 2327I by itself—that is, data modification entry 2327A and schema modification entry 2327C may both be redacted.

It is noted that under normal operating conditions, redaction entries may be relatively rare in various embodiments (e.g., they may only be inserted if all the member data stores are unable to make progress), and redaction chains of the kind illustrated in FIG. 23 may therefore be rarer still. In many embodiments, the redaction protocol described above may be considered a last resort, to be employed only if it becomes clear that the write propagation components (i.e., the data modification entry cursors or write appliers) cannot make progress using any other alternative mechanism.

Figure 24:
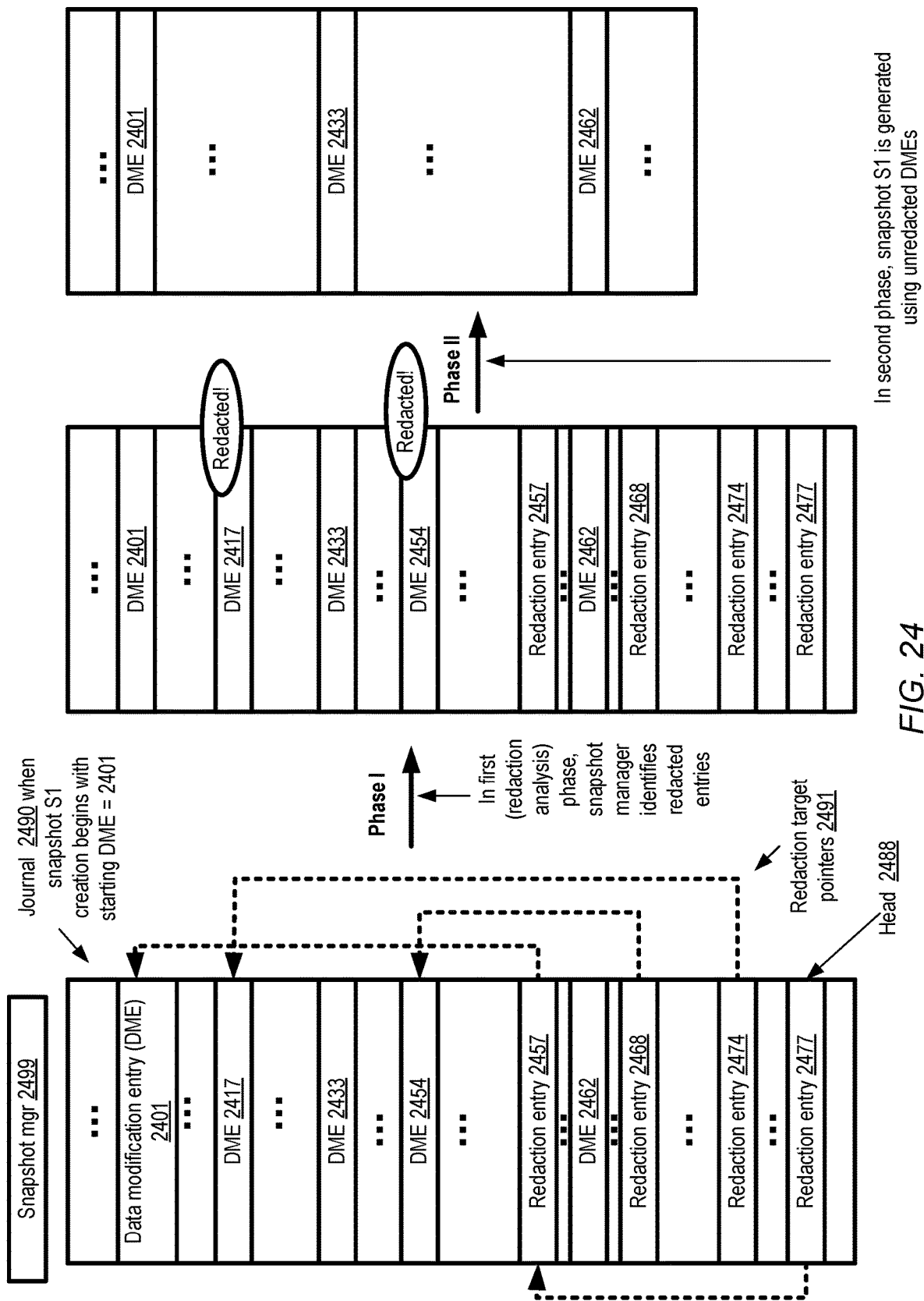
FIG. 24 illustrates an example of a redaction analysis phase of journal snapshot creation, according to at least some embodiments.

As mentioned earlier, in at least some embodiments in which compact snapshots of the journals of multi-data-store systems are created, the snapshot managers responsible for generating the compact snapshots may encounter and process redaction entries (if any exist in the portion of the journal being analyzed for the snapshot). FIG. 24 illustrates an example of a redaction analysis phase of journal snapshot creation, according to at least some embodiments. In the depicted embodiment, snapshot manager 2499 determines that a compact snapshot S1 of journal 2490 is to be created, and that the journal entries starting with entry 2401 and ending at the current head of the journal (entry 2477) are to be examined to generate S1. At the time that the snapshot generation procedure is begun, the journal includes data modification entries (DMEs) 2401, 2417, 2433, 2454 and 2462, as well as redaction entries 2457, 2468, 2474 and 2477. The redaction target pointers 2492 indicate the entries to be redacted. For example, entry 2477 indicates that entry 2457 (itself a redaction entry) is to be redacted, entry 2474 redacts DME 2417, entry 2468 redacts DME 2454, and entry 2457 indicates that DME 2401 is to be redacted.

In a first phase of the snapshot generation technique, the redaction entries may be processed in reverse CSN order in the depicted embodiment. Thus, the snapshot manager may start at the head of the journal 2490, examining entries in decreasing CSN order to identify any redaction entries, and following redaction chains if any such chains are encountered. (In practice, the journal may be examined in increasing CSN order even during the redaction analysis in some embodiments, with redaction entries being recorded as they are encountered and marked as being redacted if they are identified in subsequent redaction entries.) As a result of this redaction analysis, one or more entries may be removed from the entry set from which the compact state change representations of snapshot S1 are to be derived. For example, DME 2454 may be removed as a result of redaction entry 2468, and DME 2417 may be removed as a result of redaction entry 2474. However, despite the redaction of DME 2401 indicated in entry 2457, DME 2401 may be retained in the entry set to be used to generate the snapshot because of the redaction of entry 2457 by entry 2477. In a second phase of snapshot generation in the depicted embodiment, the remaining non-redacted entries may be examined in the manner described above to obtain the final states and the compact state change representation entries for the snapshot S1. The redaction entries themselves (e.g., 2477, 2457, 2474 and 2468) may also be ignored when generating the snapshot entries in the depicted embodiment. As shown in FIG. 24, in at least some embodiments the snapshot manager 2499 may thus implement or participate in the redaction protocol when a new journal snapshot is to be generated.

Figure 25:
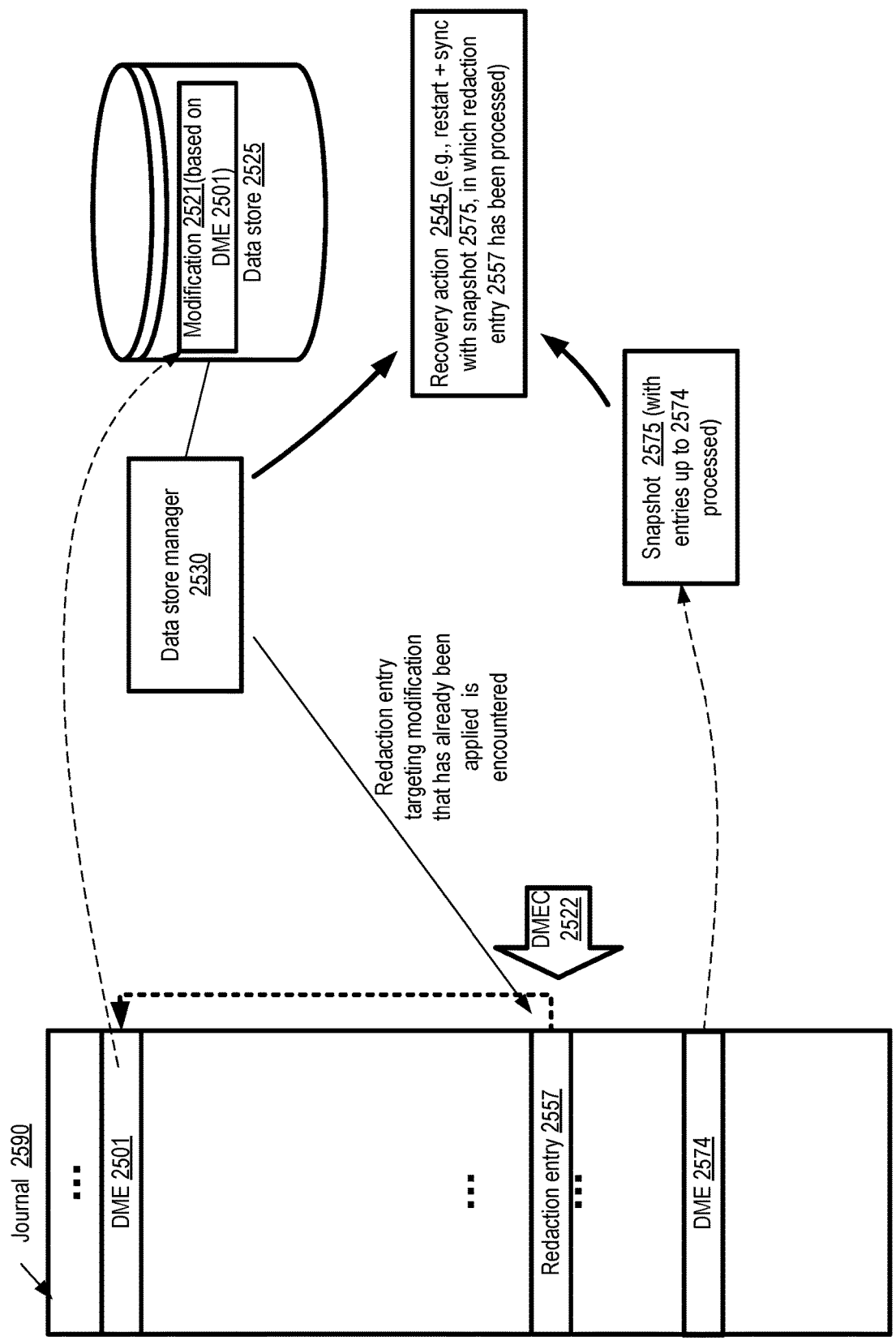
FIG. 25 illustrates an example scenario in which a redaction entry targeting a modification which has already been materialized at a data store is encountered during journal processing, according to at least some embodiments.

In most cases, the modifications indicated in a redacted journal entry (a target of a redacted entry) may not be materialized or applied at any of the member data stores. In embodiments in which the redaction look-ahead cursors are always active, examining new journal entries for possible redactions shortly after the entries are added at the head of the journal, the probability that an eventually-redacted modification is ever materialized may be particularly low, because redactions may be identified quickly enough in most cases to avoid the possibility of such materializations. However, it may sometimes be the case that a redaction entry is encountered by a data modification entry cursor during traversal of the journal, and the modifications indicated in the target redacted entry (i.e., modifications that should not have been applied) have already been propagated to the corresponding data store. FIG. 25 illustrates an example scenario in which a redaction entry targeting a modification which has already been materialized at a data store is encountered during journal processing, according to at least some embodiments. Journal 2590 includes a particular data modification entry DME 2501 which is later redacted by a redaction entry 2557. However, by the time that the data modification cursor 2522 of a particular member data store manager 2530 reaches the redaction entry 2557, at least one data modification 2521 indicated in DME 2501 has already been applied at the data store 2525. In effect, as a result of the modification 2521, the state of data store 2525 has branched or forked away from the intended authoritative state of the storage system, and the data store 2525 can no longer be considered consistent or valid.

The situation illustrated in FIG. 25 is expected to be extremely unlikely under most operating conditions. As discussed earlier, in various embodiments redaction entries such as 2557 may typically be added to the journal only after it becomes evident that each the member data stores cannot process the corresponding redacted entry, so the probability that a data store successfully applies a data modification which is later redacted would typically be quite low. If a data store manager 2530 does discover that a modification which should not have been applied has in fact already been applied, one or more recovery actions 2545 may be initiated. Such a recovery action 2545 may include, for example, restarting or rebooting the data store manager and then synchronizing the state of data store 2525 with a compact snapshot 2575 which incorporates the effects of the redaction entry 2557 (e.g., because the snapshot is generated based on the analysis of journal entries such as DME 2574 which have higher CSNs than the redaction entry 2557). In at least some embodiments, the data store manager 2530 or a client-side component of the storage system may request the creation of a new snapshot such as 2575 for recovery operation 2545. As long as a snapshot generated using one or more journal entries with higher CSNs than the redaction entry is used for recovery, DME 2501 would by definition not impact the state of the data store 2530 after it has been synchronized using the snapshot in the depicted embodiment.

Figure 26:
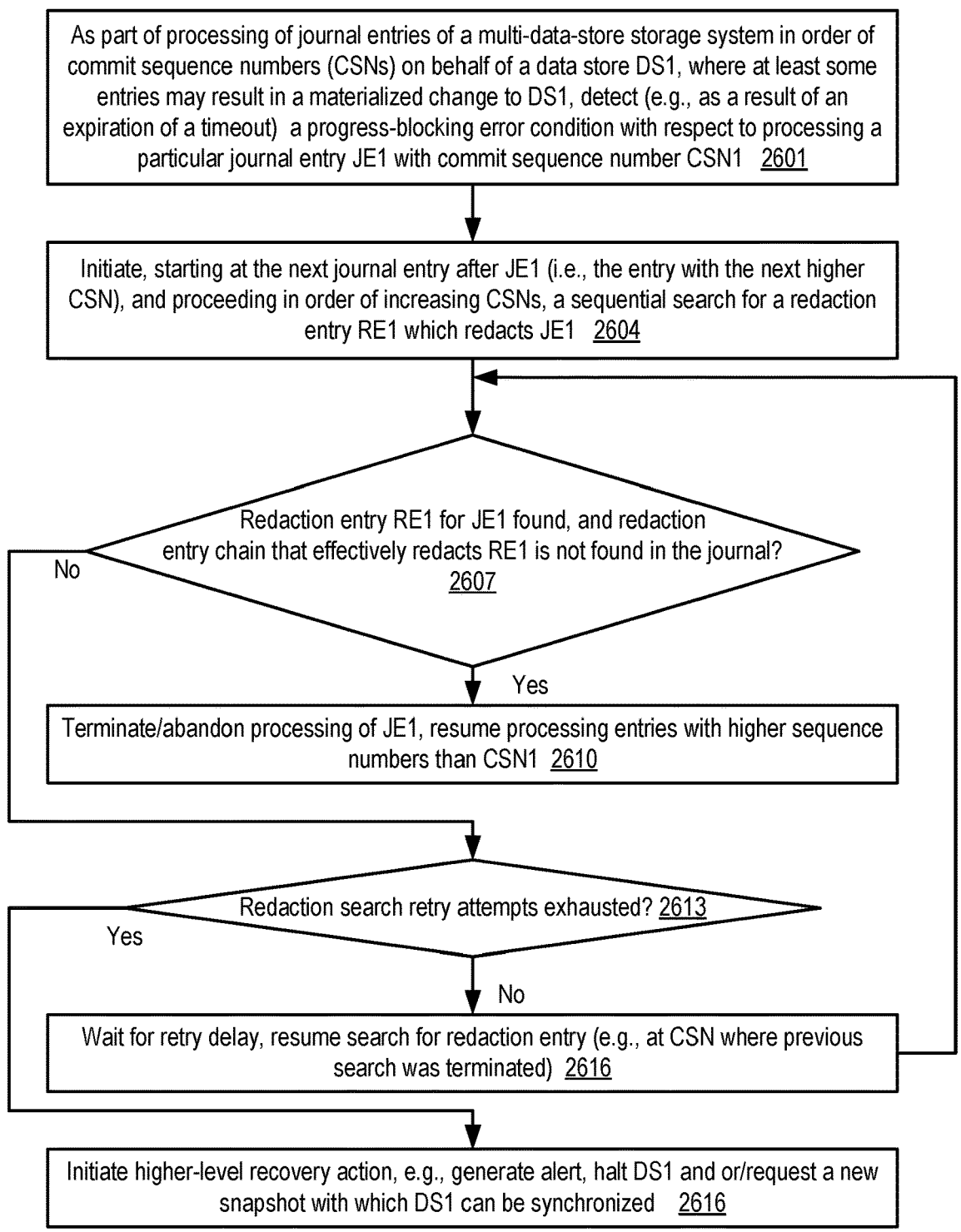
FIG. 26 is a flow diagram illustrating aspects of operations that may be performed to respond to progress-blocking conditions using redaction entries at a journal-based multi-data-store storage system, according to at least some embodiments.

FIG. 26 is a flow diagram illustrating aspects of operations that may be performed to respond to progress-blocking conditions using redaction entries at a journal-based multi-data-store storage system, according to at least some embodiments. As indicated in element 2601, a progress-blocking error condition may be encountered during the processing of a journal on behalf of one of the member data stores DS1 of a multi-data-store storage system. The journal entries may be analyzed in commit sequence number order (e.g., from journal entries representing transactions committed earlier, to journal entries representing committed later). The progress-blocking error condition may be detected with respect to a particular journal entry JE1 with a commit sequence number CSN1—e.g., the data modification entry cursor (DMEC) of the data store may not be able to complete processing of JE1, and therefore may not be able to start processing entries with CSNs higher than CSN1. In at least some embodiments, an expiration of a timeout (e.g., for a maximum time expected to be taken for processing any given journal entry) may indicate the progress-blocking error condition.

Starting at the entry immediately adjacent to CSN1, and with a higher CSN than CSN1, a sequential search for a redaction entry which targets JE1 may be initiated in order of increasing CSNs in the depicted embodiment (element 2604). As described earlier, in at least some embodiments a different type of cursor (e.g., a redaction look-ahead cursor or RLC) may be used for the search than the DMEC used for processing the data modification entries. Starting at the next-newer entry to JE1, the cursor used for the redaction protocol may traverse all the entries to the head (most recent entry of the journal) to determine whether (a) a redaction entry RE1 intended to nullify or cancel the effects of JE1 is in the journal and (b) that redaction entry RE1 is itself not a target of another redaction entry RE2 (e.g., that a redaction chain does not nullify RE1). If both these conditions are met (as detected in element 2607), the processing of JE1 may be terminated or abandoned, and the propagation of the writes of data modification entries added later than JE1 may be started—e.g., by moving the DMEC the journal entry with the next higher CSN than CSN1 (element 2610).

It may be the case that a redaction entry RE1 targeting the problematic entry JE1 may not be found in the first pass made by the redaction look-ahead cursor through the journal the depicted embodiment, resulting in a negative outcome from the operations represented in element 2607. This may occur, for example, if a redaction entry targeting JE1 has not yet been added to the journal. In at least some embodiments, a number of traversals of the journal may be retried before abandoning the search for a valid redaction entry with respect to JE1, with the maximum number of retries being governed by a configuration parameter. If the maximum number of retries has not yet been attempted (as detected in element 2613), the redaction look-ahead cursor may wait for some parameterized retry delay and search for a redaction entry again (element 2616). In some implementations the look-ahead cursor may keep track of where it left off in the previous search, and start searching the journal starting at that point. If a valid redaction entry is found in any of the retry attempts (i.e., if the conditions indicated in element 2607 are met), the processing of journal entries inserted after JE1 may be resumed. If all the retry attempts have been completed (as also detected in element 2613) and a valid redaction entry for JE1 has not been found, a higher-level recovery action may be initiated in the depicted embodiment. For example, an alert may be generated, data store DS1 may be halted or restarted, and a request to generate a new snapshot may be transmitted to a snapshot manager, e.g., with the expectation that a redaction entry targeting JE1 would have been inserted in the journal prior to the snapshot. In some implementations, no limit may be set on the number of retries to be attempted to find a redaction entry.

Query Restrictions at Journal-Based Storage Systems

As discussed earlier, in various embodiments a journal manager may perform read-write conflict detection using an optimistic concurrency control protocol to determine whether a given transaction request is to be accepted for commit at a journal-based multi-data-store storage system. In some embodiments, the conflict detection may be performed to achieve "serializable consistency" for the storage system (although other less stringent forms of consistency may optionally be supported in at least one embodiment). In embodiments in which serializable consistency is achieved, the overall outcome of the accepted transactions (which may have overlapped with one another in time) is the same as the outcome which would have resulted from the transactions if they had been executed serially, i.e., sequentially without overlapping in time. Generally speaking, in order to support serializable consistency, the journal manager may be responsible for ascertaining whether the data that was read during the preparation of a proposed transaction (such that the writes of the proposed transaction depend on the results of the reads) could have been affected by writes of other transactions that were committed after the data was read.

A number of different approaches may be taken to determine whether a set of writes (e.g., indicated in the write set descriptors of the journal entries for committed transactions) may have affected the results of subsequent read operations (e.g., indicated in the read set descriptors of transaction requests) in different embodiments. For example, a location-based approach may be used in some embodiments, in which information regarding the storage locations written in committed transactions (such as hash values obtained from the written-to addresses) may be compared with information regarding the location of reads (such as hash values obtained from the read-from addresses).

In at least some embodiments, a predicate-based approach may be used, in which instead of using location data (which may be insufficient to detect some types of conflicts), information regarding the predicates used to perform read queries during preparation of a transaction request is compared with information regarding the query predicates which would be affected by committed write operations. For example, consider a scenario in which the equivalent of an SQL (Structured Query Language) query of the form "select X from table T1 where (attribute1==value1) or (attribute2==value2)" is used for the reads of a proposed transaction. If a write which was committed after the read query is run could affect the results of such a query, this would indicate a read-write conflict, and the proposed transaction may be rejected. Such a rejection may be needed, for example, if a write which affected records with the attribute1 and attribute2 values indicated in the query were committed. If the query were to be re-run at the time that the journal manager makes a commit decision about the transaction, a different set of results may be returned than when the query was originally run during the preparation of the transaction request. In at least some embodiments, the read sets of proposed transactions may include representations of the query predicates which may have been used for the reads, and the write set descriptors may include representations of corresponding "write-affected" query predicates—predicates of queries whose results would be affected if the writes were committed. The write-affected queries may not actually be issued by any entity, but may have to be taken into consideration to characterize the write set for the purposes of conflict detection with respect to a desired consistency level. In at least some embodiments, a normalization and transformation procedure may be used to obtain the representations of the read queries and the write-affected queries as described below—for example, the clauses of the queries may be normalized to a particular format, and then hash functions or other similar transforms may be applied to obtain a set of numerical values used for the read set descriptors and/or the write set descriptors.

As discussed below in further detail, in at least some embodiments write operations to even fairly simple data objects (e.g., to tables with just a few columns) may potentially result in a very large set of write-affected queries. In order to keep the amount of memory or storage used for write set descriptors and write set descriptors within reasonable limits, and/or to limit the amount of computation required for preparing transaction requests while still supporting the desired consistency level, in at least some embodiments the set of queries for which a particular consistency level (such as serializable consistency) is supported may be restricted. Such restrictions may, for example, include limiting the combinations of data object attributes on which queries with the desired consistency level are supported, disregarding at least some inequality predicates, and so on. In at least some embodiments, respective query restriction descriptors detailing the types of queries for which read-write conflict detection is supported and/or other query-related metadata may be indicated in the journal schemas agreed to by the various member data store managers.

Figure 27:
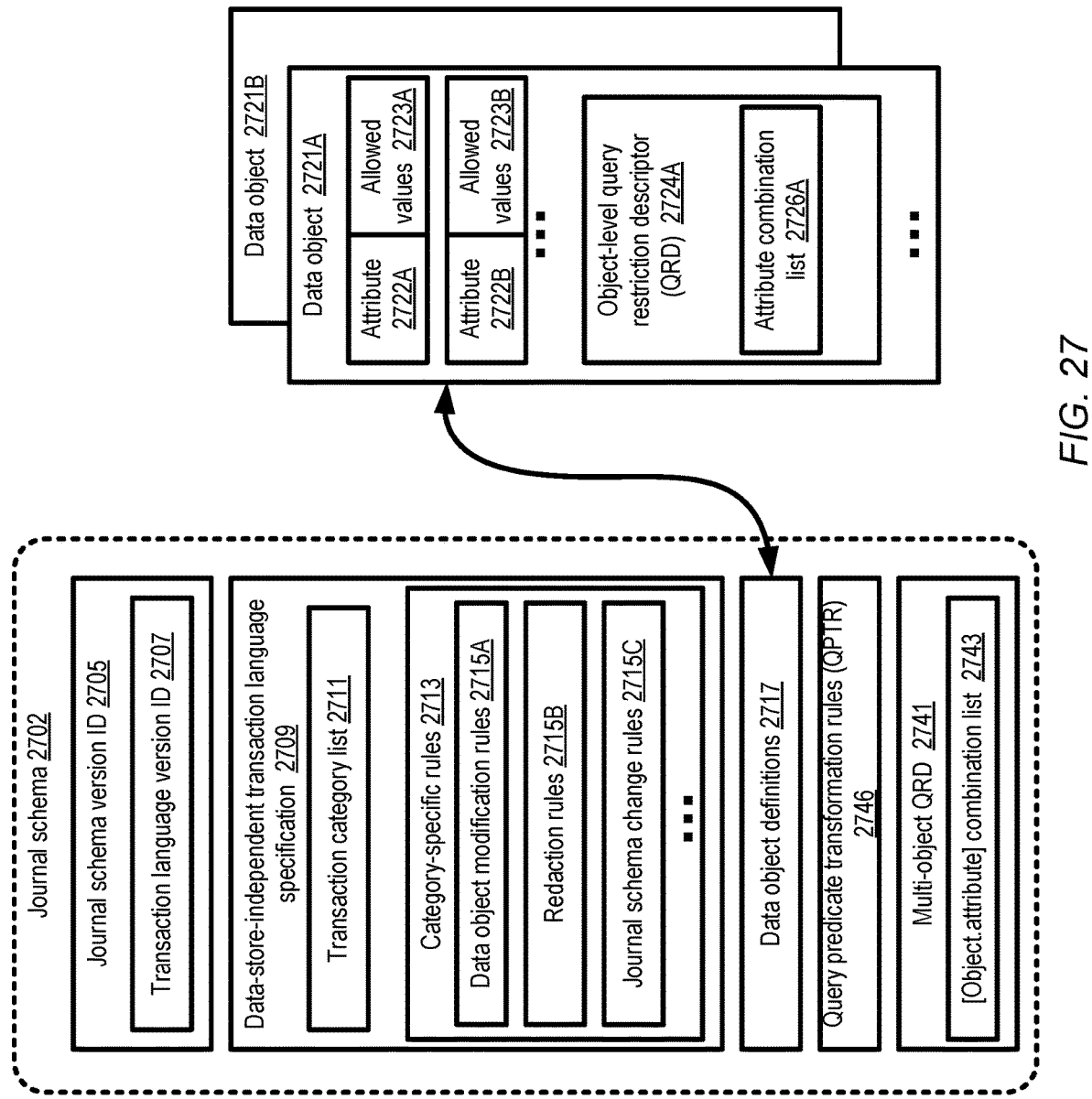
FIG. 27 illustrates an example of a journal schema which includes a query restriction descriptor, according to at least some embodiments.

FIG. 27 illustrates an example of a journal schema which includes a query restriction descriptor, according to at least some embodiments. As shown, journal schema 2702 includes a version ID 2705, a data-store-independent transaction language specification 2709, and one or more data object definitions 2717 (e.g., table definitions) in the depicted embodiment. Some or all of the data object definitions such as 2721A or 2721B may include object-level query restriction descriptors (QRDs) such as QRD 2724A of data object definition 2721A. The object-level QRD may indicate a list 2726A of the combinations of attributes of the data object 2721A on which queries are permitted with respect to read-write conflict detection operations designed to achieve a particular level of consistency. For example, if the data object 2721 includes attributes attr1, attr2 and attr3, one possible attribute combination list 2726 may comprise (attr1), (attr2), and (attr1, attr2), indicating that queries with where clauses of the form "where attr1=<someValue1>", "where attr2=<someValue2>", or "where (attr1<somevalue3>) or (attr2<someValue4>" would be within the scope by the query restrictions.

Journal schema 2702 may also include guidelines or instructions regarding the manner in which query predicates are to be transformed or converted into the read set and write set descriptors, e.g., in the form of query predicate transformation rules (QPTR) 2746. In the depicted embodiment, QPTR 2746 may indicate steps of a transformation procedure to be applied on the predicates of the read queries and the write-affected queries to obtain the values to be used for the read set descriptors and the write set descriptors respectively. The QPTR 2746 may, for example, indicate the particular hash function or functions to be applied to the predicates, the normalization technique to be used, and so on. In at least some embodiments separate per-data-object QPTRs may be used instead of a QPTR defined at the journal schema level. A respective separate QPTR may be specified for read set descriptors and for write set descriptors in some embodiment—e.g., a different set of operations may be used to generate a read set descriptor from one or more read queries that is used to generate the write set descriptor from one or more write operations. In one implementation, the transformation protocol may be included or hard-coded into client library code used for preparing transactions, in which case the journal schema may not need to indicate the transformation details. In addition to the QRD-related elements, a journal schema may also include other elements similar to those illustrated in FIG. 2 in the depicted embodiment. For example, the journal schema version identifier 2705 may indicate a language version identifier 2707, the transaction language specification may include a transaction category list 2711 (indicating, for example, data modification transactions, schema version change transactions, and redaction transactions) and a respective set of category-specific rules 2713 such as data object modification rules 2715A, redaction rules 2715B and journal schema change rules 2715C. The object definitions may indicate the attribute names 2722 and corresponding data types or allowed values 2723. The QRDs, QPTRs and/or other elements of a journal schema 2702 may change in the depicted embodiment, with new versions coming into effect after approvals from the various member data store managers have been obtained, in a manner similar to that described earlier.

In at least one embodiment, in addition to per-data-object QRDs such as 2724, one or more QRDs such as QRD 2741 restricting queries which can span multiple data objects (e.g., multiple tables) may also be indicated in a journal schema 2702. Such a multi-object QRD 2741 may also indicate an attribute combination list 2745 (e.g., in which qualified attribute names of the form <object-name>.<attribute-name> are used). In some embodiments, the manner in which query restrictions are indicated in the journal schema may differ from the arrangement shown in FIG. 27—e.g., instead of organizing the query restrictions on a per object level, all the restrictions may be combined into one common structure similar to multi-object QRD 2745. In at least one embodiment, a journal schema 2702 may also indicate one or more consistency levels supported for transactions. In embodiments in which multiple levels of consistency are supported, respective query restriction descriptors may be established for various consistency levels. Further details regarding the techniques used to generate read set descriptors and write set descriptors in view of the QRDs in various embodiments are provided below. It is noted that although a relational data model is assumed in much of the following description regarding QRDs to simplify the presentation, similar QRDs may also be used in embodiments in which at least some of the member data stores do not implement the relational data model. It is also noted that although, in the examples provided herein, inequality predicates are eliminated during the preparation of QRD-based read set descriptors and write set descriptors, in at least some embodiments similar approaches using query restrictions may be implemented to cover inequality predicates as well as equality predicates.

Figure 28:
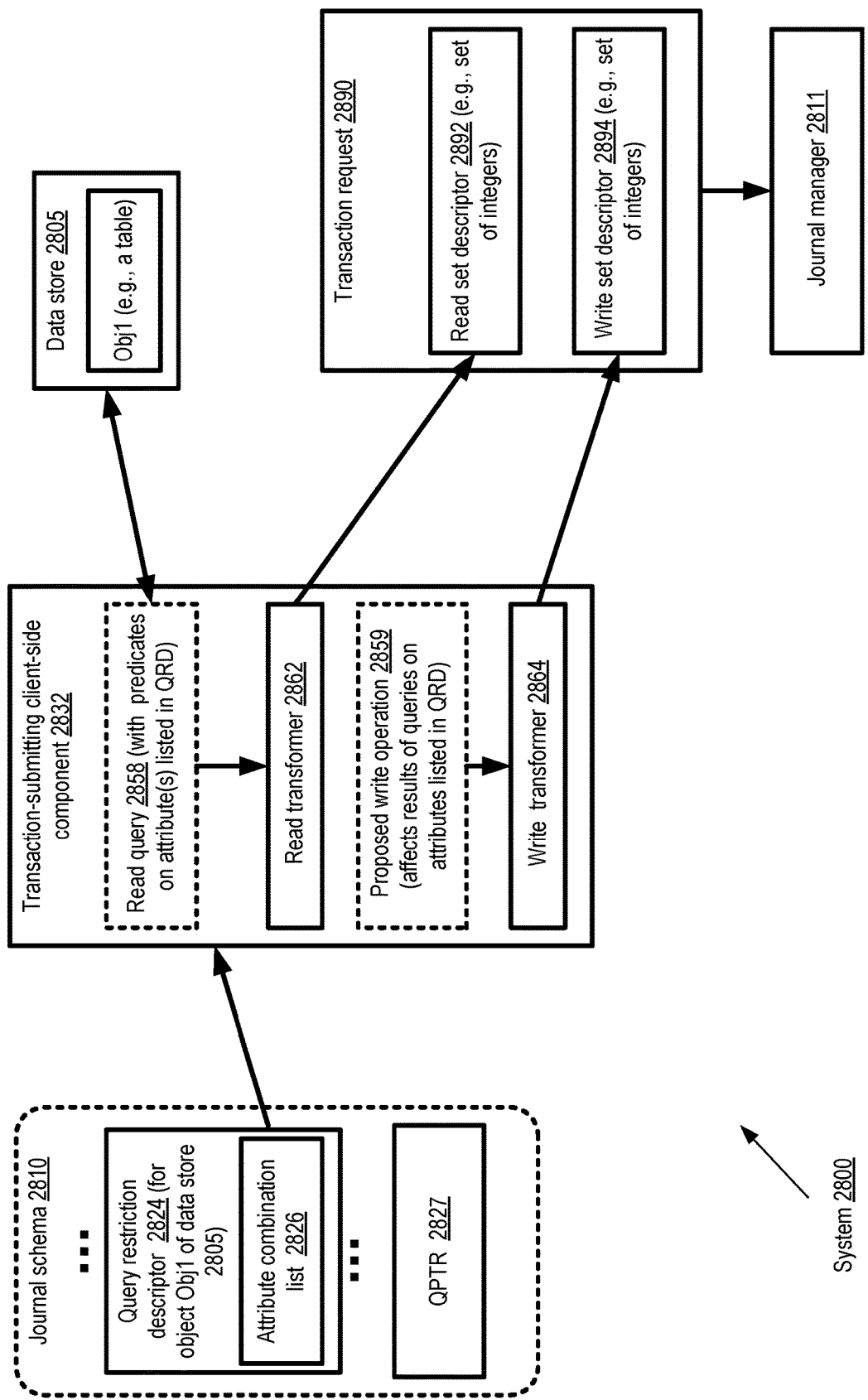
FIG. 28 illustrates an overview of the preparation of a transaction request using a query restriction descriptor at a storage system, according to at least some embodiments.

FIG. 28 illustrates an overview of the preparation of a transaction request using a query restriction descriptor at a storage system, according to at least some embodiments. As shown, in system 2800, a transaction submitting client-side component 2832 of the storage system may obtain a current version of a journal schema 2810. The journal schema may include one or more object-level query restriction descriptors such as QRD 2824, as well as an associated QPTR 2827 indicating the transformation protocol to be used on the queries. The journal schema 2810 may be obtained from the journal manager in some embodiments using a programmatic interface (e.g., an API) supported by the journal manager, and/or from a data store manager of a member data store such as 2805 in the depicted embodiment. The query restriction descriptor 2824 indicates a set of attribute combinations of a data object Obj1 of data store 2805.

As part of preparing a transaction request locally (e.g., in memory at the computing device at which the client-side component 2832 is instantiated), a read query 2858 may be directed to one or more Obj1 attributes indicated in the QRD 2824. One or more proposed write operations, which depend on the results of the read query and may affect results of queries directed to the Obj1 attributes indicated in QRD 2824, may be performed in memory. A read transformer subcomponent 2862 may apply one or more transformations indicated in the QPTR 2827 on the read query to obtain the read set descriptor 2892 (e.g., a set of integers obtained from a hash function applied to a normalized version of the read query). Similarly, the write set descriptor 2894 may be generated by a write transformer subcomponent 2864 of the client-side component, applying a transformation procedure indicated in the QRD 2824 to the write operations. The read set descriptor 2892 and write set descriptor 2894 may be included in a transaction request 2890 transmitted for the proposed transaction to a journal manager 2811. The transaction request may also include other elements in the depicted embodiment, such as those discussed earlier with respect to FIG. 6 (e.g., a journal schema version number or transaction language version number, an indication that the transaction belongs to the data modification transaction category, a conflict check delimiter, a logical constraint descriptors, a write payload, and so on).

Using the read set descriptor contents, as well as the stored write set descriptors in at least a subset of journal entries representing committed transactions, the journal manager 2811 may check whether results of the read query 2858 may be affected by a subsequently-committed transaction. If such a transaction is found, the transaction request 2890 may be rejected. Otherwise, if no such conflict is found (and in some cases if the transaction request meets other criteria such as one or more logical constraints), transaction request 2890 may be accepted for commit, and a corresponding committed transaction entry (which includes at least the write set descriptor 2894, to be used for later conflict detection operations) may be added to the journal.

Figure 29:
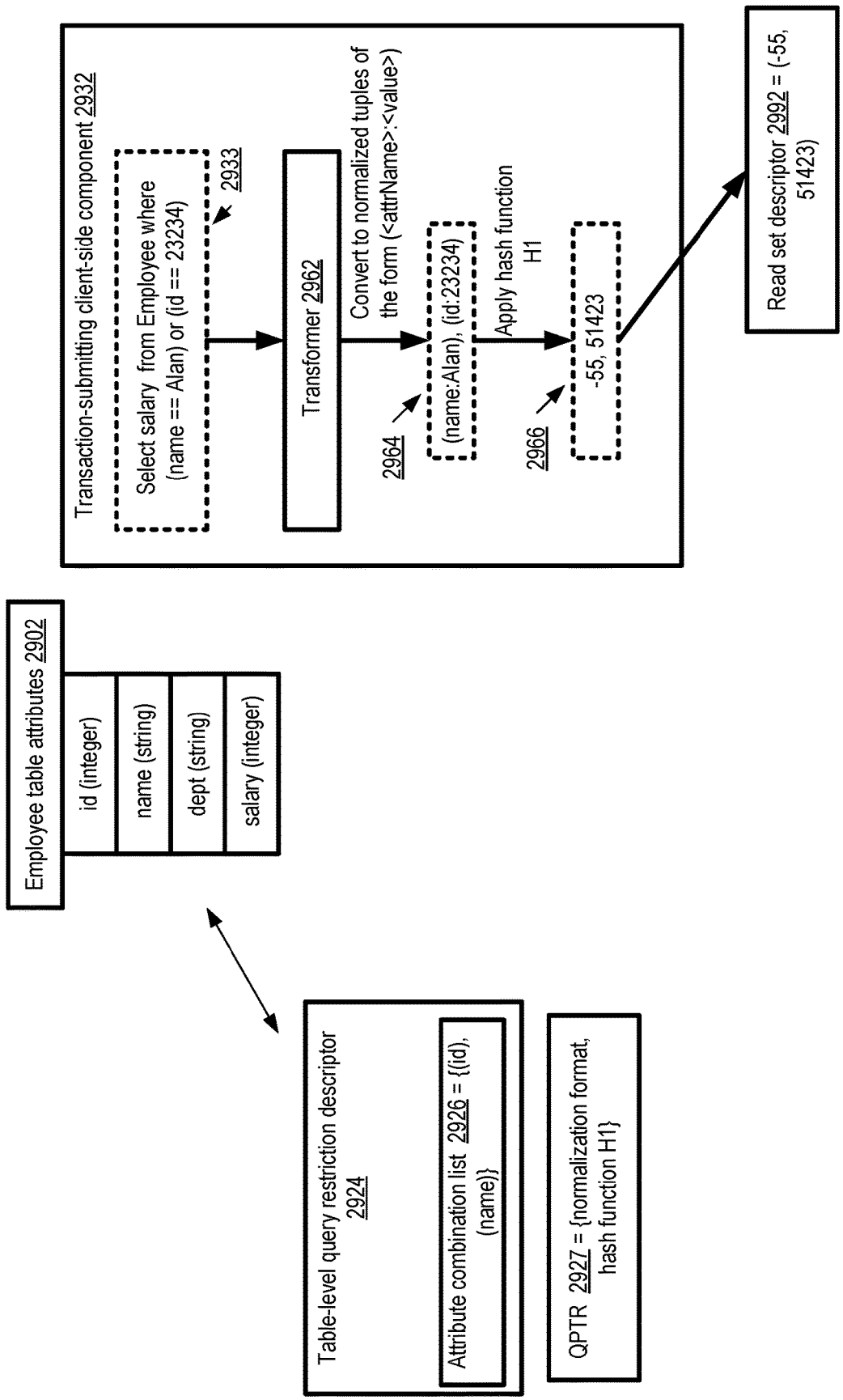
FIG. 29 illustrates an example of the preparation of a simple read set descriptor for a transaction request in compliance with a query restriction descriptor, according to at least some embodiments.

FIG. 29 illustrates an example of the preparation of a simple read set descriptor for a transaction request in compliance with a query restriction descriptor, according to at least some embodiments. In the depicted example, a table-level query restriction descriptor 2924 indicates (in attribute combination list 2926) that queries directed to attributes "id" or "name" of an "Employee" table are to be included in read set descriptors and write set descriptors of transaction requests. The Employee table attribute list 2902 also includes a "dept" (department) attribute and a "salary" attribute. The query predicate transformation rules 2927 indicate that a read query predicate is to be normalized into tuples in a particular format (with each tuple represented by an attribute name, followed by a colon, followed by the attribute's value), that each tuple is then to be provided as input to a particular hash function H1 (e.g., a SipHash function, or any other appropriate hash function), with the output of the hash function for each tuple to be included in the read set descriptor.

A client-side component 2932 of the storage system issues a read query 2933 corresponding to an SQL or SQL-like statement "select salary from Employee where (name==Alan) or (id==23234)" as part of the preparation of a transaction request. A transformer subcomponent 2932 analyzes the query 2933, and converts the query into the normalized format 2964 ("(name:Alan), (id:23234)") consisting of one tuple each for each of the equality predicates of the query, with each tuple formatted as (<attributeName>: <value>) with a colon between the name and value elements of the tuple. The details of the tuple format used for normalization may differ in various embodiments from those shown in FIG. 29. The hash function H1 is then applied, producing the integer values −55 and 51423 respectively corresponding to the two tuples. The integer values are then incorporated as the read set descriptor 2992 of the corresponding transaction request in the depicted embodiment. In at least one embodiment, in addition to the integer values obtained from transforming the read query, the read query itself may also be included in the read set descriptor.

As indicated in FIG. 29, in at least some embodiments one or more of the attributes of a given data object may be excluded from a query restriction descriptor. For example, in accordance with the query restriction descriptor 2924, the client-side component may not be permitted to include queries directed at the "dept" attribute in the scenario in FIG. 29. In some embodiments, in which the baseline (untransformed) version of the read query is not indicated in the read set descriptor, it may not be possible for the journal manager to verify that the client-side component abided by the query restrictions indicated in the journal schema, and the journal manager may therefore have to rely on the client-side component to honor the restrictions. In other embodiments, the untransformed version of the query may be included in the transaction request, or the particular attributes used to generate the read set descriptor may be indicated, enabling such verification to be performed at the journal manager.

Figure 30:
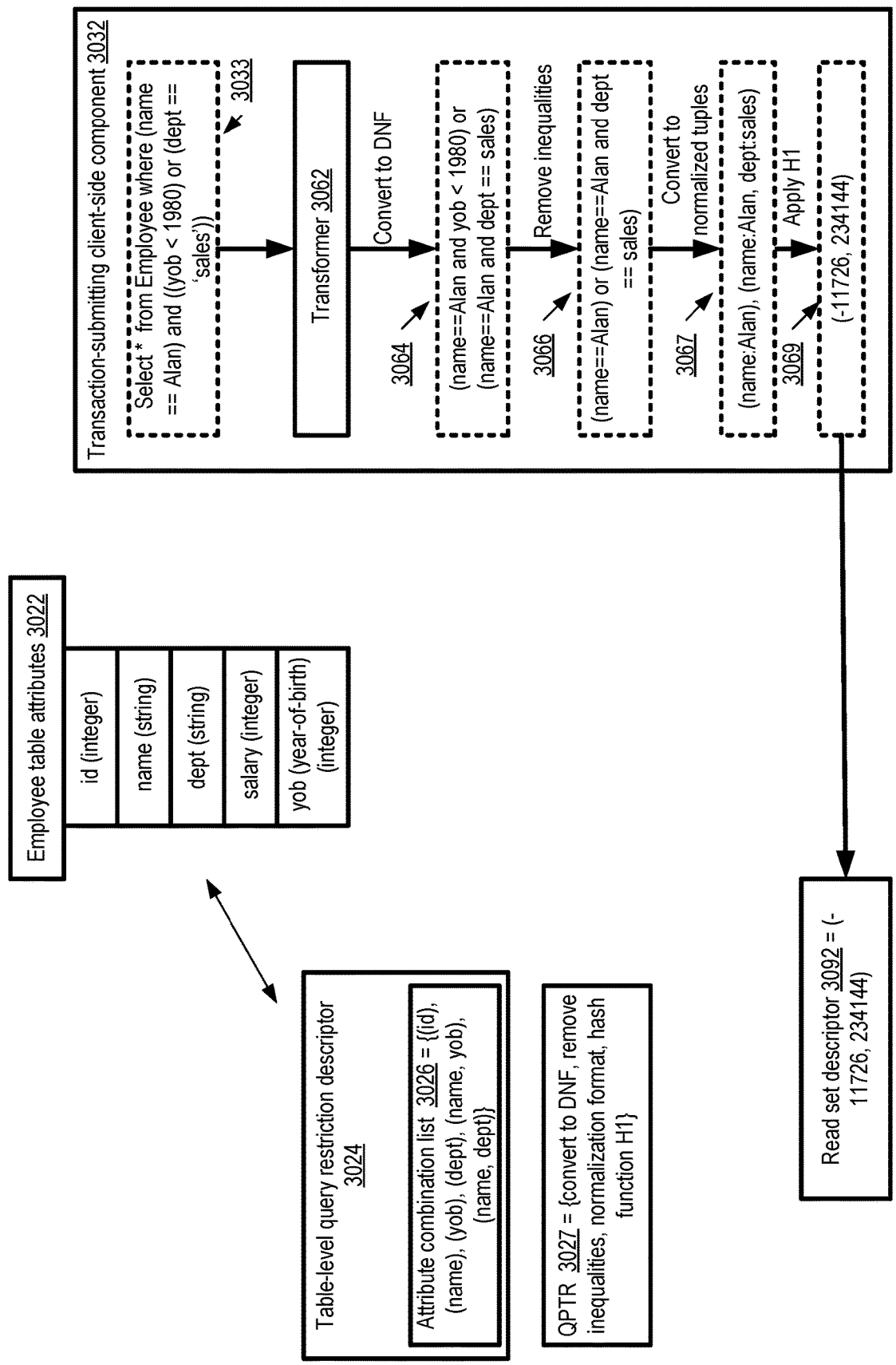
FIG. 30 illustrates an example of the preparation of a read set descriptor corresponding to a query which includes an inequality predicate, according to at least some embodiments.

In the simple example shown in FIG. 29, the read query only contained equality predicates. FIG. 30 illustrates an example of the preparation of a read set descriptor corresponding to a query which includes an inequality predicate, according to at least some embodiments. In the depicted embodiment, the Employee table attribute list 3022 includes attributes "name", "id", "dept", "salary" and "yob" (year-of-birth). The query restriction descriptor 3024's attribute list 3026 includes the combinations (id), (name), (yob), (dept), (name,yob) and (name,dept). The query predicate transformation rules 3027 indicate that read queries are to be converted to disjunctive normal form (DNF) if they are not already in that form, that inequalities are to be removed or dropped from the DNF representation, that the DNF version of a query is then to be normalized in a particular format, and that a hash function H1 is then to be applied.

The analysis and transformation of a query 3033 equivalent to the SQL statement "select*from Employee where ((name==Alan) and ((yob<1980) or (dept==sales))" to obtain a read set descriptor is illustrated. In query 3033, the where clause has the structure (X and (Y or Z)) and is not in disjunctive form. Therefore, in a first step 3064 of the transformation procedure, a transformer 3062 of the client-side component 3032 obtains the DNF form 3064 of the where clause: ((name==Alan and yob<1980) or (name==Alan and dept==sales)). Next, the inequality (yob<1980) is dropped from DNF form 3064, resulting in the DNF form query 3066: ((name==Alan) or (name==Alan and dept==sales)). Such inequalities may be dropped in some embodiments, for example, because the hash-based mechanism being used for representing query predicates may only be able to capture equalities efficiently for the purposes of comparing read sets and write sets. Furthermore, the elimination of the (yob<1980) from the representation of query 3033 does not lead to any reduction in consistency—because the yob constraint is eliminated, in effect a larger value space of the Employee table is being checked for read-write conflicts than if the yob constraint were retained.

In the next step of the transformation, the modified DNF version 3066 of the query may be normalized into a pair of tuples 3067: (name:Alan) and (name:Alan, dept:sales). (It is noted that in this simple example, the first of these tuples subsumes the other, so in some implementations, only one of the tuples may have to be retained for the hash function H1.) When hash function H1 is applied to each of the tuples in turn, the integer values −11726 and 234144 are produced as output respectively, and these values may be incorporated into the read set descriptor 3092 included in the corresponding transaction request whose read set was obtained using query 3033.

With respect to a write operation directed to a particular object such as a row of a table, both the pre-image of the modified object (the state of the object before the proposed write) and the post-image of the modified object (the state of the object after the proposed write) may have to be taken into account when determining the set of queries which would be affected by the write in various embodiments. Query restrictions may often result in a large reduction in the amount of data that has to be included in write set descriptors. In the absence of query restrictions, for example, queries whose predicates are directed to each combination of one or more attributes of the pre-image and the post-image may have to be included in the set of write-affected queries. Thus, if a table has n attributes, on the order of $(2*2^n)$ predicates may have to be included in the write set descriptor for a write operation if no query restrictions apply. $O(2^n)$ predicates may be represented for the pre-image attribute combinations, and $O(2^n)$ for the post-image attribute combinations, for example. To provide an indication of the impact of using query restrictions with respect to writes, the process of generating write set descriptors for the same query with and without query restriction descriptors is illustrated in FIG. 31 and FIG. 32.

Figure 31:
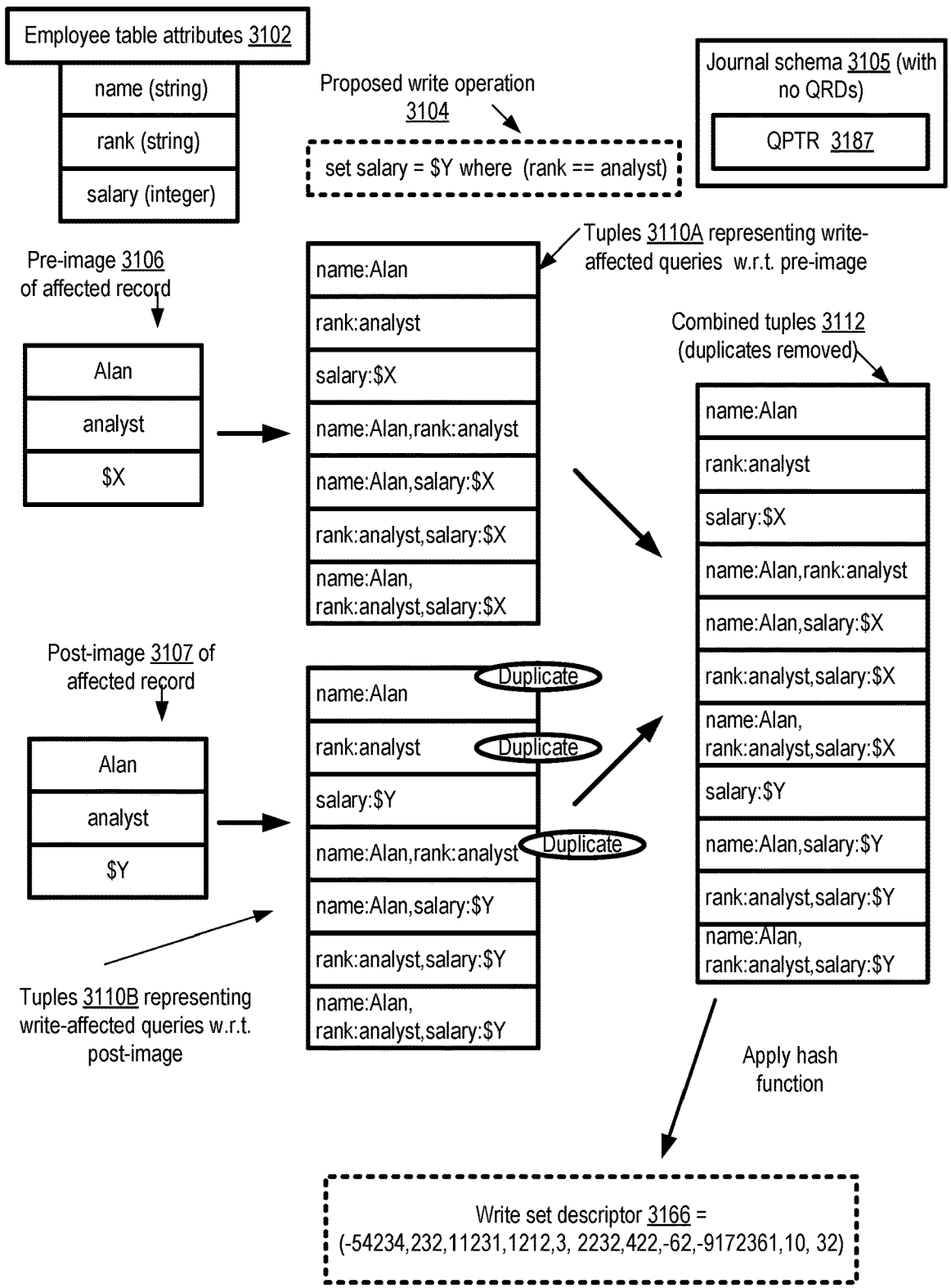
FIG. 31 illustrates an example of the preparation of a write set descriptor corresponding to a journal schema which does not include query restriction descriptors, according to at least some embodiments.
Figure 32:
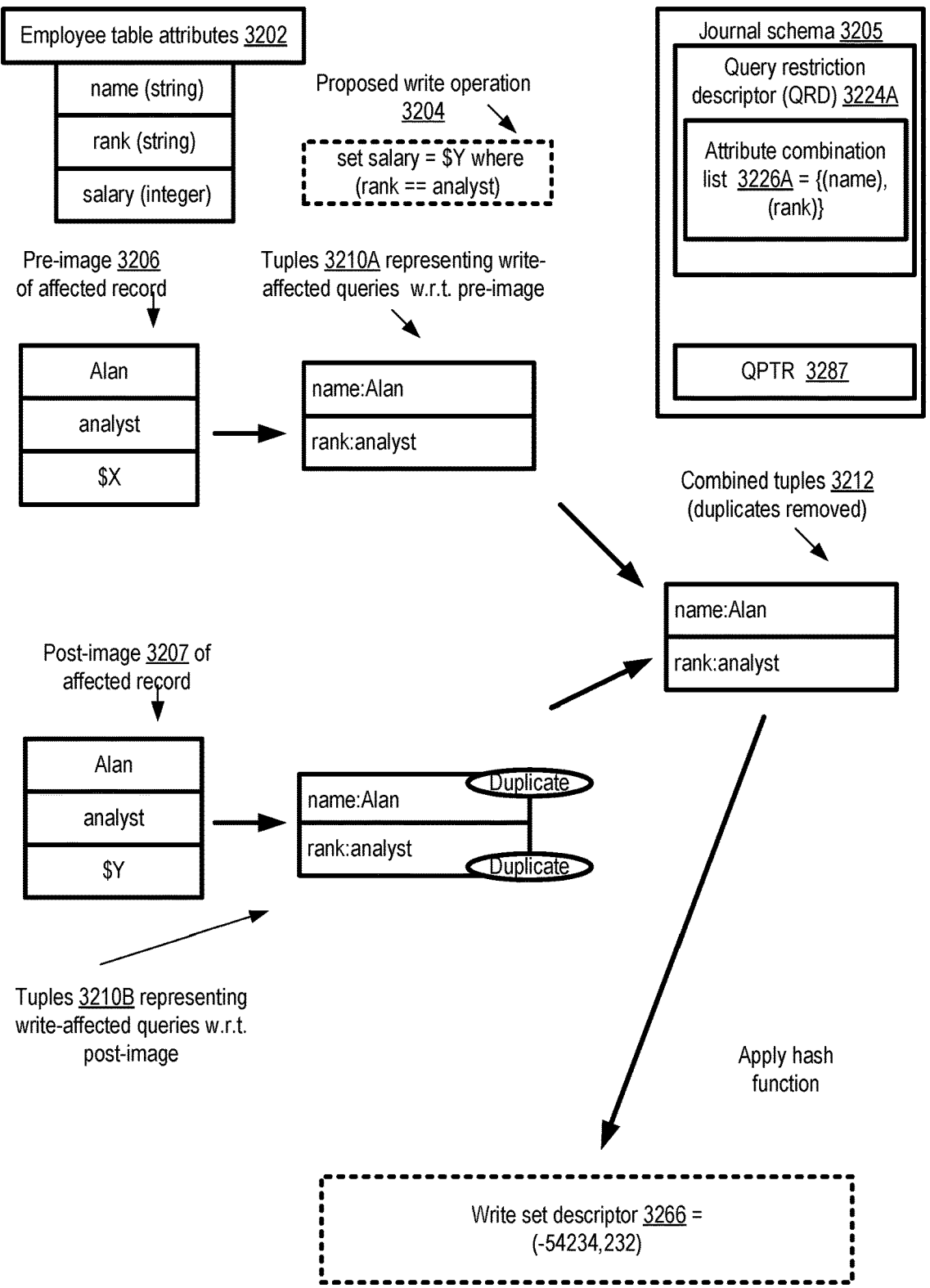
FIG. 32 illustrates an example of the preparation of a write set descriptor corresponding to a journal schema which includes query restriction descriptors, according to at least some embodiments.

FIG. 31 illustrates an example of the preparation of a write set descriptor corresponding to a journal schema which does not include query restriction descriptors, according to at least some embodiments. As shown, the Employee table attribute list 3102 has three attributes: name, rank and salary. The journal schema 3105 has no query restrictions. A proposed write operation 3104 equivalent to the SQL statement "update Employee set salary=$Y where rank=analyst" is to be represented in the transaction request's write descriptor set. A single record is affected by the write in the depicted example: a record with the values "Alan", "analyst" and "$X" as the values for name, rank and salary attributes respectively. Thus, the pre-image 3106 (the unmodified version of the affected record) includes the original salary $X, while the salary is set to $Y in post-image 3107 (the modified version of the affected record).

Directives about the transformation procedure to be used for write set descriptors may be indicated in the journal schema's query predicate transformation rules (QPTR) 3187 in the depicted embodiment. In accordance with QPTR 3187, the client-side component preparing the transaction request may create a respective set of tuples for the pre-image and post-image of the record affected by the write. In at least some embodiments, only non-empty combinations of the attributes and values may be considered when preparing the write set descriptors (as discussed below, the empty combination with zero attributes may correspond to a read of an entire data object such as a table, which may not be supported with respect to read sets of proposed transactions in such embodiments). All possible non-empty combinations of the attributes and values (i.e., combinations with one or more attributes, and the corresponding values) of the affected record may be generated in the embodiment shown in FIG. 31, as there are no restrictions of the write-affected queries which are to be included in the write set descriptor. Thus, since there are three attributes, and the empty combination is to be excluded, $(2^3-1)$ or seven combinations are generated for the tuple set 3110A for write-affected queries with respect to the pre-image. As shown, tuple set 3110 includes one entry each for individual attributes ((name:Alan), (rank:analyst) and (salary:$X)), one entry for each combination of two attributes ((name:Alan, rank:analyst), (name:Alan, salary:$X) and (rank:analyst, salary:$X)), and one entry for the combination of all three attributes (name:Alan, rank:analyst, salary:$X). Because results of read queries with predicates corresponding to any of these combinations may be affected by the proposed write, all these combinations may have to be represented in the write set descriptor Similarly, the set of tuples 3110B generated for the post-image also includes 7 tuples. In some embodiments in which reads/scans of entire data objects are supported with respect to read sets used for preparing proposed transactions, in addition to the tuples for non-empty combinations of attributes, a tuple with zero attributes may be generated and included in a write set descriptor. As mentioned above, such a zero-attribute tuple may correspond to a query for the entire data object (e.g., the equivalent of an SQL query "select*from <tableName>" where the data object is a table), whose results would clearly be affected by the write operation for which a write set descriptor is to be prepared.

After the tuple sets 3110 corresponding to the pre-image and the post-image are generated, the client-side component may remove duplicates from the union of the tuple sets. Thus, for example, the tuples (name:Alan), (rank:analyst) and (name:Alan, rank:analyst) appear in both tuple sets 3110A and 3110B, and need not be included twice in the combined tuples 3112. After the duplicates (if any) are removed, a hash function may be applied to the remaining tuples, resulting in a write set descriptor 3166 with eleven integers (one each for the eleven entries of combined tuple set 3112). In many cases, the data objects of the storage system may have far more than three attributes, so the write set descriptor may become quite large when all the combinations of attributes are taken into account. Also, more than one data object may be affected by the set of write operations of a proposed transaction, which would also tend to increase the size of the write set descriptor in embodiments in which the combinatorial approach illustrated in FIG. 31 is employed.

FIG. 32 illustrates an example of the preparation of a write set descriptor corresponding to a journal schema which includes query restriction descriptors, according to at least some embodiments. The employee table attribute list 3202 is identical to the attribute list 3102 of FIG. 31, the proposed write operation 3204 is identical to the write operation 3104 of FIG. 31, and the QPTR 3287 is also identical to the QPTR 3187 of FIG. 31. In the depicted example, journal schema 3205 indicates two query restriction descriptors: QRD 3224A, whose attribute list 3226A only includes the "name" attribute, and QRD 3224B, whose attribute list 3226B includes only the "rank" attribute. A single-attribute QRD such as QRD 3224A or 3224B may only require single-attribute tuples to be taken into account when generating the write set descriptor in the depicted embodiment (as opposed to the combinations of one, two and three tuples which were generated in the example scenario of FIG. 31).

As a result of the inclusion of QRDs 3224A and 3224B, the set of tuples that is generated for the write set descriptor is much smaller than in FIG. 31. For both the pre-image 3206 and the post-image 3208, only the tuples (name:Alan) and (rank: analyst) may be generated in tuple sets 3210A and 3210B respectively. After duplicate removal, only two tuples may remain in the combined tuple set 3212. After the combined tuples are hashed, the write set descriptor 3266 only contains two integers. As indicated in FIG. 31 and FIG. 32, by restricting the set of queries for which read-write conflicts are to be taken into account, the amount of computation and memory/storage required for the write set descriptors may be reduced substantially. Many data objects may include a large number of attributes in some embodiments, and at least in some cases serializable consistency may only be required with respect to a few of those attributes. In such scenarios, applying restrictions on the queries which have to be taken into account for conflict detection may be extremely beneficial.

Figure 33:
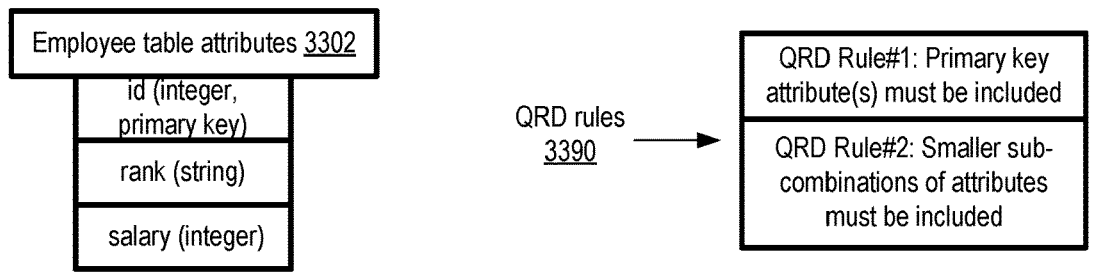
FIG. 33 illustrates examples of enhanced query restriction descriptors which may be generated from client-specified query restriction descriptors, according to at least some embodiments.
Figure 33:
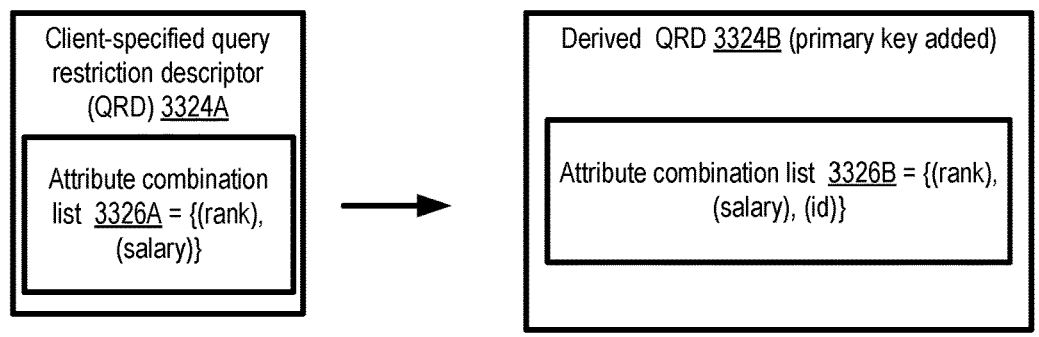
Figure 33:
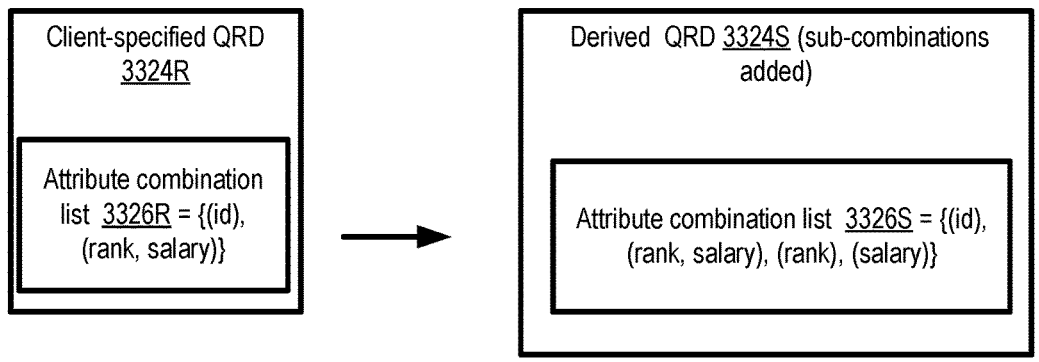

In at least one embodiment, query restriction descriptors may sometimes be added to journal schemas based on requests from clients of the storage system. However, in some cases the journal manager, data store managers, client-side component library modules, or some other component of the storage system may modify the query restriction descriptors specified by the clients, e.g., based on a set of heuristics or rules regarding the consistency levels to be supported by the system. FIG. 33 illustrates examples of enhanced query restriction descriptors which may be generated from client-specified query restriction descriptors, according to at least some embodiments. Employee table attributes include "id" (which is also the primary key), rank and salary. A set of QRD rules 3390 are to be applied to the query restriction descriptors in the depicted embodiment. Rule #1 requires that if a query restriction descriptor is specified for a data object and the data object has a primary key attribute (or set of attributes that collectively form the primary key), the primary key attribute (or attributes) of a data object must be included as one of the combinations in a query restriction descriptor. Rule #2 requires that if a combination of multiple attributes is specified in a QRD, smaller sub-combinations of those attributes are also to be included.

Client-specified QRD 3324A does not comply with Rule #1 in the depicted embodiment. Its attribute combination list 3326A includes the attribute combinations (rank) and (salary), but fails to include the primary attribute "id". Accordingly, a derived or system-enhanced version 3324B of the QRD may be generated, which does include the (id) combination in a modified combination list 3326B. Client-specified QRD 3324R complies with Rule #1, but does not comply with Rule #2. It has a combination of attributes (rank, salary), but does not include the corresponding sub-combinations. Accordingly, in order to comply with Rule #2, derived QRD 3324S may be generated, with attribute combination list 3326S obtained by adding the single-attribute sub-combinations (rank) and (salary) to the client-specified combination list 3326R. In some embodiments, such enhancements may be made prior to approving a client-submitted request to modify a journal schema. In at least one embodiment, QRD enhancements of the kind illustrated in FIG. 33 may be implicit rather than explicit—e.g., the stored representation of the journal schema itself may not be modified, but the client-specified QRDs may be interpreted or used as though the QRD rules 3390 had been followed (that is, as though the changes to bring the QRDs into compliance with the rules had been made). In various embodiments, other QRD rules than those indicated in FIG. 33 may be used, or one or more of the rules illustrated in FIG. 33 may not be enforced.

Figure 34:
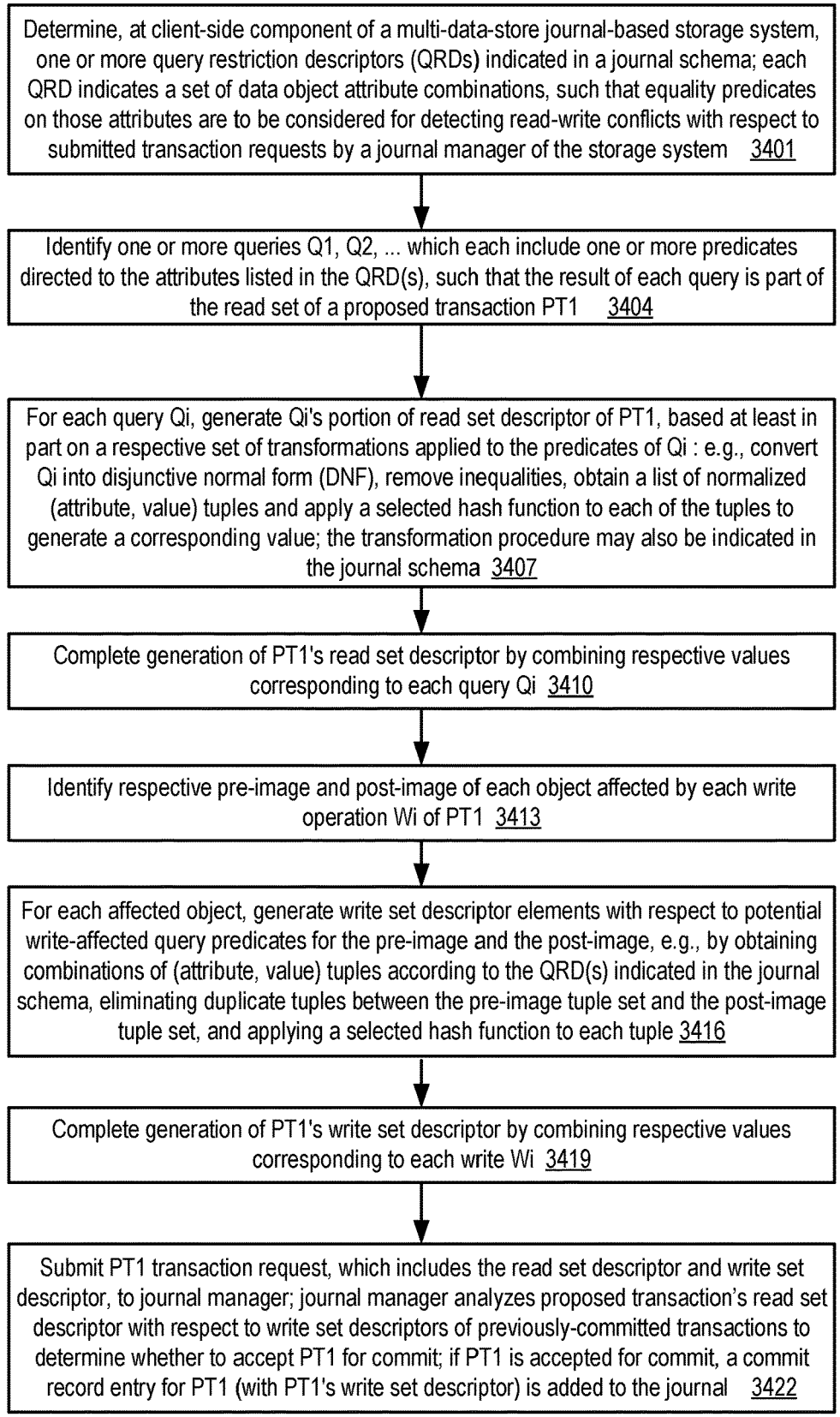
FIG. 34 is a flow diagram illustrating aspects of operations that may be performed to generate transaction requests compliant with query restriction descriptors at a journal-based storage system, according to at least some embodiments.

FIG. 34 is a flow diagram illustrating aspects of operations that may be performed to generate transaction requests compliant with query restriction descriptors at a journal-based storage system, according to at least some embodiments. As shown in element 3401, a client-side component on a multi-data-store journal-based storage system may determine one or more query restriction descriptors (QRDs) indicated in a journal schema of the system. Each QRD may include a set of data object attribute combinations with respect to which a particular consistency level (e.g., serializable consistency) is to be supported at the storage system using read-write conflict detection performed by a journal manager of the system.

The client-side component may prepare a transaction request corresponding to a proposed transaction PT1 which includes one or more write operations, where the write operations (e.g., the write payload, or the particular objects modified) may depend at least in part on the results of one or more read queries directed at some subset or all of the attribute combination indicated in the QRDs. The set of such queries Q1, Q2, . . . , of the read set of the proposed transaction may be identified (element 3404). For each such query Qi, a respective part of a read set descriptor may be obtained at the client-side component (element 3407), e.g., by implementing a transformation procedure on the query. The transformation procedure may be indicated in the journal schema in at least some embodiments. The transformations on a particular query may include, for example, converting the query into a standard form such as disjunctive normal form, eliminating inequalities from the predicates of the normalized query, determining a list of (attribute, value) tuples corresponding to the query resulting from the removal of the inequalities, and/or applying a selected hash function (e.g., a SipHash function) or some other similar transformation to the (attribute, value) tuples. The results of the transformation functions may be a set of integer or other numeric values in some implementations. The results from the transformation procedure for each of the queries of the read set may be combined to form the write set descriptor (element 3410).

To generate the write set descriptor, in the depicted embodiment the client-side component may analyze each write operation of the proposed transaction which could affect the results of queries directed to the attribute combinations indicated in the QRDs. For each such write operation Wi, the pre-image (the unmodified version of a data object such as record modified by the write) and the post-image (the modified version) may be obtained (element 3413). For objects which are being inserted (and therefore do not have a previous or unmodified version), the pre-image may be set to null. Corresponding to each (non-null) pre-image and post-image, a respective set of write descriptor elements may be obtained using a transformation procedure (element 3416) in the depicted embodiment. For example, the set of combinations of (attribute, value) tuples indicated in the QRDs may be obtained for the pre-image and the post-image. Then, duplicates may be eliminated from the union of the combinations of the pre-image and post-image, and the (attribute, value) tuples remaining after the duplicate elimination may be formatted or normalized. Finally, a transformation function (e.g., the same function used when preparing the read set descriptor) may be applied to the tuples. The results of the transformation (e.g., a set of numerical values such as integers) may be added to the write set descriptor for each write operation Wi (element 3419).

The transaction request for the proposed transaction PT1 comprising the read set descriptor and the write set descriptor may be sent to the journal manager of the storage system (element 3422). The journal manager may perform conflict detection using the read set descriptor of the transaction request and the write set descriptors of at least a subset of transactions for which commit records have already been added to the journal. The subset of commit records may be determined, for example, based on a conflict check delimiter (e.g., a commit sequence number, as indicated in FIG. 6) included in the transaction request, which indicates the state of the system corresponding to the data read during the preparation of the transaction request. For example, if the read set descriptors and the write set descriptors are all represented as sets of integers, a conflict may be detected if an integer in the read set descriptor is also present in a write set descriptor of one of the transactions committed since the read set contents were read. If the journal manager accepts PT1 for commit, a corresponding commit record containing at least PT1's write set descriptor (and in some cases, other components of the transaction request as well) may be added to the journal and used for subsequent read-write conflict detection operations.

It is noted that in various embodiments, some of the operations shown in the flow diagrams of FIG. 9, FIG. 15, FIG. 26 and/or FIG. 34 may be implemented in a different order than that shown in the figure, or may be performed in parallel rather than sequentially. Additionally, some of the operations shown in one or more of the flow diagrams may not be required in one or more implementations.

Use Cases

The techniques described above, of using a journal schema with a corresponding data-store-independent transaction language at a multi-data-store storage system or database whose state changes are represented as respective journal entries, generating compact snapshots, implementing a redaction protocol, and/or implementing query restrictions, may be useful in a variety of environments. As more and more organizations migrate their computing and storage operations to distributed and/or cloud-based environments, the need for coordinating access to numerous data stores (some of which may implement different data models, and/or support different data types than others) for a given application has increased. The use of a data-store-independent transaction language and a journal schema that takes the idiosyncrasies and limitations of each of the data stores into account may help enable many applications that would otherwise require custom connectors between different data stores. Compact snapshots of the kind described herein may make it much easier for new data stores to join the storage system, and to resynchronize data stores with the authoritative state of the system as indicated by the contents of the journal. Redaction of previously-inserted journal entries which happen to be malformed or problematic may help increase the robustness of the storage system. Query restrictions may enable desired consistency levels to be supported with respect to important data attributes without incurring too much overhead during transaction request preparation and/or conflict detection.

Illustrative Computer System

Figure 35:
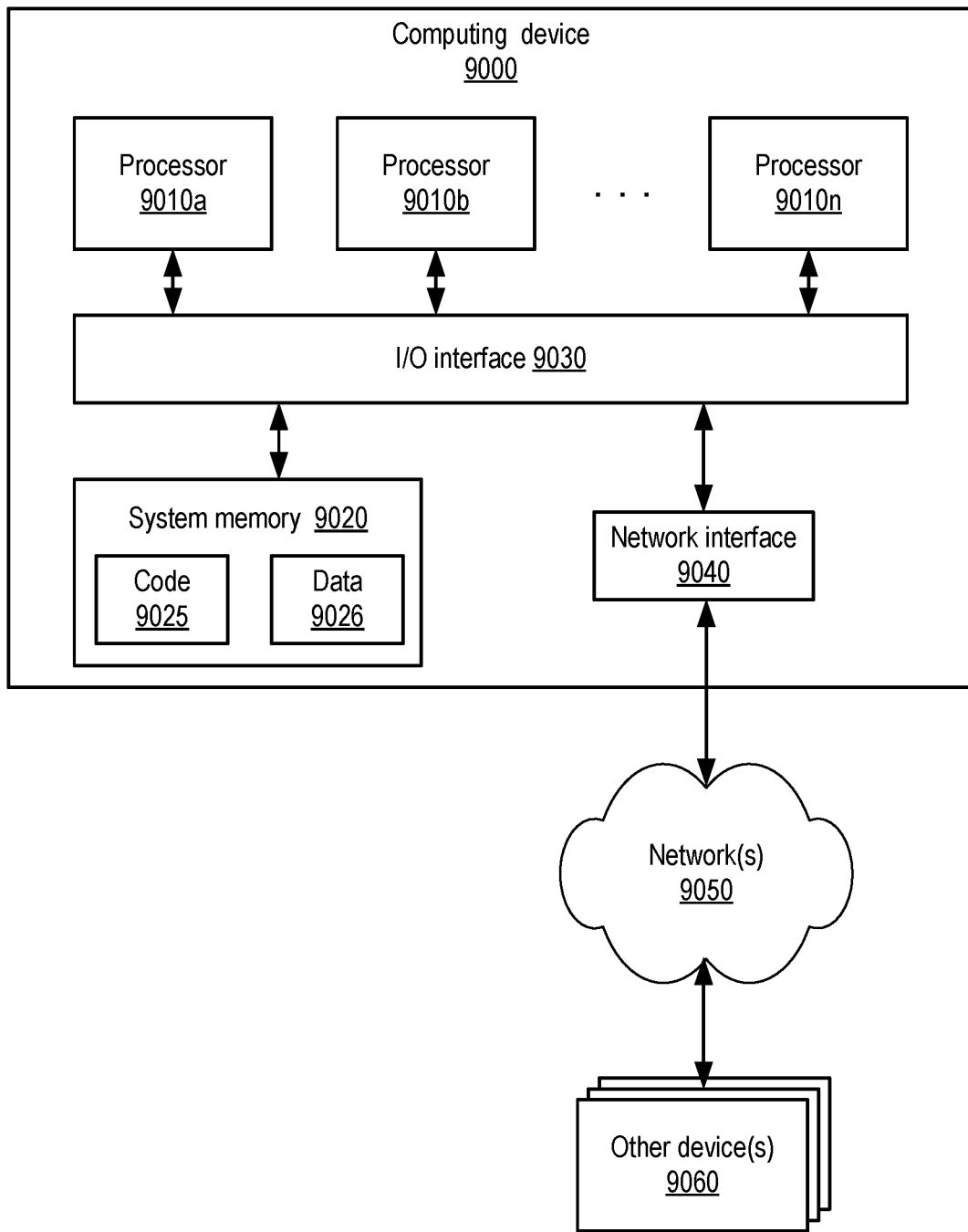
FIG. 35 is a block diagram illustrating an example computing device that may be used in at least some embodiments.

In at least some embodiments, a server that implements one or more of the techniques described above for transaction management at a journal-based multi-data-store storage system (including for example the operations of journal managers, data store managers, client-side components, write appliers or cursors including redaction look-ahead cursors and data modification entry cursors) may include a general-purpose computer system that includes or is configured to access one or more computer-accessible media. FIG. 35 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 34, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 34 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 35 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:
    applying, based at least in part on contents of entries of a journal of a multi-data-store storage system, wherein individual ones of the entries indicate committed state changes of the multi-data-store storage system in a first transaction language, (a) a first set of state changes to a relational data store of the multi-data-store storage system that supports access to the relational data store in a first data manipulation language and (b) a second set of state changes to a non-relational data store of the multi-data-store storage system that supports access to the non-relational data store in a second data manipulation language that is different from the first data manipulation language, and wherein the first transaction language is different from both the first data manipulation language and the second data manipulation language;
    generating (a) a first snapshot of a portion of the relational data store, wherein at least a portion of the first snapshot is expressed in the first transaction language and (b) a second snapshot of a portion of the non-relational data store, wherein at least a portion of the second snapshot is expressed in the first transaction language; and
    determining, based at least in part on a comparison of the first and second snapshots, whether one or more synchronization patches are to be applied to at least one data store of a first set of data stores comprising the relational data store and the non-relational data store.

2. The computer-implemented method as recited in claim 1, further comprising:
    in response to determining, based at least in part on the comparison of the first and second snapshots, that a particular synchronization patch is to be applied to a particular data store of the first set of data stores, applying the particular synchronization patch to the particular data store to synchronize the relational data store and the non-relational data store with each other.

3. The computer-implemented method as recited in claim 1, further comprising:
    registering, as a member data store of the multi-data-store storage system, a network-accessible storage service of a cloud computing environment; and
    applying, based at least in part on contents of the entries of the journal, a third set of state changes to the network-accessible storage service.

4. The computer-implemented method as recited in claim 1, further comprising:
    generating a third snapshot of the journal, wherein the third snapshot is expressed in the first transaction language.

5. The computer-implemented method as recited in claim 4, further comprising:

determining to generate one or more of: (a) the first snapshot, (b) the second snapshot or (c) the third snapshot based at least in part on one or more of (a) an expiration of a time interval, (b) a number of entries that have been added to the journal or (c) a request received via a programmatic interface.

6. The computer-implemented method as recited in claim 4, further comprising:
utilizing the third snapshot to determine whether contents of a particular data store of the set of data stores have deviated from the journal.

7. The computer-implemented method as recited in claim 6, further comprising:
in response to determining that the contents of the particular data store have deviated from the journal, applying a particular synchronization patch to the particular data store to synchronize the particular data store with the journal.

8. A system, comprising:
one or more computing devices, wherein the one or more computing devices include instructions that upon execution on or across the one or more computing devices:
apply, based at least in part on contents of entries of a journal of a multi-data-store storage system, wherein individual ones of the entries indicate committed state changes of the multi-data-store storage system in a first transaction language, (a) a first set of state changes to a relational data store of the multi-data-store storage system that supports access to the relational data store in a first data manipulation language and (b) a second set of state changes to a non-relational data store of the multi-data-store storage system that supports access to the non-relational data store in a second data manipulation language that is different from the first data manipulation language, and wherein the first transaction language is different from both the first data manipulation language and the second data manipulation language;
generate (a) a first snapshot of a portion of the relational data store, wherein at least a portion of the first snapshot is expressed in the first transaction language and (b) a second snapshot of a portion of the non-relational data store, wherein at least a portion of the second snapshot is expressed in the first transaction language; and
determine, based at least in part on a comparison of the first and second snapshots, whether one or more synchronization patches are to be applied to at least one data store of a first set of data stores comprising the relational data store and the non-relational data store.

9. The system as recited in claim 8, wherein the one or more computing devices include further instructions that upon execution on or across the one or more computing devices:
in response to determining, based at least in part on the comparison of the first and second snapshots, that a particular synchronization patch is to be applied to a particular data store of the first set of data stores, apply the particular synchronization patch to the particular data store to synchronize the relational data store and the non-relational data store with each other.

10. The system as recited in claim 8, wherein the one or more computing devices include further instructions that upon execution on or across the one or more computing devices:
register, as a member data store of the multi-data-store storage system, a network-accessible storage service of a cloud computing environment; and
apply, based at least in part on contents of the entries of the journal, a third set of state changes to the network-accessible storage service.

11. The system as recited in claim 8, wherein the one or more computing devices include further instructions that upon execution on or across the one or more computing devices:
generate a third snapshot of the journal, wherein the third snapshot is expressed in the first transaction language.

12. The system as recited in claim 11, wherein the one or more computing devices include further instructions that upon execution on or across the one or more computing devices:
determine to generate one or more of: (a) the first snapshot, (b) the second snapshot or (c) the third snapshot based at least in part on one or more of (a) an expiration of a time interval, (b) a number of entries that have been added to the journal or (c) a request received via a programmatic interface.

13. The system as recited in claim 11, wherein the one or more computing devices include further instructions that upon execution on or across the one or more computing devices:
utilize the third snapshot to determine whether contents of a particular data store of the set of data stores have deviated from the journal.

14. The system as recited in claim 13, wherein the one or more computing devices include further instructions that upon execution on or across the one or more computing devices:
in response to determining that the contents of the particular data store have deviated from the journal, apply a particular synchronization patch to the particular data store to synchronize the particular data store with the journal.

15. One or more non-transitory computer-accessible storage media storing program instructions that when executed on or across one or more processors:
apply, based at least in part on contents of entries of a journal of a multi-data-store storage system, wherein individual ones of the entries indicate committed state changes of the multi-data-store storage system in a first transaction language, (a) a first set of state changes to a relational data store of the multi-data-store storage system that supports access to the relational data store in a first data manipulation language and (b) a second set of state changes to a non-relational data store of the multi-data-store storage system that supports access to the non-relational data store in a second data manipulation language that is different from the first data manipulation language, and wherein the first transaction language is different from both the first data manipulation language and the second data manipulation language;
generate (a) a first snapshot of a portion of the relational data store, wherein at least a portion of the first snapshot is expressed in the first transaction language and (b) a second snapshot of a portion of the non-relational data store, wherein at least a portion of the second snapshot is expressed in the first transaction language; and determine, based at least in part on a comparison of the first and second snapshots, whether one or more synchronization patches are to be applied to at least one data store of a first set of data stores comprising the relational data store and the non-relational data store.

16. The one or more non-transitory computer-accessible storage media as recited in claim 15, storing further program instructions that when executed on or across the one or more processors:

in response to determining, based at least in part on the comparison of the first and second snapshots, that a particular synchronization patch is to be applied to a particular data store of the first set of data stores, apply the particular synchronization patch to the particular data store to synchronize the relational data store and the non-relational data store with each other.

17. The one or more non-transitory computer-accessible storage media as recited in claim 15, storing further program instructions that when executed on or across the one or more processors:

register, as a member data store of the multi-data-store storage system, a network-accessible storage service of a cloud computing environment; and apply, based at least in part on contents of the entries of the journal, a third set of state changes to the network-accessible storage service.

18. The one or more non-transitory computer-accessible storage media as recited in claim 15, storing further program instructions that when executed on or across the one or more processors:

generate a third snapshot of the journal, wherein the third snapshot is expressed in the first transaction language.

19. The one or more non-transitory computer-accessible storage media as recited in claim 18, storing further program instructions that when executed on or across the one or more processors:

determine to generate one or more of: (a) the first snapshot, (b) the second snapshot or (c) the third snapshot based at least in part on one or more of (a) an expiration of a time interval, (b) a number of entries that have been added to the journal or (c) a request received via a programmatic interface.

20. The one or more non-transitory computer-accessible storage media as recited in claim 18, storing further program instructions that when executed on or across the one or more processors:

utilize the third snapshot to determine whether contents of a particular data store of the set of data stores have deviated from the journal.

* * * * *